United States Patent [19]
Imabayashi et al.

[11] Patent Number: 5,410,204
[45] Date of Patent: Apr. 25, 1995

[54] ULTRASONIC OSCILLATOR

[75] Inventors: Hiroyuki Imabayashi, Sagamihara; Takanao Fujimura, Kodaira; Tomoki Funakubo; Isamu Nakajima, both of Hachioji, all of Japan

[73] Assignee: Olympus Optical Co. Ltd., Tokyo, Japan

[21] Appl. No.: 26,316

[22] Filed: Mar. 1, 1993

[30] Foreign Application Priority Data

| Feb. 28, 1992 | [JP] | Japan | 4-43399 |
| May 20, 1992 | [JP] | Japan | 4-127765 |
| May 20, 1992 | [JP] | Japan | 4-127766 |
| Jun. 9, 1992 | [JP] | Japan | 4-149701 |
| Jul. 1, 1992 | [JP] | Japan | 4-174153 |
| Jul. 24, 1992 | [JP] | Japan | 4-198563 |
| Jul. 27, 1992 | [JP] | Japan | 4-199839 |
| Aug. 18, 1992 | [JP] | Japan | 4-219389 |
| Aug. 21, 1992 | [JP] | Japan | 4-223029 |

[51] Int. Cl.$^6$ .................................... H01L 41/08
[52] U.S. Cl. ...................................... 310/323
[58] Field of Search ................. 310/323, 325, 328

[56] References Cited

U.S. PATENT DOCUMENTS

| 4,663,556 | 5/1987 | Kumada | 310/323 X |
| 4,703,214 | 10/1987 | Mishiro | 310/328 |
| 4,705,980 | 11/1987 | Mishiro | 310/323 |
| 4,742,260 | 5/1988 | Shimizu et al. | 310/323 |
| 4,812,697 | 3/1989 | Mishiro | 310/323 |
| 4,947,076 | 8/1990 | Kumada | 310/323 |
| 4,965,482 | 10/1990 | Ohnishi et al. | 310/323 |
| 4,975,614 | 12/1990 | Honda | 310/323 |
| 5,122,700 | 6/1992 | Tamai et al. | 310/323 |
| 5,162,692 | 11/1992 | Fujimura | 310/323 |
| 5,231,325 | 7/1993 | Tamai et al. | 310/323 |
| 5,274,295 | 12/1993 | Tsukimoto et al. | 310/323 |

FOREIGN PATENT DOCUMENTS

| 2-36776 | 3/1990 | Japan . |
| 2-311184 | 3/1990 | Japan . |
| 4-91670 | 3/1992 | Japan . |
| 4-91671 | 3/1992 | Japan . |
| 4-91672 | 3/1992 | Japan . |

Primary Examiner—Mark O. Budd
Attorney, Agent, or Firm—Louis Weinstein

[57] ABSTRACT

The present invention discloses an ultrasonic oscillator including: a plurality of resonators; and an electricity-to-mechanical energy conversion element disposed among a plurality of the resonators and pressed by a fastening member, wherein the ultrasonic oscillator bends and/or oscillates when alternating voltage is applied to the electricity-to-mechanical energy conversion element, and the resonators do not come in contact with the fastening member in a portion adjacent to the end surface of the ultrasonic oscillator.

16 Claims, 58 Drawing Sheets

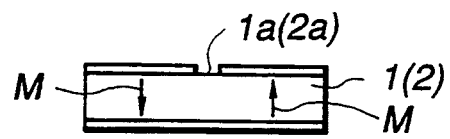
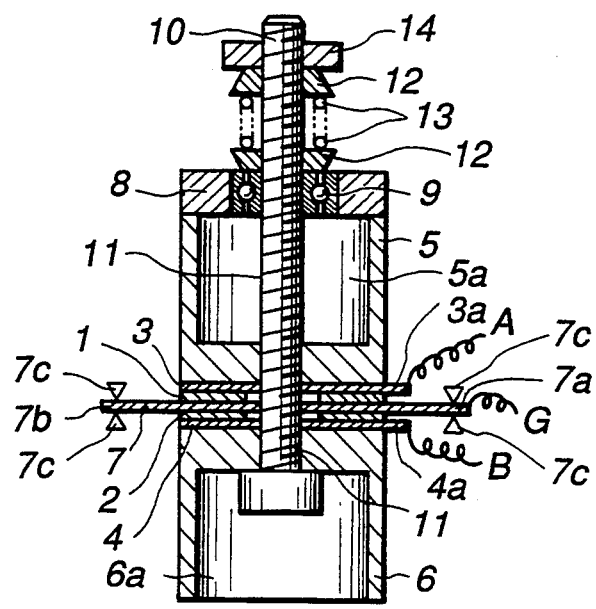
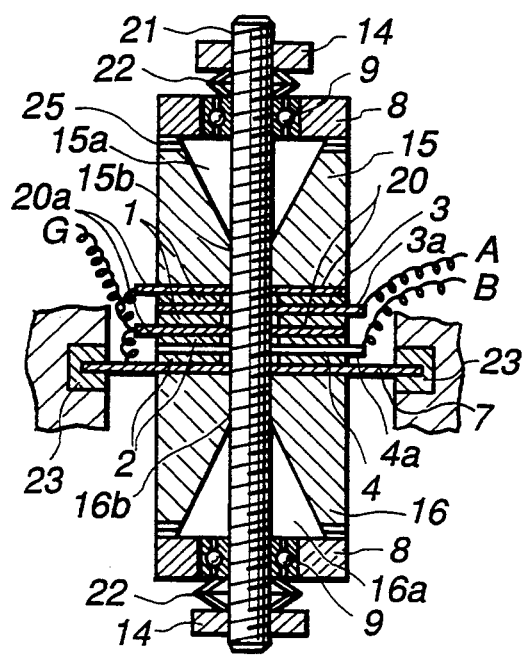

FIG.75
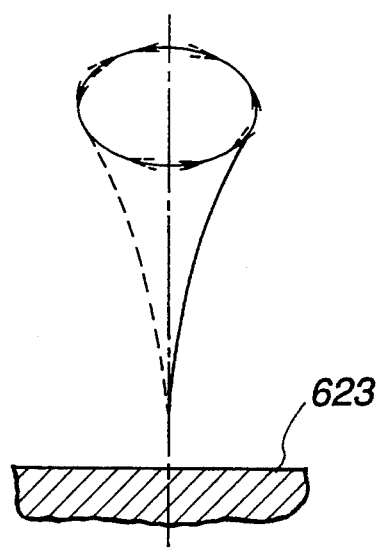
FIG.76     FIG.77
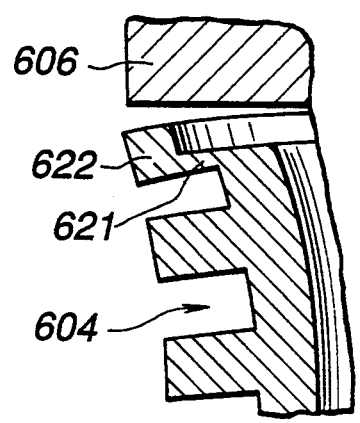 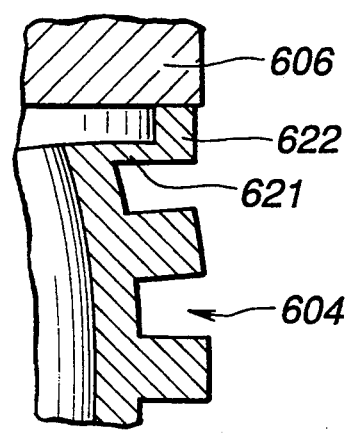

ULTRASONIC OSCILLATOR

BACKGROUND OF THE INVENTION

1. Field of the Invention

The present invention relates to an ultrasonic oscillator, and more particularly to an ultrasonic oscillator for generating ultrasonic oscillations by an electricity-to-mechanical energy conversion element thereof such as a piezoelectric element or an electrostrictive element.

2. Related Art Statement

Hitherto, a variety of ultrasonic oscillators have been suggested. Examples of the ultrasonic oscillators disclosed in Japanese Patent Laid-Open No. 2-36776 are shown in FIGS. 116 and 117.

The ultrasonic oscillator according to the foregoing disclosure is a piezoelectric elliptic motion oscillator having an arrangement that a penetration member 106 is used to penetrate the following members to secure them: a first cylindrical piezoelectric oscillator 101, a second cylindrical piezoelectric oscillator 102, a metal cylinder 103 disposed between the two inner terminative ends of the respective cylindrical piezoelectric oscillators 101 and 102, a second metal cylinder 104 and a third metal cylinder 105 respectively disposed at the outer terminative ends of the piezoelectric oscillators 101 and 102.

The first cylindrical piezoelectric oscillator 101 is polarized at a first boundary plane 107 which bisections the first cylindrical piezoelectric oscillator 101 in a direction along the central axis of the first cylindrical piezoelectric oscillator 101 and a second boundary plane 108 which bisections the same in a direction of the thickness of the first cylindrical piezoelectric oscillator 101, the polarization being so made that the divided sections have opposite polarities in the direction of the thickness.

The second cylindrical piezoelectric oscillator 102 is polarized by a third boundary plane 109 which bisections the second cylindrical piezoelectric oscillator 102 in a direction along its central axis and which makes a certain angle from the first boundary plane 107 and a fourth boundary plane 110 which bisections the same in a direction of the thickness of the second cylindrical piezoelectric oscillator 102. The polarization is so made that the divided sections have opposite polarities in the direction of the thickness. Furthermore, first and second intermediate terminal plates 111 are respectively disposed on the second and the fourth boundary planes 108 and 110. By applying AC voltages having different phases to the intermediate terminal plates 111 while making the first, second and third metal cylinders 103, 104 and 105 to be common earth, elliptic, including circular, motions can be actuated at the two terminative ends of the aforesaid piezoelectric elliptic motion oscillator.

It should be noted that the aforesaid conventional ultrasonic oscillator rotates relative to the central axis thereof while generating linear bending motions as shown in FIGS. 118 to 120. An ultrasonic oscillator of the aforesaid type has the cylindrical piezoelectric oscillators disposed at the nodes of the oscillations and closely secured by a penetration member such as a bolt. Although a large mechanical quality coefficient (hereinafter abbreviated to "mechanical Qm") showing sharpness of the mechanical oscillation in the vicinity of the resonant frequency can be attained, the elliptic motion oscillator easily generates heat because a large electric current flows therein immediately after the operation has been commenced.

The heat generation raises the impedance of the resonant frequency, causing a contrary phenomenon to take place in that the electric current cannot easily flow. As a result, the oscillation amplitude of the oscillator is reduced. Furthermore, the rigidity of the penetration member, which is also oscillated due to the bending oscillations, restricts the bending oscillations, causing the oscillation amplitude to be reduced. As described above, the penetration member used in the conventional structure is able to raise the mechanical Qm of the oscillator but it restricts the heat generation and reduces the oscillation amplitude.

Moreover, if enlargement of the amplitude realized at the time of the resonance is desired, the ultrasonic oscillator disclosed in Japanese Patent Laid-Open No. 2-36776 and constituted as described above encounters a problem in that the size of the oscillator is inevitably enlarged because the amplitude enlargement can be realized by only lengthening the overall length as well as raising the voltage to be applied to the piezoelectric oscillator.

Furthermore, the fact that the bending oscillations are restricted by the rigidity of the bolt serving as the penetration member and that the resonator and the piezoelectric element are tightened and fixed by the bolt and nuts having large contact areas will cause the aforesaid conventional ultrasonic oscillator to have another problem that the oscillation amplitude at the outer peripheral of the end surface is undesirably restricted by the fixing force.

In addition, the boundaries between the piezoelectric elements of the conventional ultrasonic oscillator must be accurately aligned to one another. For example, if the first boundary plane 107 of the first cylindrical piezoelectric oscillator 101 and the third boundary plane 109 of the second cylindrical piezoelectric oscillator 102 shown in FIG. 116 are deviated from each other as designated by reference numerals 101a and 101Fa of FIG. 121, the resonant frequency of the first piezoelectric element group and that of the second piezoelectric element group do not coincide with each other. As a result, a spurious mode (another resonance mode generated in the main resonance mode to be employed) is undesirably generated, causing the mechanical quality coefficient (Qm) of the oscillator to be decreased. Hence, the efficiency of an ultrasonic motor deteriorates and desired strong torque cannot be obtained.

Furthermore, the cost cannot be reduced if the angular difference between the boundary lines of the first piezoelectric element group and the second piezoelectric element group cannot be aligned to each other because the phase difference of the two-phase sine wave voltage of the drive circuit must be varied and adjusted.

It should be noted that the aforesaid conventional ultrasonic oscillator generates the primary mode bending oscillation as shown in FIGS. 118 to 120 and therefore it rotates relative to the central axis thereof.

FIG. 123 is a schematic view of the aforesaid oscillation mode. Hitherto, an ultrasonic oscillator of the aforesaid type has an arrangement that the two ends thereof are used as free ends and two nodes of the oscillation appear at positions 0.224 L from the two ends of the ultrasonic oscillator (L is the overall length of the ultrasonic oscillator), causing the wavelength of the oscillations to be 1.104 L. However, a small size ultrasonic motor of a type having a short overall length encounters a problem in that the operation frequency (resonant frequency) rises excessively, therefore the operation circuit becomes too complicated and heat can easily be generated. In particular, the small size ultrasonic oscillator encounters a problem in that the impedance at the resonant point thereof is raised if the heat is generated and the mechanical Qm is reduced excessively. As a result, the torque will be weakened and the efficiency deteriorates.

The ultrasonic motor has been utilized recently in place of a so-called electromagnetic motor which generates mechanical rotational force by utilizing electromagnetic force. The ultrasonic motor has overcome a problem experienced with the electromagnetic motor in that it rotates at a high speed while generating weak torque and therefore a large quantity of energy is lost in a reducing mechanism thereof. The ultrasonic motor has an electricity-to-mechanical energy conversion element such as a piezoelectric element.

As disclosed in, for example, Japanese Patent Laid-Open No. 2-311184, the ultrasonic motor has an arrangement that an ultrasonic oscillator (stator) is constituted by fixing an elongated plate-like piezoelectric element to the side surface of a cylindrical elastic member, and a rotor serving as a member to be driven, which is pressed by a pressing means, is disposed on the end surface of the ultrasonic oscillator.

When two alternating voltages, the phases of which delay by 90°, are applied to the piezoelectric element of the ultrasonic motor constituted as described above, bending oscillations having two nodes are generated, the bending oscillations being then converted into rotational motion around the axis of the aforesaid elastic member. Then, a point of an end surface of the oscillator comes into point-contact with the rotor, causing the rotor to be rotated. Incidentally, the aforesaid conventional ultrasonic motor has an arrangement that the positions of the two nodes of the oscillations are supported and secured to the case of the motor.

However, the conventional ultrasonic motor of a type for rotating the member to be driven by utilizing the rotation of the bending oscillation has an arrangement that the top surface of an oscillator 141 and a member 142 to be driven come in contact with each other at a point 143 as shown in the contact state shown in FIG. 124. Hence, there arises a problem in that the characteristics (the torque and the rotational speed and the like) are easily affected by a state of the contact point. What is worse, the sole contact point is positioned at the periphery of the end surface of the oscillator (that is, the edge portion), causing the machining accuracy of the edge portion, and more particularly the flatness to affect the performance of the motor. However, it is generally very difficult to improve the machining accuracy.

Since vertical pressure from the pressing means and horizontal frictional force acting due to the load are applied to the sole contact point, the force per unit area at the contact point is enlarged, causing a problem to take place in that the aforesaid edge portion can easily be worn.

On the other hand, an ultrasonic motor disclosed in Japanese Patent Laid-Open No. 4-91670 has a Langevin ultrasonic oscillator to serve as the oscillation generating means. The Langevin ultrasonic oscillator has an oscillator comprising an annular piezoelectric element serving as an electricity-to-thermal energy conversion element and electrodes for applying voltage to the piezoelectric element. The Langevin ultrasonic oscillator is constituted in such a manner that the piezoelectric element is disposed and bonded between the electrode plates. The electrode plate has a voltage application portion constituted by forming a conductive metal thin plate into substantially the same shape as that of the piezoelectric element, the electrode plate having a terminal portion for connecting a lead wire at a terminative end thereof.

Since the voltage application means which uses the conductive metal thin plate can easily be manufactured and satisfactory contact with the piezoelectric element can be established, it has been used widely.

However, the aforesaid conventional ultrasonic motor encounters a problem in that its terminal portion having a small volume inevitably has a large space because the terminal portion of the electrode plate projects over outer periphery of the oscillator. Moreover, in the case where the piezoelectric elements are stacked to form a multilayer, a multiplicity of terminal portions project over the outer periphery of the ultrasonic oscillator, causing a necessity to arise in that a large number of lead wires must be connected to the terminal portions. Hence, a further critical problem of the large space to take place and the wiring process, of course, becomes too complicated. The aforesaid facts are critical problems particularly for small size ultrasonic motors (ultrasonic motors having a diameter of 10 mm or less).

Another technical means has been disclosed in Japanese Patent Laid-Open No. 4-91671, the technical means having an arrangement that a fastening means for fastening each component member of the ultrasonic oscillator comprises a supporting member disposed at one or more terminative ends thereof so as to support the body of the oscillator.

The technical means has an arrangement that the frequency in the specific mode under the boundary conditions of the supporting member is made to be different from the frequency for operating the ultrasonic oscillator. As a result of use of the supporting member thus arranged, a friction loss is prevented because the supporting member is, due to the elastic deformation thereof, enabled to follow the displacement of the oscillator due to oscillations, causing an effect to be obtained in that the efficiency of the motor is improved.

Although the aforesaid conventional supporting method is significantly effective to prevent the friction loss taking place between the supporting member and the fixing member, a problem takes place in that the oscillator cannot be supported stably because the supporting members have elasticity. Another problem takes place in that the supporting member can be broken because stress of bending type ultrasonic oscillations concentrically acts on the supporting member.

Then, the ultrasonic motor disclosed in Japanese Patent Laid-Open No. 4-91672 will now be described.

The ultrasonic motor disclosed as described above has a Langevin ultrasonic oscillator comprising first and second piezoelectric elements arranged to be applied with sine wave voltages having phases delayed by 90° from each other so that bending oscillations are generated around the central axis thereof. The bending oscillations thus generated rotate a movable member disposed on an end surface of the ultrasonic oscillator and serving as a follower member.

The movable member has a groove formed therein in order to efficiently receive the oscillations transmitted from the ultrasonic oscillator. As a result, the state of contact between the ultrasonic oscillator and the movable member is made to be uniform, causing an effect to be obtained in that an undesirable energy loss can be prevented. Therefore, the efficiency of the ultrasonic motor can be improved.

However, the conventional ultrasonic motor thus arranged encounters a problem in that the oscillating energy leaks outwards because the ultrasonic oscillations for operating the movable member undesirably pass through the movable member and the ultrasonic oscillations are transmitted to a supporting shaft or an output receiving means or a means for pressing the movable member.

The outward leak of oscillating energy causes problems to take place in that the output obtainable from the movable member can be reduced, the other component member can be undesirably oscillated and screws for use in fixing the components are loosened.

OBJECTS AND SUMMARY OF THE INVENTION

A first object of the present invention is to provide an ultrasonic oscillator, the heat generation from which can be prevented and the oscillation amplitude of which can be maintained at the largest amplitude.

A second object of the present invention is to provide an ultrasonic oscillator from which a large output can be obtained while reducing the overall size.

A third object of the present invention is to provide an ultrasonic oscillator capable of making the amplitude of the oscillations therefrom to be maximum at the two end surfaces thereof and stably rotating a rotor disposed at the end surface by strong torque.

A fourth object of the present invention is to provide an ultrasonic oscillator capable of easily performing position aligning of the boundary lines of piezoelectric elements thereof and revealing high efficiency and strong torque.

A fifth object of the present invention is to provide an ultrasonic oscillator revealing a low operation frequency, capable of preventing heat generation therefrom and outputting strong torque while maintaining high efficiency.

A sixth object of the present invention is to provide an ultrasonic motor from which stable motor performance can be obtained because an oscillator thereof is assuredly in contact with a member to be driven and in which the contact portion is durable against wear.

A seventh object of the present invention is to provide an ultrasonic motor capable of simplifying the wiring and connecting operations in an ultrasonic oscillator thereof and in which the ultrasonic oscillator can be disposed even in a small space.

An eighth object of the present invention is to provide an ultrasonic motor in which an ultrasonic oscillator thereof is firmly supported while substantially preventing an oscillation loss.

A ninth object of the present invention is to provide an ultrasonic motor capable of restricting undesirable transmission of oscillations from a member to be driven and from which an output can be stably obtained.

According to the present invention, there is provided an ultrasonic oscillator comprising: a plurality of resonators; and an electricity-to-mechanical energy conversion element disposed among a plurality of the resonators and pressed by a fastening member,-wherein the ultrasonic oscillator bends and/or oscillates when alternating voltage is applied to the electricity-to-mechanical energy conversion element, and the resonators do not come in contact with the fastening member in a portion adjacent to the end surface of the ultrasonic oscillator.

These as well as other objects and advantages of the present invention will become further apparent from the following detailed explanation.

BRIEF DESCRIPTION OF THE DRAWINGS

FIG. 2 is a side elevational view which illustrates a piezoelectric element according to the first embodiment;

FIG. 3 is a side elevational cross sectional view which illustrates an ultrasonic motor to which the ultrasonic oscillator according to the first embodiment is adapted;

FIG. 4 is a side elevational cross sectional view which illustrates an ultrasonic motor to which an ultrasonic oscillator according to a second embodiment of the present invention is adapted;

FIG. 75 is a graph which illustrates a state of oscillations of the ultrasonic oscillator according to the fortieth embodiment;

FIG. 76 is an enlarged cross sectional view which illustrates an essential portion of a contact portion between the ultrasonic oscillator and a rotor according to the fortieth embodiment;

FIG. 77 is an enlarged cross sectional view which illustrates an essential portion of a contact portion between the ultrasonic oscillator according to the fortieth embodiment and the rotor;

FIG. 120 is a perspective view which illustrates a state of the operation of the conventional ultrasonic oscillator;

FIG. 121 is a perspective view illustrates a state where boundary lines of the piezoelectric elements shown in FIG. 116 are deviated;

FIG. 122 is a graph which illustrates an impedance curve in the state shown in FIG. 121;

FIG. 123 is a graph which illustrates a state of oscillations of a conventional ultrasonic motor; and FIG. 124 is a side elevational view which illustrates an example of a state of contact between the conventional ultrasonic oscillator and a rotor.

DETAILED DESCRIPTION OF THE PREFERRED EMBODIMENTS

Preferred embodiments of the present invention will now be described with reference to the drawings.

Figure 1:
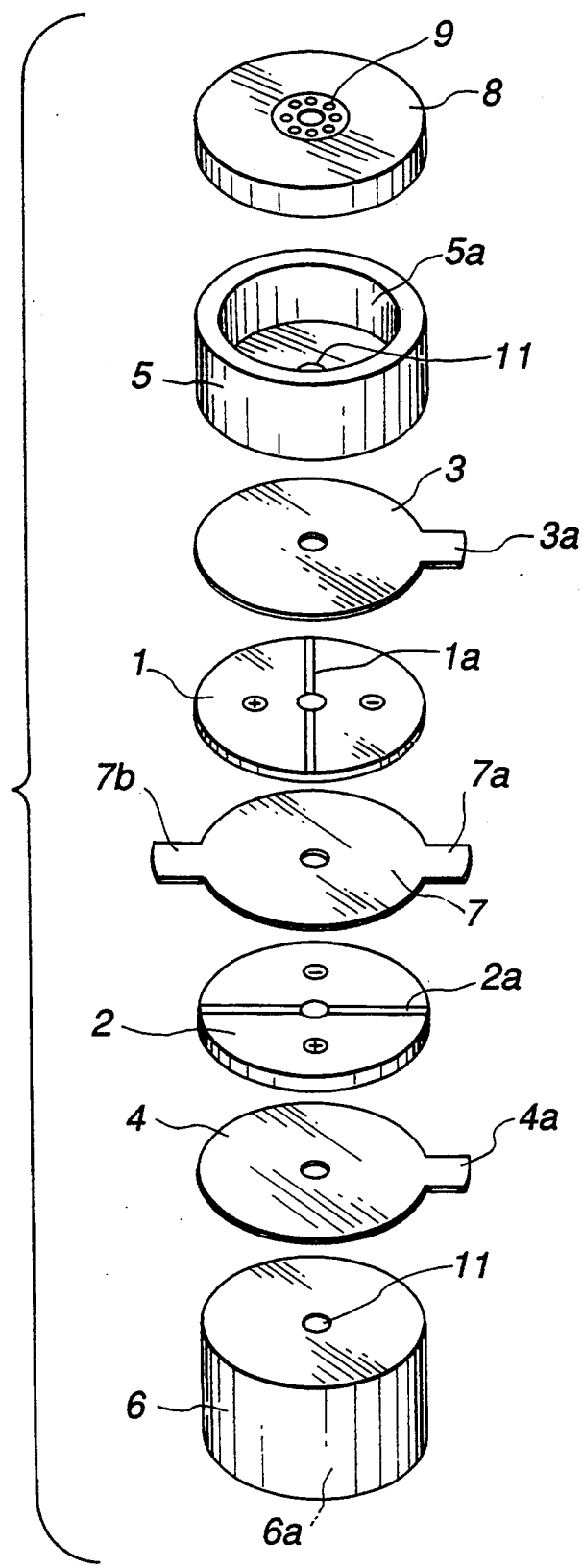
FIG. 1 is an exploded perspective view which illustrates a first embodiment of an ultrasonic oscillator according to the present invention.

FIG. 1 is an exploded perspective view which illustrates an ultrasonic oscillator according to a first embodiment of the present invention.

The ultrasonic oscillator according to the first embodiment comprises first and second piezoelectric elements 1 and 2 each of which is formed into an annular shape and having a thickness of, for example, 2 mm. As shown in FIG. 2, each of the piezoelectric elements 1 and 2 is polarized to have polarization directions M opposing each other and the first and second piezoelectric elements 1 and 2 are divided into two regions. Furthermore, the first and second piezoelectric elements 1 and 2 are so disposed that a first boundary line 1a of the polarized region of the first piezoelectric element 1 and a second boundary line 2a of the second piezoelectric element 2 are deviated from each other by an angular degree of about 90°.

Copper electrode plates 3 and 4 each having a thickness of, for example, 0.1 mm are respectively disposed between the first piezoelectric element 1 and a resonator 5 and between the second piezoelectric element 2 and a resonator 6.

The copper electrode plates 3 and 4 respectively have projections 3a and 4a for soldering lead wires, the projections 3a and 4a being so arranged that terminals A and B (see FIG. 3) are connected thereto. The electrode plates 3 and 4 thus arranged are respectively applied with sine wave voltages which are deviated by a ¼ wavelength from each other and which is in the vicinity of the resonant frequency.

An electrode plate 7 is disposed between the first piezoelectric elements 1 and 2, the electrode plate 7 having two projections 7a and 7b each of which is supported by an external supporting portion 7c (see FIG. 3) at one point thereof in such a manner that the electrode plate 7 is able to swing as desired. Furthermore, a ground terminal G (see FIG. 3) is connected to the projection 7a so that the electrode plate 7 is grounded.

The resonators 5 and 6 have a respective outer surface, the diameter of each of which is the same as that of the first and second piezoelectric elements 1 and 2, the resonators 5 and 6 being made of a material (for example, an aluminum alloy, stainless steel, phosphor bronze, duralmin or a titanium alloy or the like) having excellent oscillation transmissivity. The resonators 5 and 6 according to the first embodiment are made of a material obtained by subjecting an aluminum alloy to an alumite oxalate process. The resonators 5 and 6 respectively have thread portions 11 formed in the internal surfaces of respective central axis holes formed therein and fastened to a fastening member 10 (see FIG. 3). Furthermore, U-shape recesses 5a and 6a are formed in the resonators 5 and 6 in a direction from the two end surfaces (the end surfaces of the resonators 5 and 6) of the ultrasonic oscillator toward the first and the second piezoelectric elements 1 and 2, the resonators 5 and 6 being formed into thin circular shapes adjacent to the two end surfaces. As a result, the top surface of the resonator 5 and the lower end surface of the resonator 6 do not come in contact with the fastening member 10.

The first and second piezoelectric elements 1, 2, the electrode plates 3, 4, 7, and the resonators 5 and 6 are stacked as shown in FIG. 1. Furthermore, an adhesive agent such as an epoxy adhesive agent is applied between the aforesaid component members. The component members are pressed against one another by penetrating the fastening member 10 such as a bolt before the adhesive is hardened so that the ultrasonic oscillator according to the first embodiment is manufactured.

It should be noted that reference numerals 8 and 9 shown in FIG. 1 respectively represent a rotor and a bearing which are pressed by the ultrasonic oscillator according to the first embodiment and which will be described later.

FIG. 3 is a side elevational cross sectional view which illustrates an ultrasonic motor to which the ultrasonic oscillator according to the first embodiment is applied.

The fastening member 10 is extended in a direction of the central axis of the ultrasonic oscillator according to the first embodiment. Furthermore, the rotor 8 including the bearing 9 is pressed and fixed to the end surface of the ultrasonic oscillator by a pressing means. The pressing means according to the first embodiment comprises two truncated conical seating plates 12, a coil spring 13 disposed between the two conical seating plates 12 and a nut 14 with which the quantity of pressing the conical seating plates 12 and the coil spring 13 can be varied. The first embodiment has an arrangement that the rotor 8 is made of SK material so subjected to a heat treatment to have hardness Hv (Vickers Hardness) 650. The contact surface of the rotor 8 with the resonators 5 and 6 subjected to the alumite treatment has a surface roughness of Rmax 0.1 μm.

The operation of the first embodiment will now be described.

When the sine wave voltages deviated from each other by ¼ wavelength are applied to the electrode plates 3 and 4, primary bending oscillations are generated. As a result, elliptic oscillations rotating around the central axis are generated. As a result, the ultrasonic motor, in which the rotor 8 is rotated, can be constituted by pressing, the rotor 8 is pressed against the end surface of the resonator 5. By setting the phase difference of the two sine wave voltages to be about 180°, the direction of the elliptic oscillations generated in the ultrasonic oscillator is inverted. Therefore, the rotor 8 is rotated in the opposite direction.

Assuming an ultrasonic oscillator comprising solid resonators 5 and 6 and having an overall length of L, the node of the primary bending oscillations is present at about 0.224 L from the two end surfaces of the ultrasonic oscillator. Furthermore, the central portion of the ultrasonic oscillator acts as the antinode of the oscillations which shows the maximum amplitude.

However, the first embodiment having the arrangement that the U-shape recesses 5a and 6a are formed in the resonators 5 and 6 in directions from the two end surfaces to prevent the contact with the fastening member 10 in the vicinity of the end surfaces will weaken the rigidity of the resonators in the bending direction. Furthermore, the influence of the rigidity of the fastening member 10 can be minimized, and the position of the node of the oscillations can be allowed to come closer to the central portion of the ultrasonic oscillator, that is, the positions of the first and second piezoelectric elements 1 and 2 so as to maximize the oscillation amplitude at the two end surfaces of the ultrasonic oscillator. Moreover, the reduction of the rigidity will prevent the generation of the friction in the metal which is the material of the resonators 5, 6 and the fastening member 10. As a result, the heating phenomenon can be prevented. Furthermore, the surface areas of the resonators 5 and 6 which are in contact with air can be relatively increased and the radiation effect can be improved.

In addition, the fact that the fastening member 10 is not in contact with the portions in the vicinity of the resonators 5 and 6 will satisfactorily prevent excitation from taking place due to the bending oscillations of the ultrasonic oscillator. As a result, the rotor 8 can always be kept horizontally.

Furthermore, the arrangement made in such a manner that the piezoelectric elements are concentrated to the antinode of the oscillation will facilitates the assembling process in the manufacturing process.

As described above, according to the first embodiment, the maximum amplitude position of the oscillation can be made at the two end surfaces of the ultrasonic oscillator. Therefore, the rotor disposed at the end surface can be efficiently rotated. Furthermore, the arrangement that the components members are closely fixed by the fastening member enable an ultrasonic motor to be realized which exhibits a high mechanical Qm, large force for generating the oscillations and strong torque. In addition, the heat generating phenomenon can be prevented and therefore the impedance realized when the ultrasonic oscillator is operated at the resonant frequency can be maintained at a low level. As a result, an ultrasonic motor, from which a stable oscillation amplitude and rotation can always be obtained, can be obtained.

As a result of an experiment carried out by using an ultrasonic motor having a diameter of φ15 and an overall length of 40 mm, the no-load rotation was 600 rpm and the starting torque was 350 g-cm when a sine wave voltage of 100 VP-P was applied.

A second embodiment of the present invention will now be described.

Figure 5:
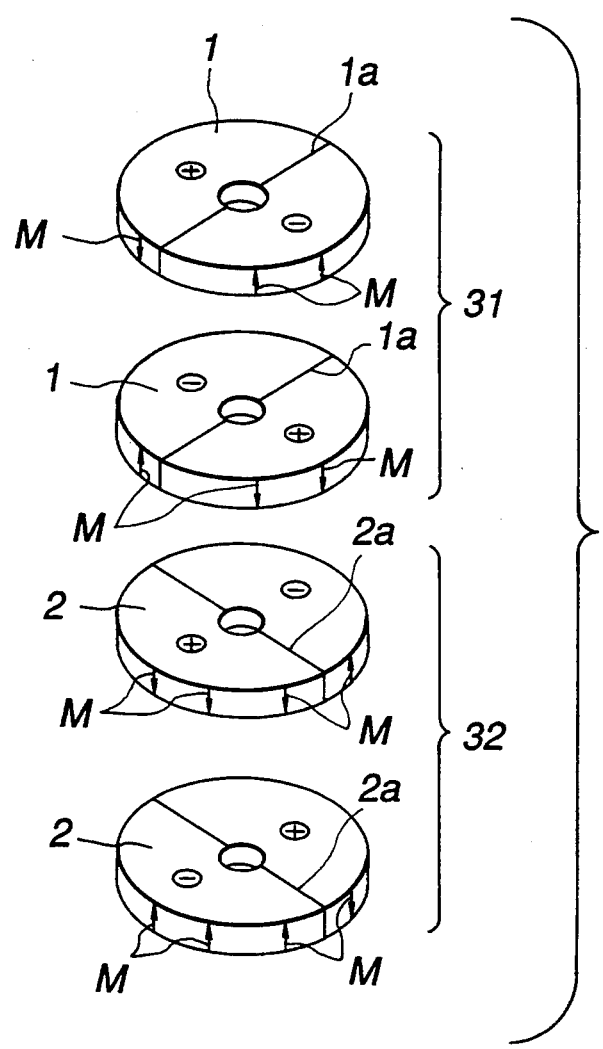
FIG. 5 is an exploded perspective view which illustrates a piezoelectric element group of the ultrasonic oscillator according to the second embodiment.

FIG. 4 is a side elevational cross sectional view which illustrates an ultrasonic motor to which an ultrasonic oscillator according to the second embodiment is applied. FIG. 5 is an exploded perspective view which illustrates a piezoelectric element group for use in the ultrasonic oscillator.

The ultrasonic oscillator according to the second embodiment comprises first and second piezoelectric element groups 31 and 32 each of which is formed into an annular shape and having a thickness of 0.5 mm as shown in FIG. 5. Each of the piezoelectric elements is polarized into two regions to have polarization directions M opposing each other. The piezoelectric element groups 31 and 32 respectively are composed of corresponding two piezoelectric elements 1 and 2 arranged similar to the first embodiment. The piezoelectric element groups 31 and 32 are stacked in such a manner that their polarization directions oppose each other. Furthermore, two boundary lines 1a coincide with each other and two boundary lines 2a coincide with each other. Moreover, the first boundary lines 1a of the first piezoelectric element group 31 and the second boundary lines 2a of the second piezoelectric element group 32 are deviated from each other by an angular degree of about 90°.

Furthermore, copper electrode plates 3 and 4 arranged similar to the first embodiment and each having a thickness of, for example, 50 μm are respectively disposed between the two piezoelectric elements 1 of the first piezoelectric element group 31 and between the two piezoelectric elements 2 of the second piezoelectric element group 3. Sine wave voltages, the wavelengths of which are deviated from each other by ¼ wavelength and the frequencies of which are in the vicinity of the resonant frequency, are applied to the electrode plates 3 and 4 from terminals A and B. Furthermore, copper electrode plates 20 having a thickness of, for example, 0.1 mm are disposed among the first piezoelectric element group 31, the second piezoelectric element group 32 and a resonator 15. Each of the electrode plates 20 has a projection 20a, to which a ground terminal G is connected, so that the ultrasonic oscillator is grounded.

An electrode plate 7 arranged similar to that according to the first embodiment and having two projections 7a and 7b is disposed between the second piezoelectric element group 32 and the resonator 16. The projections 7a and 7b are secured to external portions via absorption members 23 made of rubber or the like.

The resonators 15 and 16 are respectively made of a material (for example, an aluminum alloy, stainless steel, phosphor bronze, duralmin or a titanium alloy or the like) having excellent oscillation transmissivity similar to the first embodiment. The resonators 15 and 16 have thread portions 15b and 16b formed in the internal surfaces of the central axis holes thereof, the thread portions 15b and 16b being fastened to a fastening member 21. Furthermore, the resonators 15 and 16 have conical recesses 15a and 16a formed from the two end surfaces of the ultrasonic oscillator, That is, the conical recesses 15a and 16a are formed in directions from the end surfaces of the resonators 15 and 16 toward the first and second piezoelectric element groups 31 and 32. Therefore, the contact of the end surfaces of the resonators with the fastening member 21 can be prevented.

A rotor 8 is disposed above the resonator 15 while interposing a sliding member 25 having the same shape as that of the resonator 15 and made of silicon carbide ceramics (SIC). The sliding member 25 is bonded to both of the resonator 15 and the rotor 8.

An adhesive agent such as an epoxy adhesive agent is applied to the first piezoelectric element group 31, a second piezoelectric element group 32, the electrode plates 3, 4, 7, the resonators 15 and 16. Then, their central portions are penetrated by the fastening member 21 such as a screw to press the component members. Then, the adhesive agent is hardened so that the ultrasonic oscillator according to the second embodiment is constituted.

The fastening member 21 extends in the direction of the central axis of the ultrasonic oscillator according to the second embodiment. As a result, the rotor 8 including a bearing 9 is pressed and secured to the two end surfaces of the ultrasonic oscillator by a pressure means. The second embodiment comprises the pressing means having an arrangement such that two belleville springs 22 are stacked so that their two conical openings face each other. As a result, the quantity of pressurization can be varied by a nut 14.

Since the operation of the second embodiment having the foregoing arrangement is similar to the first embodiment, its description is omitted here.

Since elliptic oscillations rotating in the same direction are generated at the two end surfaces of the ultrasonic oscillator according to the second embodiment, the fastening member 21 is extended toward the two end surfaces and the rotor 8 is disposed on each of the two end surfaces. As a result, two output taking out portions are formed. The structure for preventing the contact between the portions adjacent to the resonators 15, 16 and the fastening member 21 is constituted by the conical recesses 15a and 16a respectively formed from the two end surfaces of the resonators 15 and 16 to the first and the second piezoelectric element groups 31 and 32. Therefore, the maximum amplitude can be generated at the end surface of the ultrasonic oscillator and the heat generation can be prevented similar to the first embodiment.

Furthermore, the arrangement that the electrode plate 7 also serving as a supporting plate is secured to an external portion by a rubber absorbing member or the like, further improves the efficiency of the bending oscillation of the ultrasonic oscillator. Therefore, damping of the oscillation due to supporting can be satisfactorily prevented.

As described above, the SiC (silicon carbide ceramics) sliding members 25 are disposed between the rotor 8 and the two resonators 15 and 16. A fear of the wear of same type materials taken place due to their excessively large frictional force can be eliminated in the arrangement of this embodiment in which SiC is used, resulting in excellent sliding characteristics. Furthermore, use of ceramics enables high oscillation transmittance efficiency to be obtained and strong torque can easily be generated. In addition, the arrangement of the second embodiment that four piezoelectric elements are used enables strong torque to be generated as compared with the first embodiment.

A third embodiment of the present invention will now be described.

Figure 6:
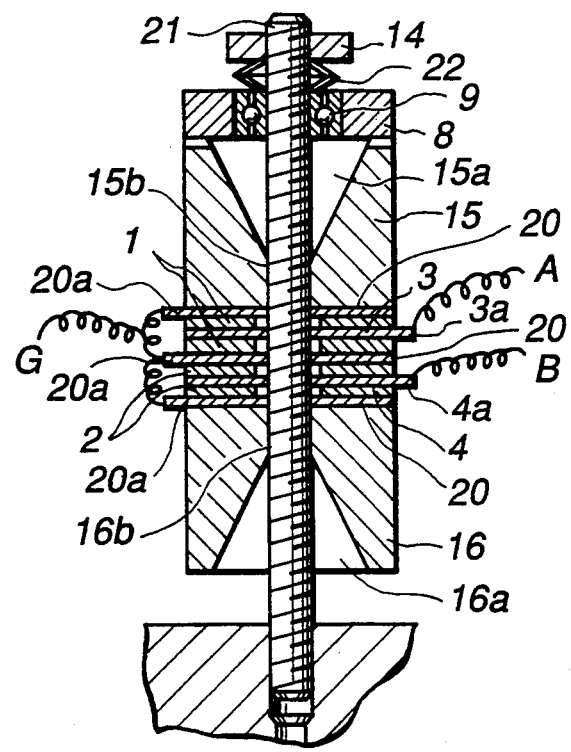
FIG. 6 is a side elevational cross sectional view which illustrates an ultrasonic motor to which an ultrasonic oscillator according to a third embodiment of the present invention is adapted.

FIG. 6 is a side elevational cross sectional view which illustrates an ultrasonic motor to which an ultrasonic oscillator according to the third embodiment is adapted.

The ultrasonic oscillator according to the third embodiment has a structure for supporting the ultrasonic oscillator arranged as follows: the fastening member 21 (see FIG. 4) according to the second embodiment is further extended in the direction of the central axis; the rotor 8 is disposed on either of the fastening members 21 by using a pressing means similar to that according to the second embodiment; and the residual fastening member 21 is used to be secured to the external portion.

The third embodiment constituted as described above enables the ultrasonic oscillator to be reliably secured without restriction of the bending oscillation by supporting the ultrasonic oscillator by the fastening member 21 disposed on the central axis. If the ultrasonic oscillator has a solid resonator, the fastening member also generates the bending oscillations and is strongly excited. Therefore, if the fastening member is extended to be secured to the external portion, excessive damping of the oscillation takes place and the oscillation amplitude is reduced. Also in a case where a rotor is disposed, the fastening member is tilted in the direction of the bending oscillation. Hence, the rotor cannot be kept horizontally, causing the output to be reduced.

However, the ultrasonic oscillator according to the third embodiment having the arrangement that the portions in the vicinity of the end surfaces of the resonators 15 and 16 are not in contact with the fastening member 21 enables the bending oscillation to be generated in the fastening member 21 to be weakened. Therefore, damping of the oscillations of the overall body of the ultrasonic oscillator can be reduced even if it is fastened to the external portion. Furthermore, the rotor 8 can be kept horizontally and only the ultrasonic oscillator performs the primary bending oscillation operation to generate an oscillation mode rotating around the central axis. The third embodiment further enables another effect to be obtained in that the shapes of the electrode plates can be made to be the same.

Therefore, the ultrasonic oscillator according to the third embodiment thus constituted enables an effect to be obtained in that the ultrasonic oscillator can be supported by a very simply structure. That is, the absorbing member and the supporting plate according to the first and second embodiments and disposed at the positions at which the ultrasonic oscillator is secured to the external portion can be omitted from the structure. Furthermore, common use of components can be promoted, causing the cost of the components and the manufacturing cost to be reduced.

An ultrasonic oscillation according to a fourth embodiment of the present invention will now be described.

Figure 7:
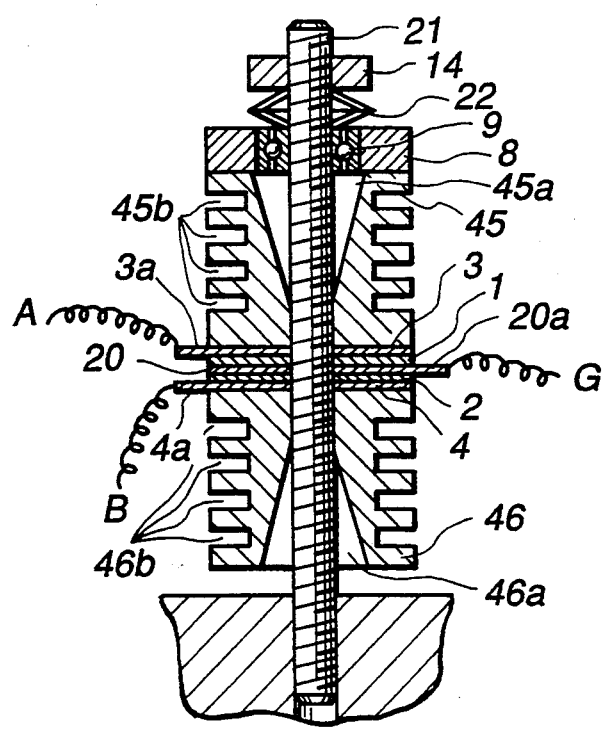
FIG. 7 is a side elevational cross sectional view which illustrates an ultrasonic motor to which an ultrasonic oscillator according to a fourth embodiment of the present invention is adapted.

FIG. 7 is a side elevational cross sectional view which illustrates an ultrasonic motor to which the ultrasonic oscillator according to the fourth embodiment is adapted.

Figure 8:
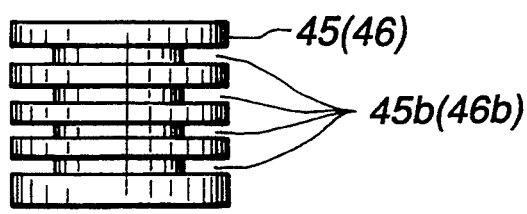
FIG. 8 is a side elevational view which illustrates a resonator according to the fourth embodiment.

The ultrasonic oscillator according to the fourth embodiment has the same structure and operates similar to the third embodiment except for the following arrangement that: the resonators 15 and 16 of the ultrasonic oscillator according to the third embodiment are replaced by resonators 45 and 46 arranged as shown in FIG. 8; and the piezoelectric element and the electrode group are simplified.

The resonators 45 and 46 have a plurality of, for example, four grooves 45b and 46b in the outer surfaces thereof, the four grooves 45b and 46b being formed into concentric circles to the outer surfaces arranged in a direction from the outer surfaces to the central axis. The grooves 45b and 46b are formed so that they do not penetrate the conical recesses 45a and 46a formed in the resonators 45 and 46. The resonators 45 and 46 according to the fourth embodiment are made of aluminum alloy applied with an alumire sulfate treatment. The rotor 8 is made of SUS440C and applied with a heat treatment Hv 700.

As described above, the ultrasonic oscillator according to the fourth embodiment thus arranged has a plurality of the grooves 45b and 46b formed in the outer surfaces of the resonators 45 and 46. Therefore, the rigidity in the bending direction is weakened, causing the ultrasonic oscillator to be strongly bent. As a result, the oscillation amplitude at the end surface can be further enlarged.

Figure 9:
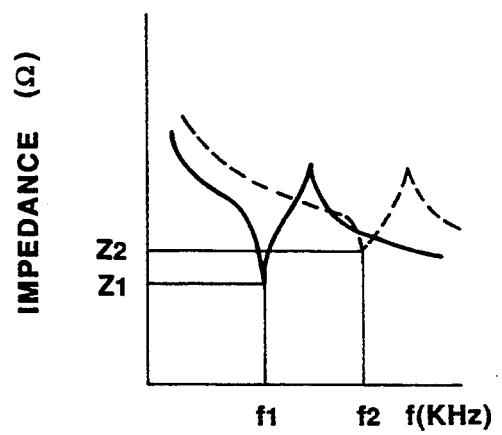
FIG. 9 is a graph which illustrates the impedance characteristics of the ultrasonic oscillator according to the fourth embodiment and those of the conventional ultrasonic oscillator.

An ultrasonic oscillator having a diameter of 10 mm and a length of 12 mm and arranged to have the four grooves 45b and 46b formed in the resonators 45 and 46, and another ultrasonic oscillator having the same dimension but having no grooves were subjected to experiments to measure the impedance values. FIG. 9 is a graph which illustrates impedance curves obtained from the result of the impedance values.

Referring to FIG. 9, continuous lines shows impedance characteristics of the ultrasonic oscillator according to the fourth embodiment and having the grooves 45b and 46b. The resonant frequency f1 and the impedance Z1 are respectively expressed as follows:

$$f1 = 76 \text{ KHz}$$

$$Z1 = 112 \text{ } \Omega$$

The resonant frequency f2 and the impedance Z2 of the ultrasonic oscillator having no groove are respectively expressed as follows:

$$f2 = 102 \text{ KHz}$$

$$Z2 = 311 \text{ } \Omega$$

That is, the arrangement that the grooves 45b and 46b are formed in the outer surfaces of the resonators 45 and 46 enables the resonant frequency to be lowered, and the impedance to be reduced. Namely, if a small-size ultrasonic oscillator is constituted, the wavelength becomes short and the resonant frequency is raised excessively. However, the operational frequency can be lowered by forming the grooves on the outer surfaces of the resonators as described above. Although the mechanical Qm of a small-size ultrasonic oscillator cannot be enlarged due to volume reduction of the piezoelectric element, the formed grooves enable the impedance in a resonant state to be lowered. Furthermore, the mechanical Qm can be increased and the oscillation amplitude at the end surface is enlarged significantly. As a result, strong torque can be generated. Furthermore, the radiation effect can be improved.

A modification of the fourth embodiment will now be described.

FIGS. 10 to 15 are side elevational views and perspective views which illustrate fifth to ninth embodiments of the present invention. The fifth to ninth embodiments are modifications of the resonators according to the fourth embodiment.

Figure 10:
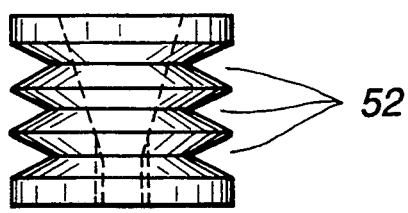
FIG. 10 is a side elevational view which illustrates a fifth embodiment of an ultrasonic oscillator according to the present invention.

The fifth embodiment shown in FIG. 10 has an arrangement that the grooves 45b and 46b of the resonators 45 and 46 according to the fourth embodiment are replaced by V-grooves 52. The fifth embodiment is operated similarly to the fourth embodiment and has similar spring characteristics.

Figure 11:
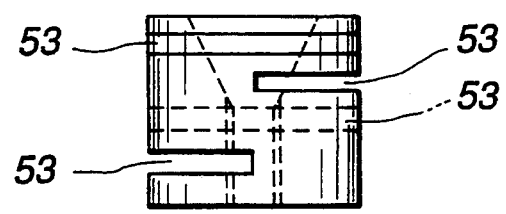
FIG. 11 is a side elevational view which illustrates a sixth embodiment of an ultrasonic oscillator according to the present Invention.
Figure 12:
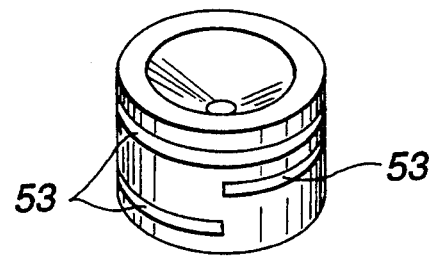
FIG. 12 is a perspective view which illustrates the sixth embodiment of the ultrasonic oscillator according to the present invention.

The sixth embodiment, the side elevational view of which is shown in FIG. 11 and and the upper perspective view of which is shown in FIG. 12 has cut grooves 53 formed on the outer surfaces of the resonators 45 and 46 according to the fourth embodiment, the cut grooves being formed in a direction from the outer surface toward the central axis to traverse the central axis. As a result, the resonator attains spring characteristics.

Figure 13:
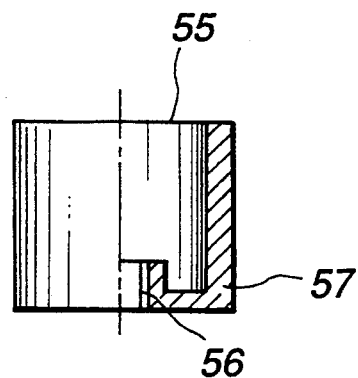
FIG. 13 is a side elevational view which illustrates a seventh embodiment of an ultrasonic oscillator according to the present invention.

The seventh embodiment shown in FIG. 13 has an arrangement that a bore is formed from the end surface of each of resonators 45 and 46 according to the fourth embodiment. Furthermore, a thin flange is formed between a fastening portion 56 of the fastening member and the outer side surface of each of the resonators 45 and 46.

Figure 14:
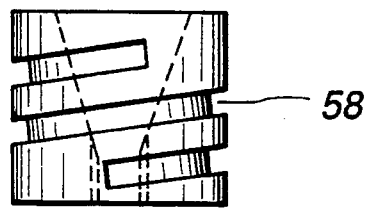
FIG. 14 is a side elevational view which illustrates an eighth embodiment of an ultrasonic oscillator according to the present invention.

The eighth embodiment shown in FIG. 14 has an arrangement that a spiral groove 58 is formed in each outer surface of the resonators 45 and 46 according to the fourth embodiment. As a result, the resonators 45 and 46 attain the spring characteristics.

Figure 15:
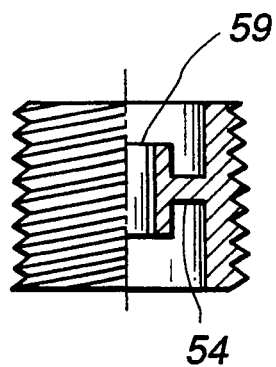
FIG. 15 is a side elevational view which illustrates a ninth embodiment of an ultrasonic oscillator according to the present invention.

The ninth embodiment shown in FIG. 15 has an arrangement that thread grooves are formed in the outer surfaces of the resonators 45 and 46 according to the fourth embodiment to have the spring characteristics. The technical means according to the ninth embodiment can be adapted to the seventh embodiment shown in FIG. 13. Also the ninth embodiment has a fastening portion 59 and a flange 54 arranged similarly to those according to the seventh embodiment.

It is most effective to use the spring structure to enlarge the mechanical Qm by using a metal member. The foregoing embodiments are arranged to skillfully use the effect of enlarging the mechanical Qm realized by the spring structure. The mechanical Qm of the ultrasonic oscillator and the oscillation amplitude can be further enlarged, and strong torque can be obtained.

A tenth embodiment of the present invention will now be described.

Figure 16:
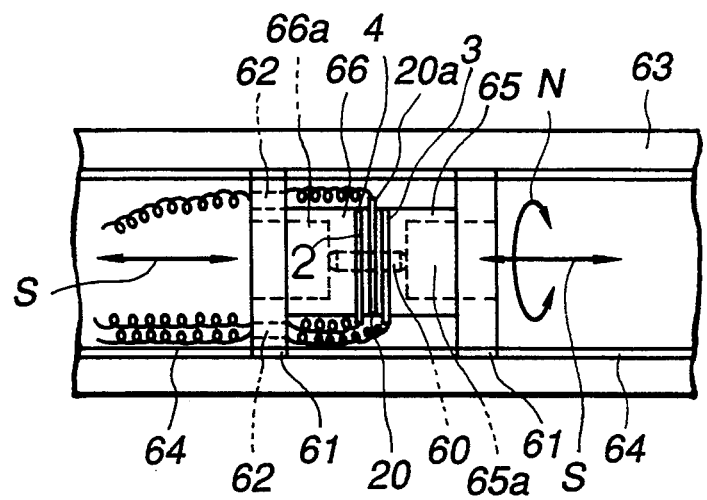
FIG. 16 is a side elevational view which illustrates an ultrasonic motor to which an ultrasonic oscillator according to a tenth embodiment of the present invention is adapted.

FIG. 16 is a side elevational view which illustrates an ultrasonic motor to which an ultrasonic oscillator according to the tenth embodiment is adapted.

The tenth embodiment comprises a first piezoelectric element 1 and a second piezoelectric element 2 each of which is formed into an annular shape having a thickness of, for example, 2 mm. Furthermore, copper electrodes 3, 4 and 20 each having a thickness of, for example, 0.1 mm are respectively disposed between the first piezoelectric element 1 and a resonator 65, between the second piezoelectric element 2 and a resonator 66, and between the first piezoelectric element 1 and the second piezoelectric element 2. The resonators 65 and 66 are made of a material (for example, an aluminum alloy, stainless steel, phosphor bronze, duralmin or a titanium alloy or the like) having excellent oscillation transmissivity. The resonators 65 and 66 according to this embodiment are made of a material obtained by subjecting an aluminum alloy to an alumite oxalate process.

Each of the resonators 65 and 66 has a thread portion so formed in the inner surface of the central axis hole thereof as to be engaged with a fastening member 60.

Furthermore, U-shaped recesses 65a and 66a for formed in a direction from the two end surfaces of the resonators 65 and 66 toward the piezoelectric elements 1 and 2 in order to prevent the fact that the end surfaces of the resonators 65 and 66 come in contact with the fastening member 60. The resonators 65 and 66 are formed into circular shapes each having a reduced thickness in the vicinity of the end surfaces thereof. Furthermore, the two resonators 65 and 66 have flanges at the end portions thereof to have diameters larger than those of the piezoelectric elements 1 and 2. The flanges have male threads formed in the outer surfaces thereof. In addition, a through hole 62, through which a lead wire passes, is formed in a portion of the male thread 61 of the resonator 66.

The first and second piezoelectric elements 1 and 2, electrode plates 3, 4 and 20 and the resonators 65 and 66 are stacked. Then, an epoxy adhesive agent or the like is applied to the portions among the foregoing elements, and the flushthread type fastening member 60 is used to penetrate and press the elements. Then, the adhesive agent is hardened so that the ultrasonic oscillator according to the tenth embodiment is constituted.

The male thread 61 is so arranged as to be received by a female thread 64 formed in the inner surface of a cylindrical pipe 63. The electrode plates 3, 4 and 20 are applied with a sine wave voltage in the neighborhood of the resonant frequency. It should be noted that the electrode 20 is grounded.

When the sine wave voltage is applied to the foregoing ultrasonic oscillator according to the tenth embodiment, primary bending oscillations are generated in the ultrasonic oscillator and the ultrasonic oscillator is rotated in a direction designated by an arrow N shown in FIG. 16 relative to the central axis. As a result of the rotations, the ultrasonic oscillator is, while being rotated, moved straight in a direction designated by an arrow S shown in FIG. 16 while being guided by the male threads 61 of the resonators 65 and 66 and the female thread 64 of the cylindrical pipe 63. If the phase of the sine wave voltage is shifted by about 180°, the ultrasonic oscillator is moved straight in an opposite direction in the cylindrical pipe 63.

The ultrasonic oscillator according to the tenth embodiment enables a linear type ultrasonic motor to be realized.

Figure 17:
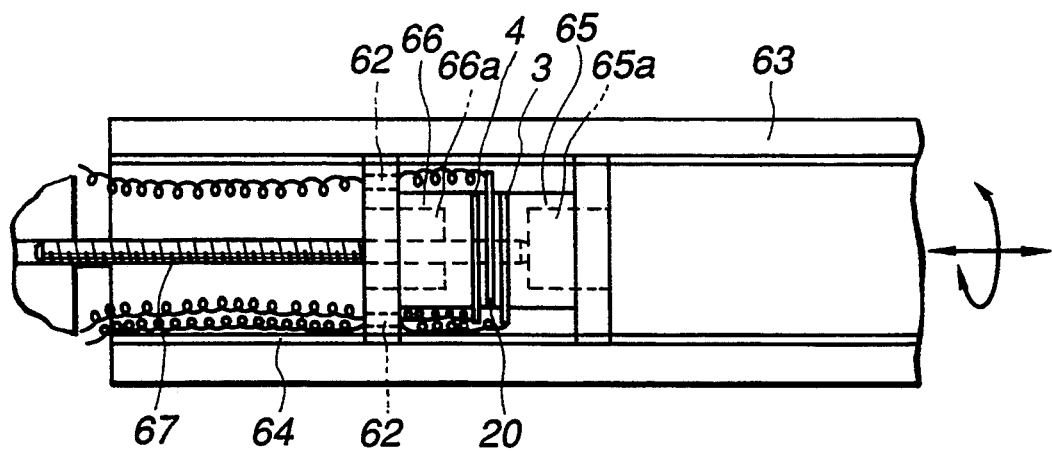
FIG. 17 is a side elevational view which illustrates an ultrasonic motor to which an ultrasonic oscillator according to an eleventh embodiment of the present invention is adapted.

If the ultrasonic oscillator is secured to an external portion by a fastening member 67 like an eleventh embodiment of the present invention shown in FIG. 17, the cylindrical pipe 63 moves straight in two opposing directions while being rotated.

As described above, this embodiment enables an ultrasonic oscillator to be provided in which heat generation can be restricted and the oscillation amplitude can be made largest at the two end surfaces, and which is able to stably rotate the rotor disposed adjacent to the end surface by strong torque.

Figure 18:
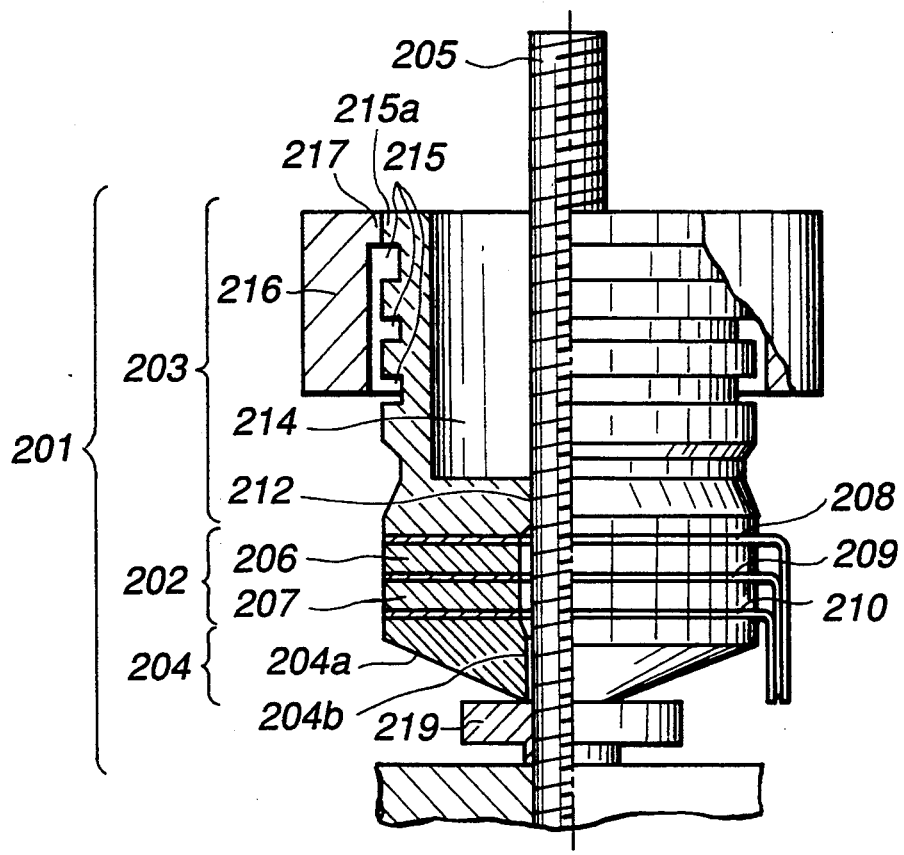
FIG. 18 is a side elevational view which illustrates the cross section of a left half portion of an ultrasonic oscillator according to a twelfth embodiment of the present invention.
Figure 19:
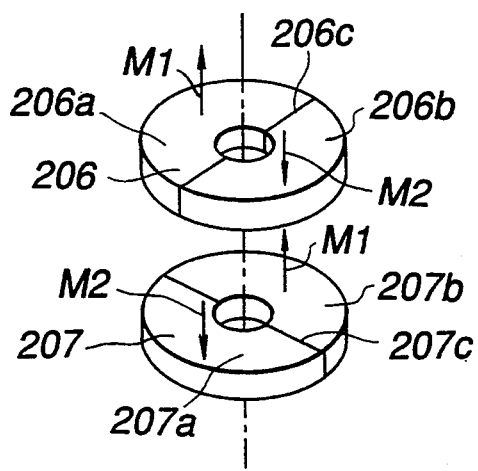
FIG. 19 is an enlarged perspective view which illustrates a first and a second piezoelectric element of the ultrasonic oscillator according to the twelfth embodiment while taking them out.

FIG. 18 illustrates a twelfth embodiment of the present invention.

An ultrasonic oscillator 201 has the essential portion constituted by causing a fastening member 205 to penetrate and join an oscillator 202 for generating original oscillations, an upper resonator 203 disposed on the upper end surface of the oscillator 202, and a lower resonator 204 disposed below the lower end surface of the same.

The oscillator 202 has a first piezoelectric element 206 and a second piezoelectric element 207 stacked in the direction of the thickness thereof, the first and second piezoelectric elements 206 and 207 being formed into annular shapes. The piezoelectric elements 206 and 207 respectively are divided into semicircular polarized regions 206a and 206b and regions 207a and 207b. The piezoelectric elements 206 and 207 are disposed in such a manner that a boundary line 206c of the polarized regions of the piezoelectric element 206 and a boundary line 207c of the polarized regions of the piezoelectric element 207 are deviated from each other by an angular degree of 90°. Furthermore, the polarizing direction of the polarizing region 206a and that of 206b are arranged to oppose each other. For example, the region 206a is polarized upwards (as designated by an arrow M1) and the region 206b is polarized downwards (as designated by an arrow M2). Also the piezoelectric element 207 is arranged in such a manner that the region 207a is polarized downwards (as designated by an arrow M2) and the region 207b is polarized upwards (as designated by an arrow M1).

Furthermore, conductive copper electrodes 208 and 210 are respectively interposed between the first piezoelectric element 206 and the upper resonator 203 and between the second piezoelectric element 207 and the lower resonator 204. The electrode plates 208 and 210 are each arranged to be applied with sine wave voltage in the neighborhood of the resonant frequency and having phases deviated by an angular degree of 90°. An electrode plate 209 is interposed between the first piezoelectric element 206 and the second piezoelectric element 207, the electrode plate 209 being connected to a grounding terminal so as to be grounded.

The upper resonator 203 is formed into a short cylindrical shape having an outer diameter which is the same as that of the oscillator 202. The upper resonator 203 has a central axis hole 212 formed in the base portion thereof adjacent to the oscillator 202. The central axis hole 212 has a female thread formed in the inner surface thereof so as to be engaged with a fastening member 205 serving as a support shaft. Furthermore, a U-shaped recess 214 is formed in a direction from the top surface of the upper resonator 203 toward the lower oscillator 202 so that the inner portion of the upper resonator 203 does not come in contact with the fastening member 205. In addition, the upper resonator 203 has a plurality of peripheral grooves formed in the outer surface thereof at the same intervals in order to weaken the rigidity.

An additional mass-effecting member 216 having a relatively large thickness and formed into a short cylindrical shape is individually disposed adjacent to the upper portion of the peripheral surface of the upper resonator 203. A securing projection 217 facing inside is disposed at the top end portion of the inner surface of the additional mass-effecting member 216. The securing projection 217 is bonded and secured to a projection 215a disposed at the uppermost position of a plurality of projections formed by the foregoing peripheral grooves 215. As a result, the additional mass-effecting member 215 does not come in contact with the upper resonator 203 except for the bonded and secured portion.

The lower resonator 204 disposed adjacent to the lower end surface of the oscillator 202 has a downward taper 204a formed on the outer surface of the lower portion thereof. The lower end portion of the taper 204 is arranged to be in linear-contact with a pressing nut 219. It should be noted that a central axis hole 204b formed in the lower resonator 204 has a diameter slightly larger than that of the fastening member 205. As a result, the lower resonator 204 does not come in direct contact with the fastening member 205.

The upper and lower resonators 203 and 204 are made of a material such as an aluminum alloy, stainless steel, phosphor bronze, duralmin or a titanium alloy or the like having excellent oscillation transmissivity. This embodiment has an arrangement that the upper and lower resonators 203 and 204 are made of aluminum alloy subjected to an alumite sulfate treatment followed by steam sealing. As a result of the steam sealing treatment, the holes in the surface of the alumite are filled with hydrate. Therefore, the alumite film is strengthened to prevent the separation and peeling of the alumite and significantly reduce wear.

The ultrasonic oscillator 201 comprising the oscillator 202 and the upper resonators 203 and 204 are assembled as follows: first an epoxy adhesive agent is applied to each of the component elements, and the first piezoelectric element 206, the second piezoelectric element 207, the electrode plates 208, 209 and 210 and the lower resonator 204 are penetrated by the fastening member 205. Then, the upper resonator 203 is driven into the fastening member 205 from an upper portion, while the pressing nut 219 is received by the fastening member 205 from a lower portion. Furthermore, the piezoelectric elements 206, 207, the electrode plates 208, 209, 210 and the lower resonator 204 are interposed and pressed between the upper resonator 203 and the pressing nut 219. Then, the adhesive agent is hardened so that the ultrasonic oscillator 201 is constituted.

Figure 21:
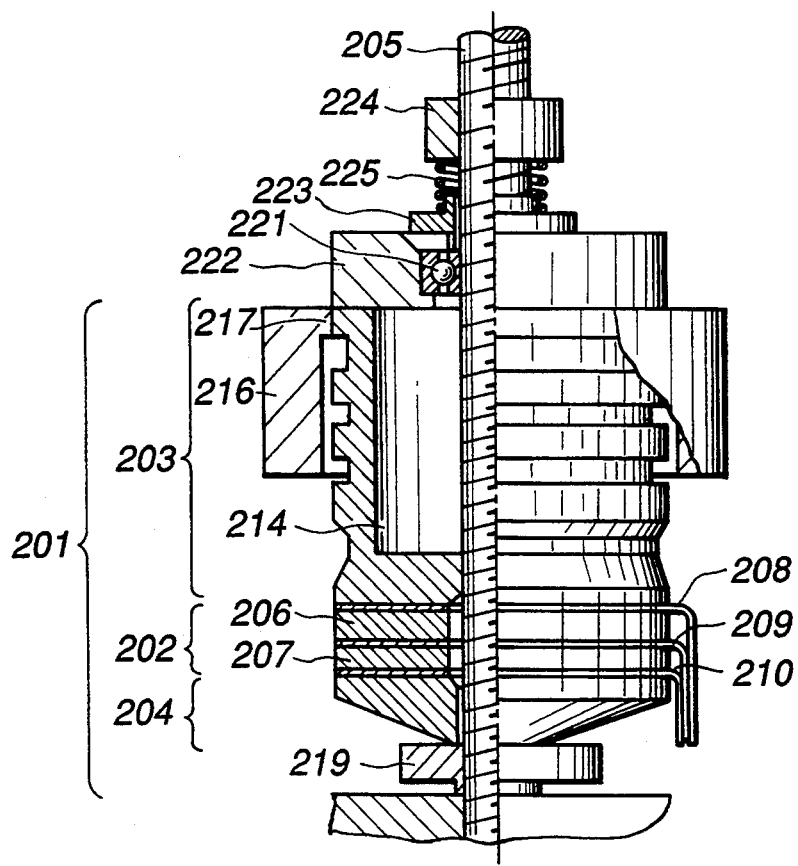
FIG. 21 is a side elevational view which illustrates the cross section of a left half portion of an ultrasonic motor constituted by using an ultrasonic oscillator according to a thirteenth embodiment of the present invention.

An ultrasonic motor constituted by using the ultrasonic oscillator thus arranged is shown in FIG. 21.

The fastening member 205 is extended to the upper portion of the central axis of the ultrasonic oscillator 201. Furthermore, a rotor 222 fastened to the fastening member 205 while interposing a bearing 221 is pressed against the top surface of the ultrasonic oscillator 201 by a pressing means. The pressing means according to the twelfth embodiment is constituted in such a manner that a spring mounting 223 is placed on the bearing 221, and a coil spring 225 is interposed between the spring mounting 223 and a nut 224. As a result, the quantity of the pressurization can be varied by the nut 224.

The twelfth embodiment has an arrangement that the rotor 222 is made of SK material subjected to a heat treatment to have hardness of Hv 650. The contact surface with the upper resonator 203 subjected to the alumite treatment is made to a surface roughness of Rmax 0.5 μm or less.

The operation of the ultrasonic motor having the ultrasonic oscillator according to the twelfth embodiment will now be described.

Figure 20:
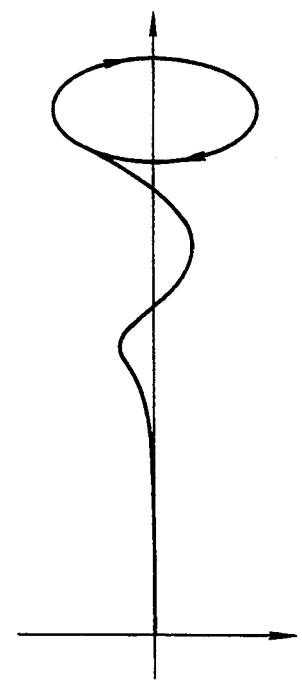
FIG. 20 is a graph which illustrates an oscillation mode of the ultrasonic oscillator according to the twelfth embodiment.

When sine wave voltages having the phases deviated from each other by an angular degree of 90° are applied to the upper and lower electrode plates 208 and 210, bending oscillations are generated which have the node at the lower end portion and the antinode at the top surface of the ultrasonic oscillator 201. The reason for this that the lower end portion of the ultrasonic oscillator 201 is the fixed end. The bending oscillations thus generated are elliptic oscillations including a circle rotating around the central axis of the oscillator as shown in FIG. 20. The reason for this is that the first piezoelectric element 206 and the second piezoelectric element 207 are disposed while being deviated from each other by an angular degree of 90° with respect to the boundary lines of the electrodes.

The elliptic oscillations are amplified by the upper resonator 203 while being further enhanced due to moment of inertia of the additional mass-effecting member 216 because the additional mass-effecting member 216 is fastened to the upper resonator 203. The elliptic oscillations of the upper resonator 203 thus amplified rotate the rotor 222 pressed against the ultrasonic oscillator 201.

If the phase difference between the sine wave voltages to be applied to the electrode plates 208 and 210 is further deviated by an angular degree of 180° to make the phase difference between the sine wave voltages to be 270°, the rotational direction of the elliptic oscillations generated in the ultrasonic oscillator 201 is inverted. As a result, the rotor can be rotated in the opposite direction.

With the twelfth embodiment thus arranged, the additional mass-effecting member 216 is fastened so that the resonant frequency is lowered with respect to the elliptic oscillations generated at the end surface of the upper resonator 203. Therefore, the mechanical impedance at the time of the resonance can be lowered, causing the efficiency of the ultrasonic oscillator 201 to be improved. Since the additional mass-effecting member 216 is individually formed from the upper resonator 203, the additional mass-effecting member 216 and the upper resonator 203 can be freely machined. As a result, the ultrasonic oscillator 201 having a compact size can be manufactured.

Figure 22:
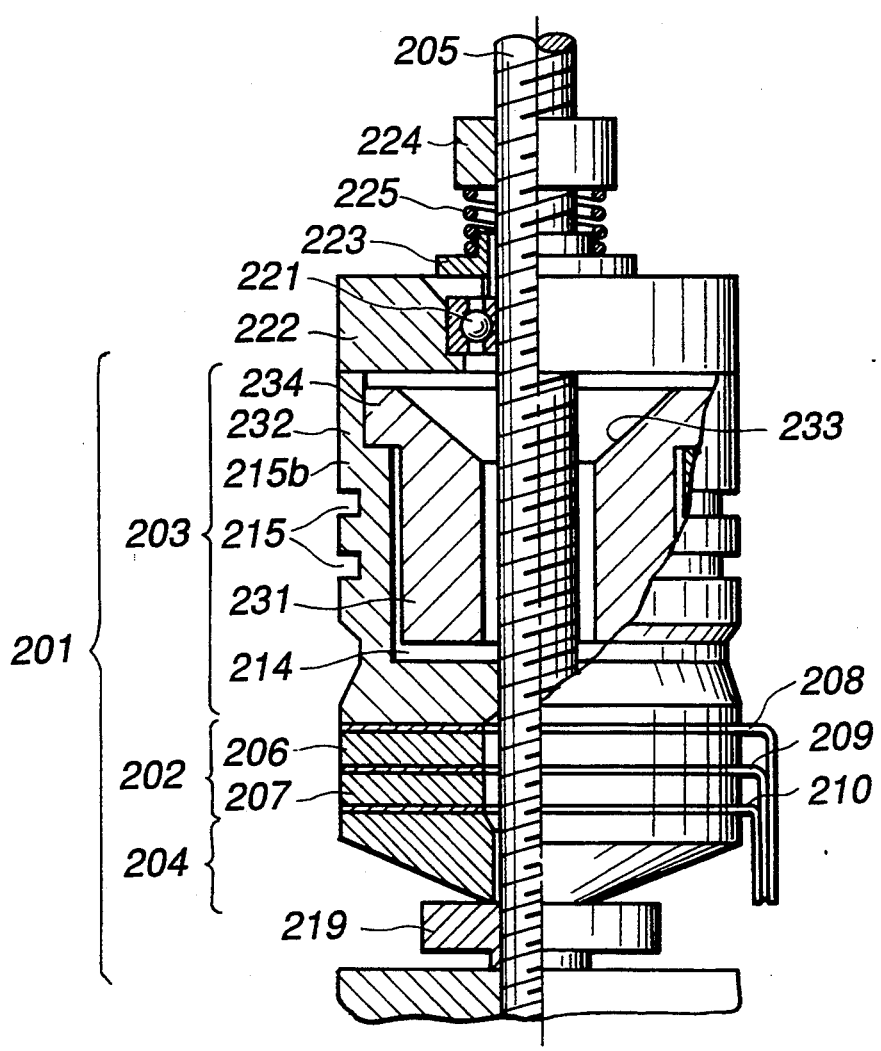
FIG. 22 is a side elevational view which illustrates the cross section of the left half portion of an ultrasonic motor which is constituted by using an ultrasonic oscillator according to a thirteenth embodiment of the present invention.

FIG. 22 illustrates a thirteenth embodiment of the present invention. Since the thirteenth embodiment has a similar arrangement to that of the twelfth embodiment, elements having the same functions are given the same reference numerals as those according to the twelfth embodiment and their descriptions are omitted here. The description will be made about the differences from the twelfth embodiment. The major difference from the twelfth embodiment lies in that an additional mass-effecting member 231 is fastened to the inner portion of a U-shaped recess 214 formed in the upper resonator 203.

The additional mass-effecting member 231 is formed into a substantially cylindrical shape having a relatively thick wall thickness and a slightly smaller outer diameter than the inner diameter of the U-shaped recess 214 formed in the upper resonator 203. Furthermore, the additional mass-effecting member 231 has a concave taper 233 formed on the top surface thereof in the downward direction. In addition, the additional mass-effecting member 231 has an outward flange portion 234 having a relatively large thickness and formed in the top portion of the outer surface thereof. The diameter of the inner portion of the additional mass-effecting member 231 is slightly larger than the outer diameter of the fastening member 205. As a result, the additional mass-effecting member 231 does not come in contact with the fastening member 205.

Furthermore, a recess 232 having a large diameter is formed at the top end portion of the inner surface of the U-shaped recess 214 of the upper resonator 203. In order to be received by the recess 232, an uppermost projection 215b having a longitudinally long shape is formed on the outer surface.

The flange portion 234 is bonded and secured to the recess 232 so that the additional mass-effecting member 231 does not come in contact with the upper resonator 203 and the lower resonator 204 except for the bonded and secured portion.

The operation of the thus arranged ultrasonic oscillator according to the third embodiment is performed similar to the twelfth embodiment.

The third embodiment will enable a similar effect to that obtainable from the twelfth embodiment to be obtained. Furthermore, the size of the ultrasonic oscillator can be reduced because of the following arrangement: the additional mass-effecting member 231 is disposed in the U-shaped recess 214 formed in the upper resonator 203 to prevent the projection of the additional mass-effecting member over the outer surface of the ultrasonic oscillator 201.

Figure 23:
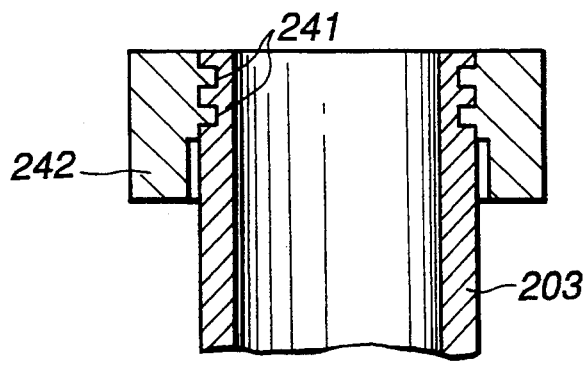
FIG. 23 is an enlarged cross sectional view which illustrates an essential portion of an upper resonator and that of an additional mass-effecting member of an ultrasonic oscillator according to a fourteenth embodiment of the present invention.

A fourteenth embodiment of the present invention will now be described with reference to FIG. 23. Since the fourteenth embodiment has an arrangement similar to that of the first and the thirteenth embodiments, elements having the same function as those of the elements according to the foregoing embodiments are given the same reference numerals and only the different portions will now be described.

A plurality of fastening peripheral grooves 241 running perpendicular to the central axis are formed on the outer surface of the upper resonator 203 adjacent to the top end portion of the same. Furthermore, an additional mass-effecting member 242 is strongly fastened to the fastening peripheral grove 241.

This arrangement has an arrangement that the additional mass-effecting member 242 molded by a monoblock injection molding method is strongly secured to the previously machined upper resonator 203.

The operation of the thus constituted ultrasonic oscillator according to the fourteenth embodiment is performed similarly to that of the second embodiment.

The fourteenth embodiment enables a similar effect to that obtainable from the twelfth embodiment to be attained. Furthermore, the arrangement that the additional mass-effecting member is secured by a projection and pit means formed at the top end portion of the outer surface of the upper resonator 203 will further strongly secure the additional mass-effecting member. As a result of securing the additional mass-effecting member strongly, the oscillation amplitude of the upper resonator 203 can be further efficiently enlarged.

Figure 24:
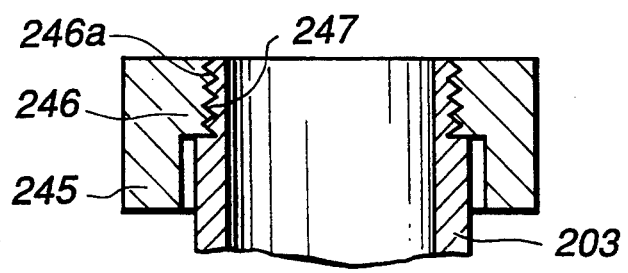
FIG. 24 is an enlarged perspective view which illustrates an essential portion of an upper resonator and that of an additional mass-effecting member of an ultrasonic oscillator according to a fifteenth embodiment of the present invention.
Figure 25:
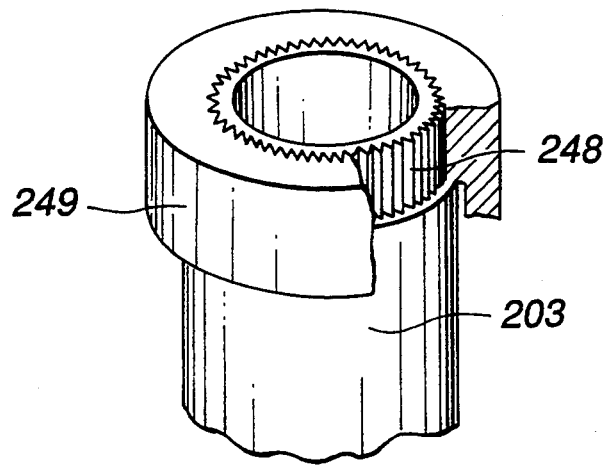
FIG. 25 is an enlarged sectional perspective view which illustrates an essential portion of an upper resonator and that of an additional mass-effecting member of an ultrasonic oscillator according to a sixteenth embodiment of the present invention.

FIGS. 24 and 25 are enlarged views which illustrate an essential portion of each of a fifteenth embodiment and a sixteenth embodiment of the present invention. The fifteenth embodiment and a sixteenth embodiment are modifications of the fourteenth embodiment.

FIG. 24 illustrates a fifteenth embodiment of the present invention comprising an additional mass-effecting member 245 formed into a short cylindrical shape having a somewhat thick wall similarly to the additional mass-effecting member 242 according to the fourteenth embodiment. Furthermore, the additional mass-effecting member 242 has a thick projection 246 facing inwards and formed at the top end portion of the inner surface thereof. The projection 246 has a female thread 246a formed in the inner surface thereof.

On the other hand, a male thread 247 is formed at the top end portion of the outer surface of the upper resonator 203 so as to be engaged with the female thread 246a of the additional mass effecting member 245.

The operation of this embodiment is similar to that of the fourteenth embodiment.

This embodiment has an arrangement that the additional mass-effecting member 245 is fastened to the upper resonator 203 by the thread engagement. Therefore, the additional mass-effecting member 245 can be easily fastened/removed from the upper resonator 203. Therefore, the resonant amplitude and the resonant frequency can be easily adjusted by changing the additional mass-effecting members having different masses and shapes.

FIG. 25 illustrates a sixteenth embodiment of the present invention having an arrangement that a knurled groove 248 is formed at the top end portion of the outer surface of the upper resonator 23 in parallel to the central axis.

A thick additional mass-effecting member 249 formed into a short cylindrical shape is press fitted into the knurled groove 248 so as to be secured to the upper resonator 203.

The operation of this embodiment is similar to the fourteenth embodiment.

The arrangement of the sixteenth embodiment enables the additional mass-effecting member to be strongly secured. Furthermore, the additional mass-effecting member can be fastened to the upper resonator 203 from one direction while eliminating a necessity of rotating or tilting the additional mass-effecting member. Therefore, assembling process can be easily automated.

Figure 26:
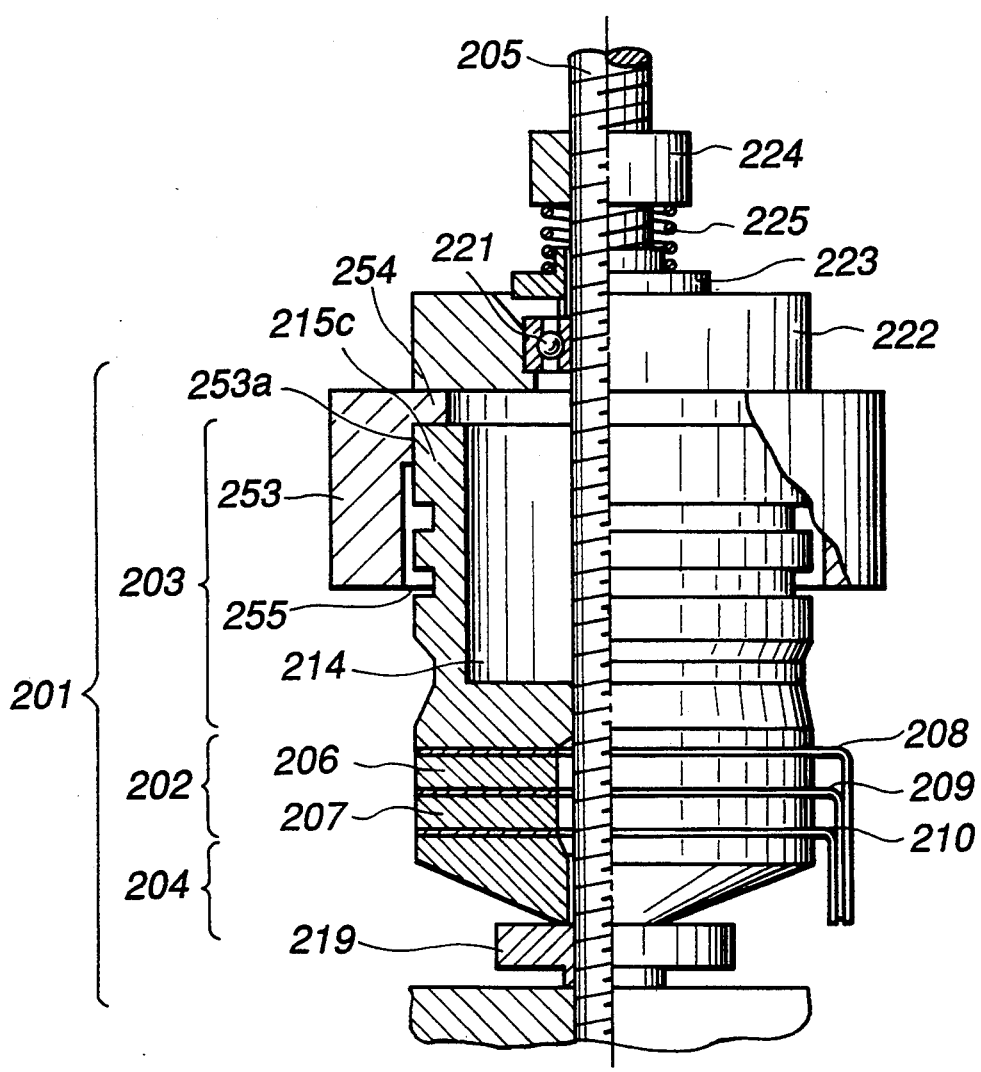
FIG. 26 is a side elevational view which illustrates the cross section of a left half portion of an ultrasonic motor which is constituted by using an ultrasonic oscillator according to a seventeenth embodiment of the present invention.

FIG. 26 illustrates a seventeenth embodiment of the present invention. Since the seventeenth embodiment is arranged similar to the twelfth embodiment, elements having the same functions are given the same reference numerals and only the different portions will now be described.

An additional mass-effecting member 253 is formed into a short cylindrical shape having a thick wall similar to the twelfth embodiment. A flange 254 facing inwards is formed at the top end surface of the inner surface of the additional mass-effecting member 253. A projection 253a for bonding is formed on the inner surface immediately below the flange portion 254. The additional mass-effecting member 253 and the upper resonator 203 are bonded and secured to each other by fastening each other the projection 253a for bonding and a relatively longitudinal projection 215c formed at the uppermost portion of the outer surface of the upper resonator 203. Contact between the additional mass-effecting member 253 and the upper resonator 203 is prevented except for the portion at which they are bonded and secured to each other by forming a gap 255 between the outer surface of the upper resonator 203 and the inner surface of the additional mass-effecting member 253. The gap 255 has a radial direction width of 1 mm or less.

Furthermore, the top end surface of the additional mass-effecting member 253 is previously finished to attain a surface roughness of 0.5 μm or better. The material of the additional mass-effecting member 253 is selected from a group consisting of: ceramics exemplified by alumina, silicon nitride, and carbon nitride; a metal material obtained by applying nickel plating to iron or brass; and organic sliding material such as polyimide.

The seventeenth embodiment thus constituted has a similar operation to that obtainable from the twelfth embodiment except that the torque is transmitted to the rotor by way of the top surface of the additional mass-effecting member 253.

The seventeenth embodiment thus constituted enables a similar effect to that obtainable from the twelfth embodiment to be obtained. Furthermore, the fact that the top surface of the upper resonator does not come in direct contact with the rotor enables the necessity of selecting the material and the surface treatment for the upper resonator 203 to resist sliding to be eliminated. Therefore, an ultrasonic motor, the cost of which can be reduced and which reveals excellent efficiency, can be manufactured.

Figure 27:
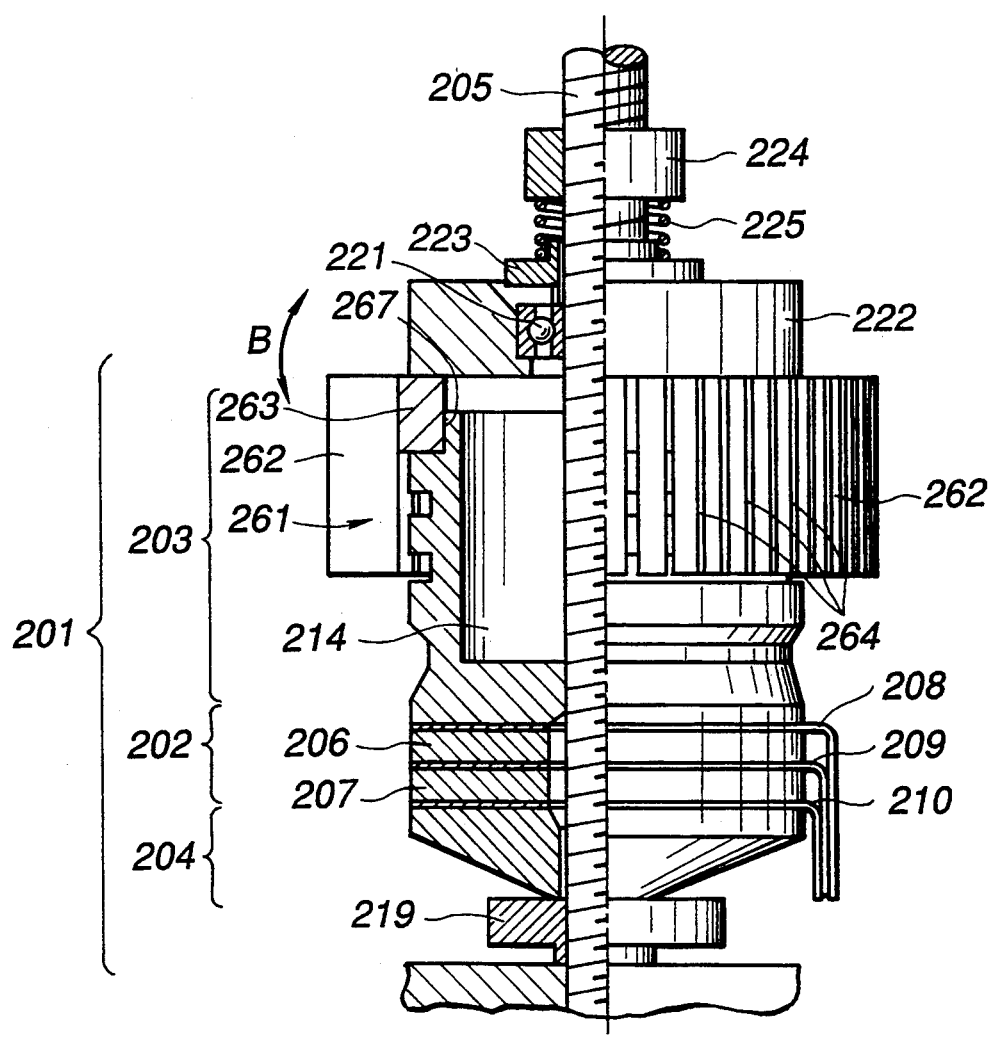
FIG. 27 is a side elevational view which illustrates the cross section of a left half portion of an ultrasonic motor which is constituted by using an ultrasonic oscillator according to an eighteenth embodiment of the present invention.
Figure 28:
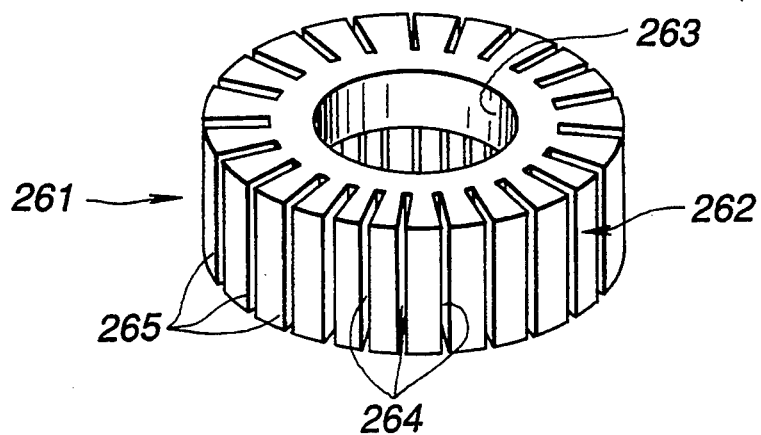
FIG. 28 is an enlarged perspective view which illustrates an additional mass-effecting member of an ultrasonic oscillator according to the eighteenth embodiment.

FIG. 27 illustrates an eighteenth embodiment of the present invention. Since eighteenth embodiment is arranged similar to the twelfth embodiment, elements having the same functions are given the same reference numerals and only the different portions will now be described.

The additional mass-effecting member 261 according to the eighteenth embodiment is formed of a short cylindrical shape having a relatively thick wall. The additional mass-effecting member 261 further comprises a connection portion 263 projecting further inwardly and formed in the upper portion of the inner surface of the additional mass-effecting member 261. Furthermore, the additional mass-effecting member 261 has a slit portion 262 running parallel to the central axis and formed on the outer surface thereof at the same intervals. That is, the slit portion 262 has a plurality of radial slits 264 running parallel to the central axis in the outer surface thereof at the same intervals. The slits 264 enable a substantially rectangular parallelepiped portion 265 having an elongated shape and divided into sections by the slits 264 to be integrally connected by the connection portion 263. Thus, the additional mass-effecting member 261 is constituted.

Furthermore, the upper resonator 203 has a stepped recess 267 formed at the top end portion of the outer surface thereof so as to be connected to the lower end portion of the inner surface of the connection portion 263 of the additional mass-effecting member 261.

It should be noted that the ultrasonic oscillator 201 comes in contact with the rotor 222 while interposing the connection portion 263.

The operation of the eighteenth embodiment thus constituted is similar to that of the seventeenth embodiment.

The eighteenth embodiment enables a similar effect to that obtainable from the seventeenth embodiment to be obtained. Furthermore, the radial slits formed in the additional mass-effecting member enable the rigidity of the additional mass-effecting member in a direction designated by an arrow B shown in FIG. 27 to be weakened. Therefore, the whirling resonant oscillations of the upper resonator 203 to be further enhanced.

Figure 29:
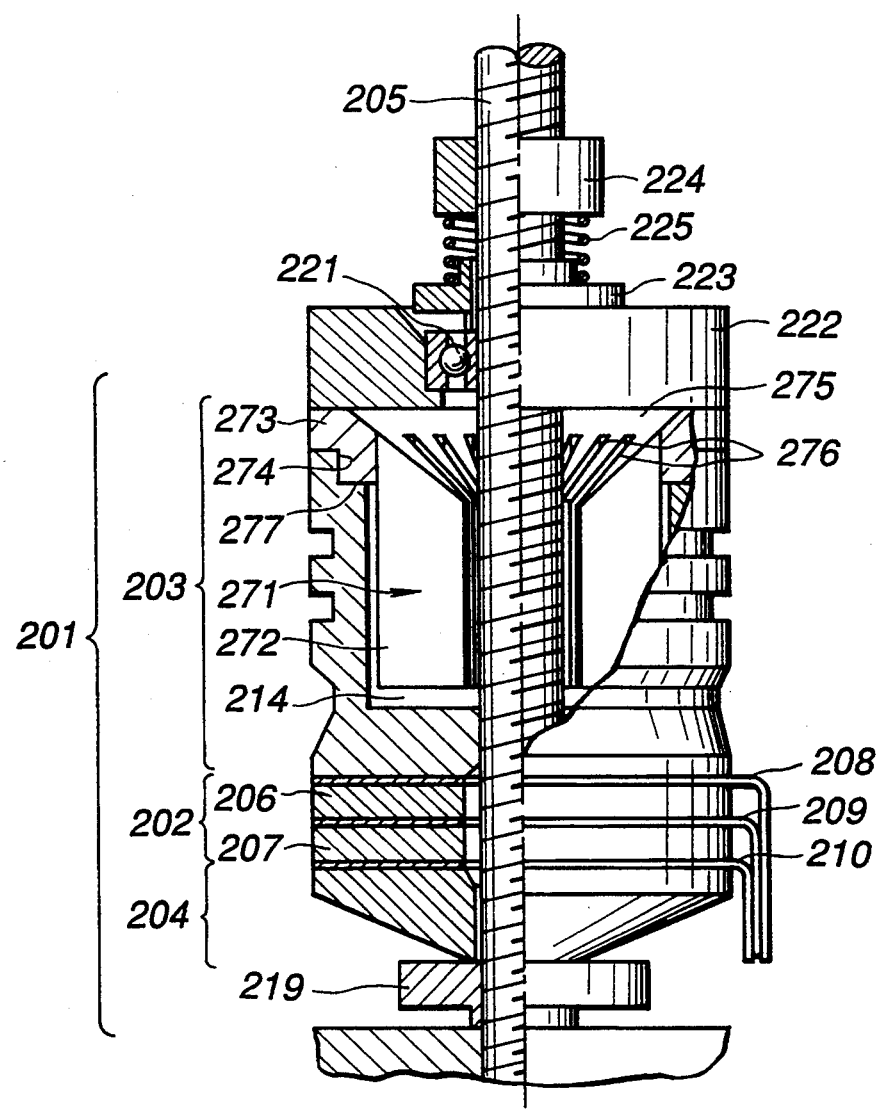
FIG. 29 is a side elevational view which illustrates the cross section of a left half portion of an ultrasonic motor which is constituted by using an ultrasonic oscillator according to a nineteenth embodiment of the present invention.
Figure 30:
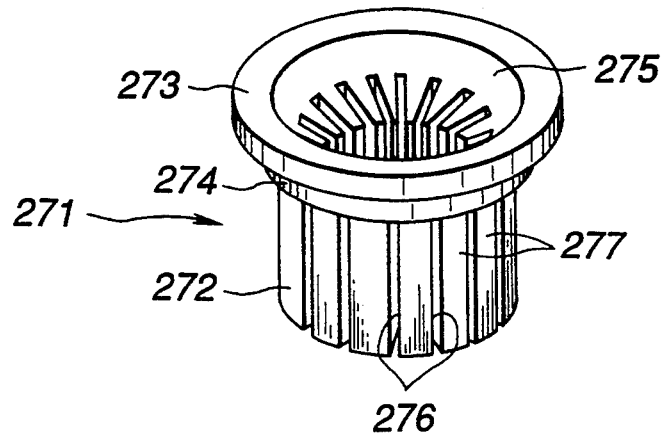
FIG. 30 is an enlarged perspective view which illustrates an additional mass-effecting member of an ultrasonic oscillator according to the nineteenth embodiment.

FIGS. 29 and 30 illustrate a nineteenth embodiment of the present invention. The nineteenth embodiment is a modification of the eighteenth embodiment of the present invention. Although this embodiment is arranged similar to the eighteenth embodiment in the viewpoint that the radial slits are formed in the additional mass-effecting member, the difference lies in that the additional mass-effecting member is disposed in an internal space of the U-shaped recess 214 of the upper resonator 203 similar to the thirteenth embodiment (see FIG. 22).

An additional mass-effecting member 271 is fastened to the inner portion of the U-shape recess 214 of the upper resonator 203 and comprises a slit portion 272 having an outer diameter slightly smaller than the inner diameter of the recess 214 and formed into a substantially cylindrical shape having a somewhat thick wall. Furthermore, the additional mass-effecting member 271 has a connection projection 273 projecting over the top end portion of the outer surface of the slit portion 272 and having a large diameter.

The slit portion 272 has a plurality of radial slits 276 formed with respect to the central axis at the same intervals. Elongated rectangular parallelepipeds 277 formed by the slits 276 are integrally connected to one another by the connection projection 273.

A cut and stepped portion 274 is formed in the lower portion of the outer surface of the connection projection 273 so as to be secured to the upper resonator 203. Furthermore, a downward tapered portion 275 is formed in the top surface of the additional mass-effecting member 271. The diameter of the inner diameter of the additional mass-effecting member 271 is slightly larger than the diameter of the fastening member 205 so as not to come in contact with the fastening member 205.

Furthermore, a cut recess 277 to be secured to the connection projection 273 of the additional mass-effecting member 271 is formed at the top end portion of the inner surface of the U-shaped recess 214 of the upper resonator 203.

The operation and the effect of the nineteenth embodiment thus arranged are substantially the same as those of the eighteenth embodiment. However, a further significant effect can be obtained in that the size of the ultrasonic oscillator can be reduced because the additional mass-effecting member does not project over the ultrasonic oscillator.

A twentieth embodiment of the present invention will now be described. The twentieth embodiment has an arrangement similar to that of the twelfth embodiment except that a limitation is present in the way of selecting the material for the additional mass-effecting member adapted to the upper resonator.

In the twentieth embodiment, the additional mass-effecting member 216 (see FIG. 18) is made of metal having a high density such as copper, brass, iron and stainless steel and the upper resonator 203 is made of a material having a relatively low density such as aluminum and duralmin. That is, the material is so selected as to hold the following relationship between the density of the material for the additional mass-effecting member 216 and that of the upper resonator 203:

(Density of material for additional mass-effecting member) >(Density of material for the upper resonator)

The operation of the twentieth embodiment thus constituted is similar to that of the twelfth embodiment.

The twentieth embodiment enables a similar effect to that obtainable from the twelfth embodiment to be obtained. Furthermore, the arrangement that the density of the additional mass-effecting member is raised to hold the relationship: (density of the additional mass-effecting member) >(density of the upper resonator) will enable the size of the additional mass-effecting member to be reduced. Therefore, a compact ultrasonic oscillator can be manufactured.

The structure for raising the density of the material for the additional mass-effecting member is not limited to the adaptation to the twentieth embodiment. It may, of course, be adapted to anyone of the twelfth to the twentieth embodiments and to an ordinary case in which an additional mass-effecting member is added to a resonator.

As described above, according to the present invention, an ultrasonic oscillator can be provided the size of which can be reduced and which reveals a large output because the oscillation amplitude is large and it can be efficiently operated even if the ultrasonic oscillator has a short length.

Figure 31:
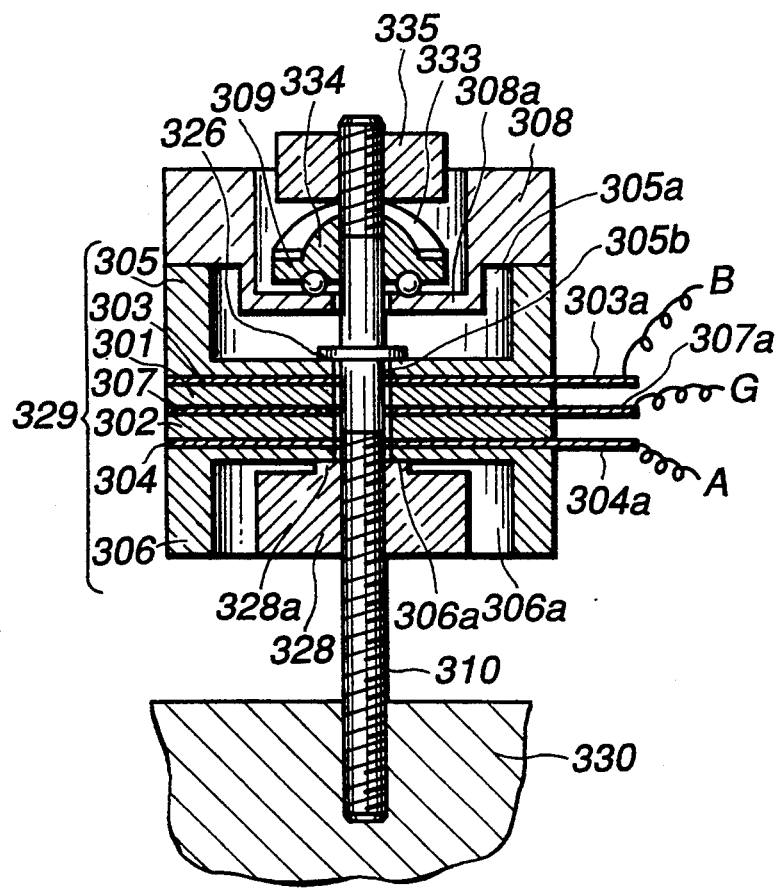
FIG. 31 is a side elevational cross sectional view which illustrates an ultrasonic motor to which an ultrasonic oscillator according to a twenty-first embodiment of the present invention is adapted.

FIG. 31 is a side elevational cross sectional view which illustrates an ultrasonic motor to which an ultrasonic oscillator according to a twenty-first embodiment of the present invention is adapted.

Figure 32:
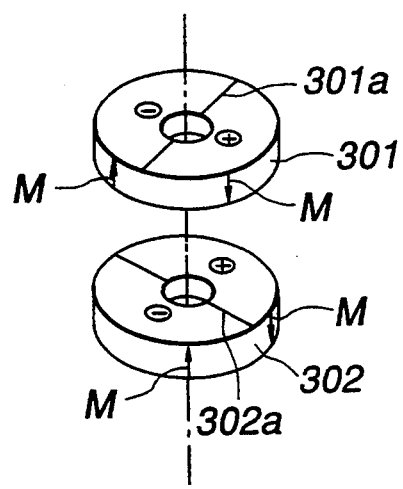
FIG. 32 is a perspective view which illustrates a piezoelectric element shown in FIG. 31.

An ultrasonic oscillator 329 for use in the ultrasonic motor according to this embodiment comprises first and second piezoelectric elements 301 and 302 each of which is formed into an annular shape and having a thickness of, for example, 2 mm. As shown in FIG. 32, each of the piezoelectric elements 1 and 2 is polarized to have polarization directions M opposing each other and the first and second piezoelectric elements 1 and 2 are divided into two regions. Furthermore, the first and second piezoelectric elements 1 and 2 are so disposed that a first boundary line 301a of the polarized region of the first piezoelectric element 301 and a second boundary line 302a of the second piezoelectric element 302 are deviated from each other by an angular degree of about 90°.

Copper electrode plates 303 and 304 each having a thickness of, for example, 0.1 mm are respectively disposed between the first piezoelectric element 301 and a resonator 305 and between the second piezoelectric element 302 and a resonator 306. The copper electrode plates 303 and 304 respectively have projections 303a and 304a for soldering lead wires, the projections 303a and 304a being so arranged that terminals A and B are connected thereto. The electrode plates 303 and 304 thus arranged are respectively applied with sine wave voltages the phases of which are deviated by 90° from each other and the frequencies of which are in the vicinity of the resonant frequency.

An electrode plate 307 is disposed between the first piezoelectric elements 301 and 302, the electrode plate 307 also having projection 307a. Furthermore, a ground terminal G is connected to the projection 307a so that the electrode plate 307 is grounded.

The resonators 305 and 306 have respective outer surfaces, the diameter of each of which is the same as that of the first and second piezoelectric elements 301 and 302, the resonators 305 and 306 being made of a material, for example, an aluminum alloy, stainless steel, phosphor bronze, duralmin or a titanium alloy or the like having excellent oscillation transmissivity. The resonators 305 and 306 according to the this embodiment are made of a material obtained by subjecting SUS440C having a thermal expansion coefficient which relatively approximates that of the piezoelectric element to a heat treatment to have a hardness of HV750 or harder.

The resonators 305 and 306 respectively have fastening member through holes 305b and 306b at the central axes thereof through which a fastening member 310 pass. Furthermore, U-shape recesses 305a and 306a are formed in the resonators 305 and 306 in a direction from the two end surfaces (the end surfaces of the resonators 305 and 306) of the ultrasonic oscillator 329 toward the first and the second piezoelectric elements 301 and 302, the resonators 305 and 306 being formed into thin circular shapes adjacent to the two end surfaces. As a result, the end surfaces of the resonators 305 and 306 do not come in contact with the fastening member 310.

The first and second piezoelectric elements 301, 302, the electrode plates 303, 304, 307, and the resonators 305 and 306 are stacked as shown in FIG. 31. Furthermore, an adhesive agent such as an epoxy adhesive agent is applied among the aforesaid component members. Then, the resonator 305 and 306 are penetrated by the fastening member 310 such as a bolt having a flange 326 for securing the resonators 305 and 306 at only the central portions. Furthermore, a securing nut 328 having a contact portion 328a having the same shape is used to tighten the other end portion to press the component members. After the adhesive agent has been hardened, the ultrasonic oscillator 329 for use in the twenty-first embodiment can be obtained.

Figure 33A:
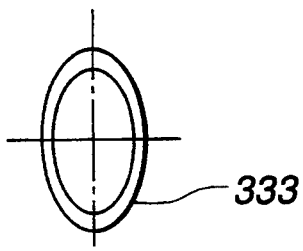
FIG. 33a is a top view and FIG. 33b a front elevational view which illustrates the annular leaf spring shown in FIG. 31.
Figure 33B:

The fastening member 310 is extended in a direction of the central axis of the ultrasonic oscillator, and an end portion of the fastening member 310 is secured to a securing frame 330. A rotor 308 including a bearing and serving as a member to be driven is pressed and secured to another end portion of the fastening member by a pressing means. The pressing means comprises an annular leaf spring 333 as shown in FIGS. 33a and 33b disposed on a conical seating plate 334. The quantity of pressurization can be varied by a pressure variable nut 335.

The rotor 308 is made of aluminum alloy subjected to an alumite oxalate treatment by a thickness of 50 $\mu$m, the rotor 308 being formed into a thin portion 308a at the bearing 309 to attain the spring characteristics. The contact surface between the rotor 308 and the resonator 305 has a surface roughness of Rmax 0.1 $\mu$m or less.

The operation of the twenty-first embodiment thus constituted will now be described.

Figure 34:
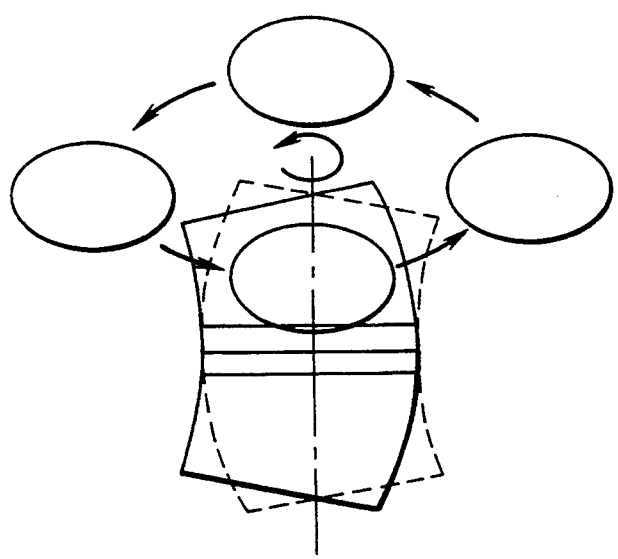
FIG. 34 illustrates a state of oscillations realized when primary bending oscillations are generated in the twenty-first embodiment.

When sine wave voltages, the phase of which are deviated from each other by 90°, are applied to the electrode plates 303 and 304, primary bending oscillations shown in FIG. 34 are generated and elliptic oscillations rotating around the central axis are generated. As a result, the rotor 308 is rotated when the rotor 308 is pressed against the outer end surface of the ultrasonic oscillator, that is, the end surface of the resonator 305. Thus, the ultrasonic motor is constituted. By setting the phase difference of the two sine wave voltages to be about 180°, the direction of the elliptic oscillations generated in the ultrasonic oscillator is inverted. Therefore, the rotor 308 is rotated in the opposite direction.

The twenty-first embodiment has the arrangement that the U-shaped recesses 305a and 306a are formed in the resonators 305 and 306 from their two end portions to prevent the contact with the fastening member 310 taken place adjacent to the end surface. Therefore, the rigidity of the resonators 305 and 306 in the bending direction can be lowered and the influence of the rigidity of the fastening member 310 can be minimized. Furthermore, the position of the node of the oscillations is caused to approach the center of the ultrasonic oscillator, that is, the positions of the first and second piezoelectric elements 301 and 302. Therefore, the oscillation amplitude can be made maximum at the two end surfaces of the ultrasonic oscillator.

Since the piezoelectric elements 301 and 302 are pressed and secured by the fastening member 310 while being interposed between the resonators 305 and 306, the impedance at the resonant point can be lowered. Therefore, the mechanical Qm can be enlarged. Furthermore, the fact that the fastening member 310 is pressed and secured at the central portion of the ultrasonic oscillator 329 will prevent damping of the oscillations in the vicinity of the outer surface of the end surface of the oscillator 329 due to the pressurization. On the other hand, the oscillation amplitude at the outer portion of the end surface can be enlarged. Furthermore, the oscillations are insulated by the thin wall portion 308a having the spring characteristics provided for the rotor 308 so as to prevent the transmission of the oscillation from the oscillator 329 to the fastening member followed by the undesirable outward transmission.

Since the twenty-first embodiment has an arrangement that only the central portion of the ultrasonic oscillator is pressed and secured by the fastening member, the maximum amplitude position of the oscillations can be brought to the outer portion of the two end surfaces of the oscillator. Therefore, the rotor disposed on the end surface can be rotated efficiently. Furthermore, the arrangement that the ultrasonic oscillator is pressed and secured by the fastening member 310 will enable a strong torque ultrasonic motor to be realized which reveals large Qm and large force for generating the oscillation.

Figure 35:
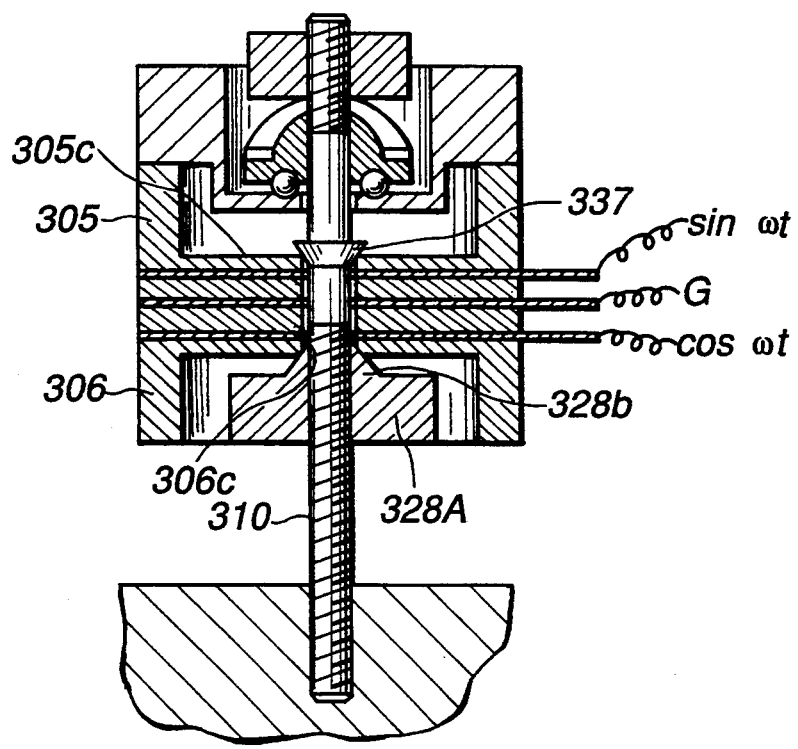
FIG. 35 is a side elevational cross sectional view which illustrates a twenty-second embodiment of an ultrasonic oscillator according to the present invention.
Figure 36:
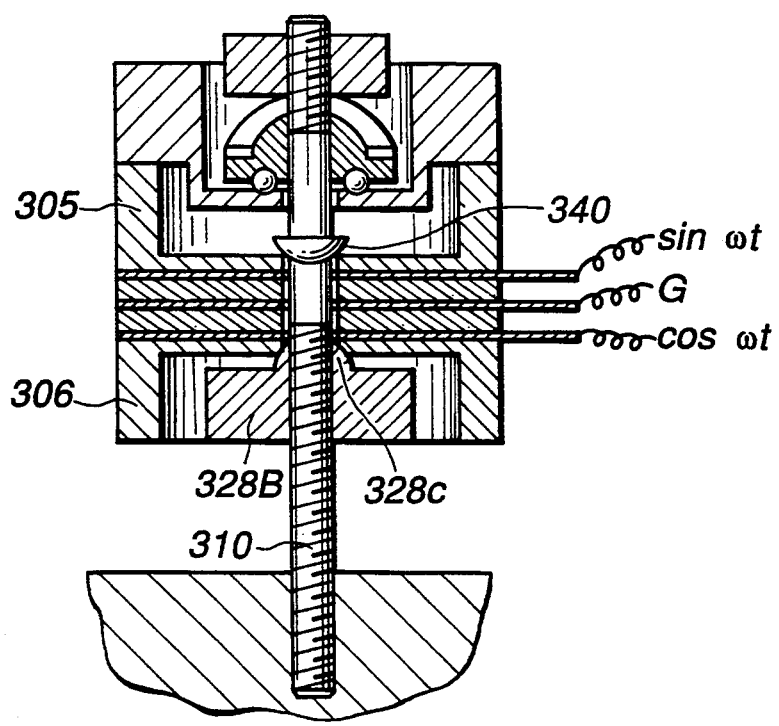
FIG. 36 is a side elevational cross sectional view which illustrates a twenty-third embodiment of an ultrasonic oscillator according to the present invention.

FIGS. 35 and 36 are side elevational cross sectional views which illustrate ultrasonic oscillators respectively according to twenty-second and twenty-third embodiments of the present invention.

As contrasted with the twenty-first embodiment having an arrangement that the ultrasonic oscillator 329 is pressed by the fastening member 310 by means of a surface contact realized by the flange 326 and the securing nut 328, the twenty-second and twenty-third embodiments have an arrangement that the contact portions of the resonators 305 and 306 are arranged to be in line-contact.

That is, the twenty-second embodiment has an arrangement that a conical projection 337 is formed on the fastening member 310 so as to be brought into contact with only each inlet portion 305c of the fastening member through hole of the resonator 305 as shown in FIG. 35. Also the securing nut 328A at the other end portion is formed into conical tapered portion 328b so as to be brought into contact with only each inlet portion 306c of the fastening member through hole of the resonator 306.

The twenty-third embodiment has an arrangement that the contact portion is made to be line-contact as shown in FIG. 36 by forming a semi-spherical projection 340 on the fastening member 310 and by forming a semi-spherical projection 328c on a securing nut 328B.

The twenty-second and twenty-third embodiments cause the pressed position of the fastening member 310 to further approach the axis and enable the oscillation amplitude at the outer portion of the oscillator to be enlarged. Therefore, an ultrasonic motor capable of generating stronger torque can be obtained.

Figure 37:
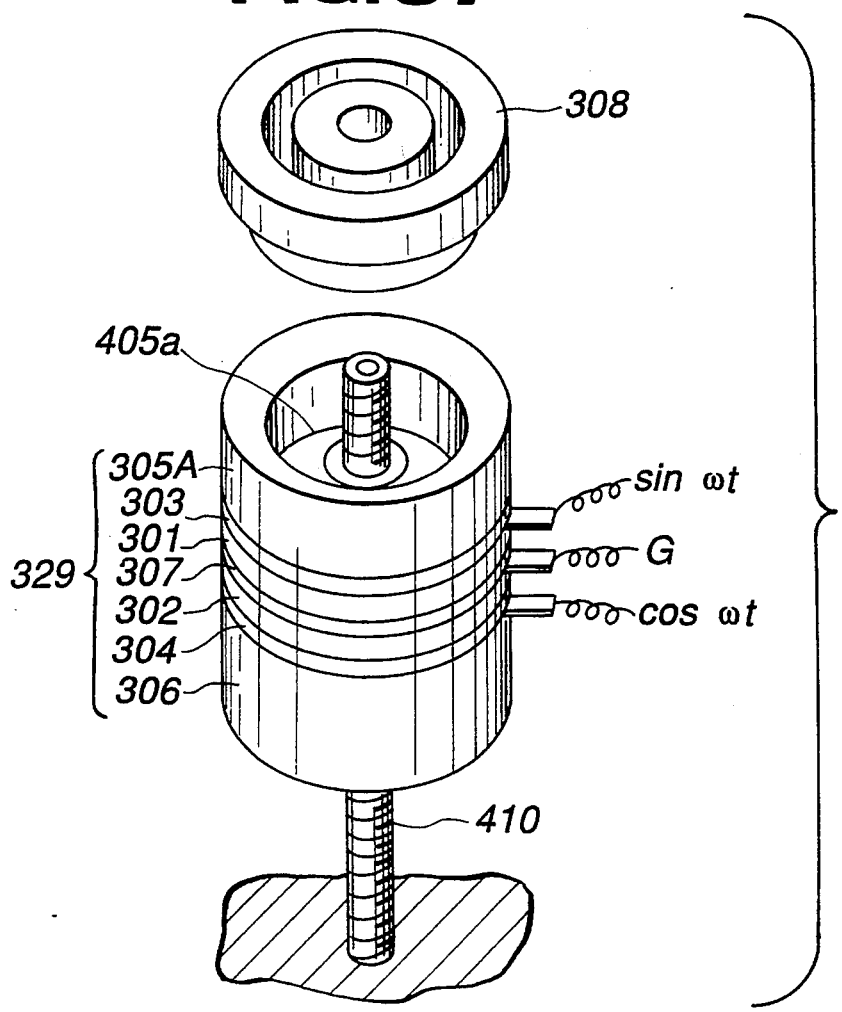
FIG. 37 is a perspective view which illustrates an essential portion of an ultrasonic motor to which an ultrasonic oscillator according to a twenty-fourth embodiment of the present invention is adapted.
Figure 39:
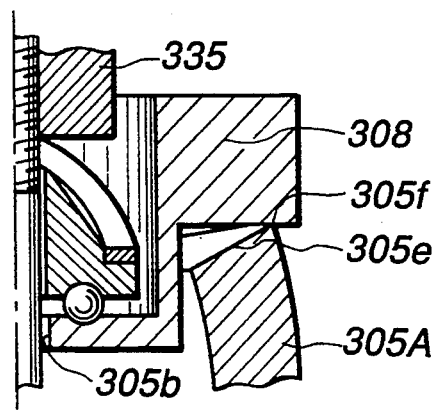
FIG. 39 is a side elevational cross sectional view which illustrates a state of contact between the stator and a rotor according to the twenty-fourth embodiment.

FIG. 37 is a perspective view which illustrates an essential portion of an ultrasonic motor to which an ultrasonic oscillator according to a twenty-fourth embodiment of the present invention is adapted. FIG. 39 is a side elevational cross sectional view which illustrates an essential portion of a state where a stator and a rotor of the ultrasonic motor are in contact with each other.

Although the twenty-first embodiment has an arrangement that the outer portion of the end surface of the oscillator is formed into a thin wall annular shape of the resonator 305 and the rotor 308 is in line-contact with it, the twenty-fourth embodiment has an arrangement that the thin wall annular portion is formed into a tapered shape so as to make line-contact with the rotor 308. Since the twenty-fourth embodiment is the same as the twenty-first embodiment except for the foregoing arrangement, the same elements are given the same reference numerals and their descriptions are omitted here. Therefore, only the different portion, that is, the outer portion of the end surface of the oscillation will now be described.

Figure 38:
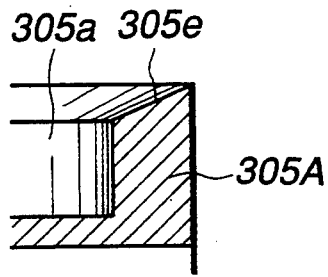
FIG. 38 a partially enlarged cross sectional view which illustrates the twenty-fourth embodiment.

As shown in FIG. 38 in an enlarged manner, the shape of the end surface of a resonator 305A is so arranged that a tapered portion 305e is formed inwards to cause the outer end portion to have an acute angle. When the rotor 308 is pressed against the outer portion of the end surface of the oscillator having the foregoing shape to be rotated, the rotor 308 comes in contact with the oscillator 329 at only the acute angle portion 305f of the outer portion of the thin wall annular portion of the resonator 305A as shown in FIG. 39.

Since the twenty-fourth embodiment has the arrangement that the contact at the end surface of the thin wall annular shape of the resonator 305A taken place in a more inside portion is prevented, sound generated due to the fact that the inner portion slides on and rubs against the rotor 308 can be eliminated. Therefore, a satisfactorily quiet ultrasonic motor can be obtained. Since the undesirable oscillations generated due to sliding can be prevented, uneven rotations can be reduced and stable rotation can be performed.

Figure 40:
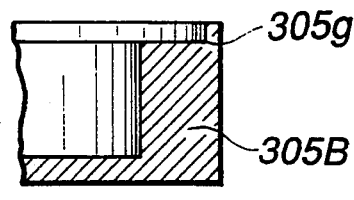
FIG. 40 is a side elevational cross sectional view which illustrates an essential portion of a twenty-fifth embodiment of an ultrasonic oscillator according to the present invention.

FIG. 40 is a cross sectional view which illustrates a twenty-fifth embodiment of a ultrasonic oscillator which is a modification of the twenty-fourth embodiment. The twenty-fifth embodiment has an arrangement that the end surface of a resonator 305B is formed into a stepped portion 305g having a projection shape in the portion adjacent to the outer peripheral thereof. As a result, the contact area with the rotor 308 is minimized.

Figure 41:
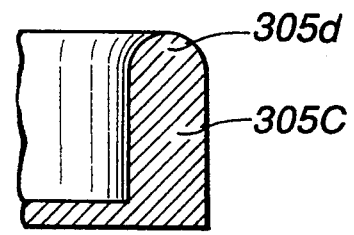
FIG. 41 is a side elevational cross sectional view which illustrates an essential portion of a twenty-sixth embodiment of an ultrasonic oscillator according to the present invention.

FIG. 41 is a cross sectional view which illustrates an essential portion of an ultrasonic oscillator according to a twenty-sixth embodiment which is another modification of the twenty-fourth embodiment. The twenty-sixth embodiment has an arrangement that the end surface of a resonator 305C is formed into a semi-spherical end portion 305d so as to be in line-contact with the rotor 308. By reducing the contact area between the rotor and the oscillator 329 to prevent contact at other portions, a similar effect can be obtained.

Figure 42:
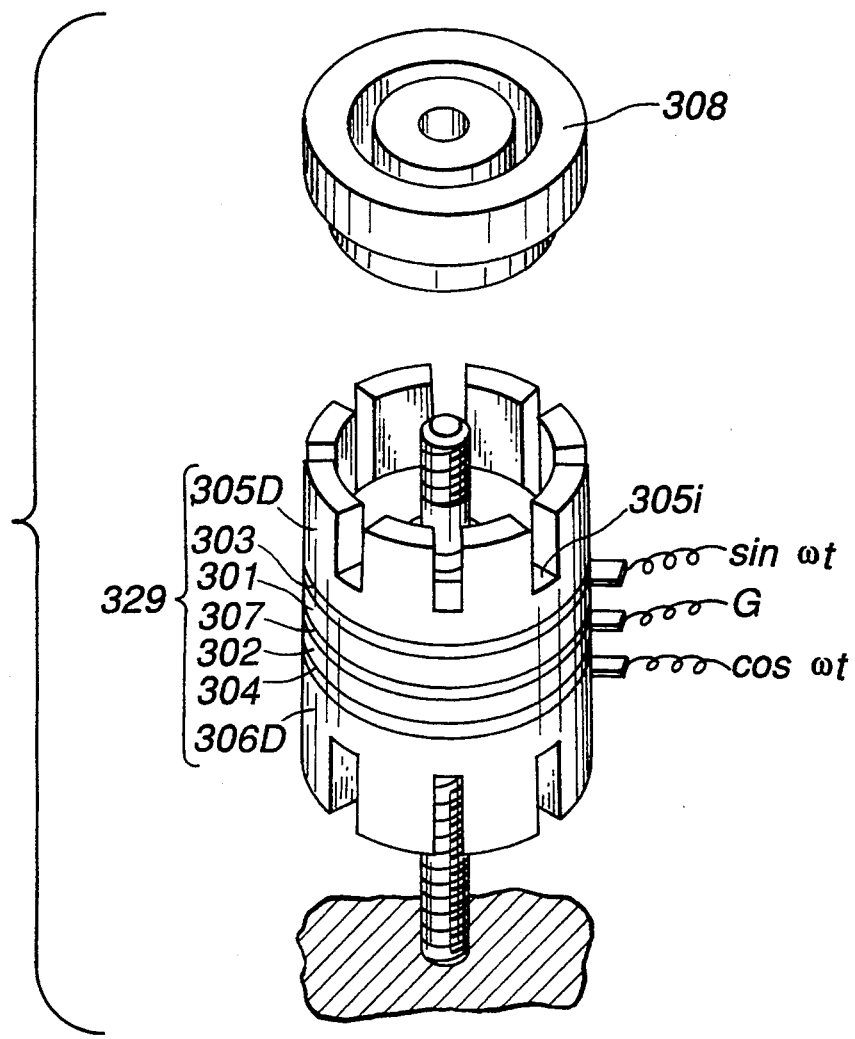
FIG. 42 is a perspective view which illustrates an essential portion of a twenty-seventh embodiment of an ultrasonic oscillator according to the present invention.
Figure 43:
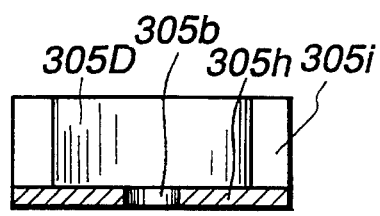
FIG. 43 is a side elevational cross sectional view which illustrates the resonator shown in FIG. 42.

FIG. 42 is a perspective view which illustrates an essential portion of an ultrasonic motor to which an ultrasonic oscillator according to a twenty-seventh embodiment of the present invention is adapted. FIG. 43 is a side elevational cross sectional view which illustrates the resonator 305D shown in FIG. 42. The difference between the twenty-seventh embodiment from the foregoing embodiments lies in the fact that grooves are formed in the side outer surface of the resonator. Since this embodiment is the same as the foregoing embodiments except for the aforesaid arrangement, the same elements are given the same reference numerals and their descriptions are omitted here. Then, the description will be made about the different portion.

As shown in FIGS. 42 and 43, the resonators 305D and 306D have eight equally-spaced grooves 305i formed in the side outer surfaces thereof in a direction from the end surface of the oscillator toward the piezoelectric element to reach a bottom 305h of a U-shaped recess.

The twenty-seventh embodiment thus constituted enables the rigidity of the resonators 305D and 306D to be lowered, the primary mode bending oscillations to be easily generated, and the elliptic oscillations rotating around the central axis of the oscillator to be enlarged. Furthermore, the position of the node of the bending oscillations can be allowed to approach the center (the position of the piezoelectric element) of the oscillator. As a result, the oscillation amplitude can be made maximum at the two end surfaces. Therefore, the resonant frequency can be further lowered, the impedance at the resonant point can be reduced and mechanical Qm is enlarged. Although heat generation phenomenon easily takes place if the piezoelectric element is held between metal elastic members and the same is pressed and fixed by the fastening member, the enlargement of the surface area of the resonator causes the radiation effect to be enhanced. As a result, the heat generating phenomenon can be prevented.

According to the twenty-seventh embodiment, the rigidity of the resonator can be further weakened followed by an enlargement of the oscillation amplitude. Therefore, an ultrasonic motor revealing high speed and strong torque can be realized.

Figure 44:
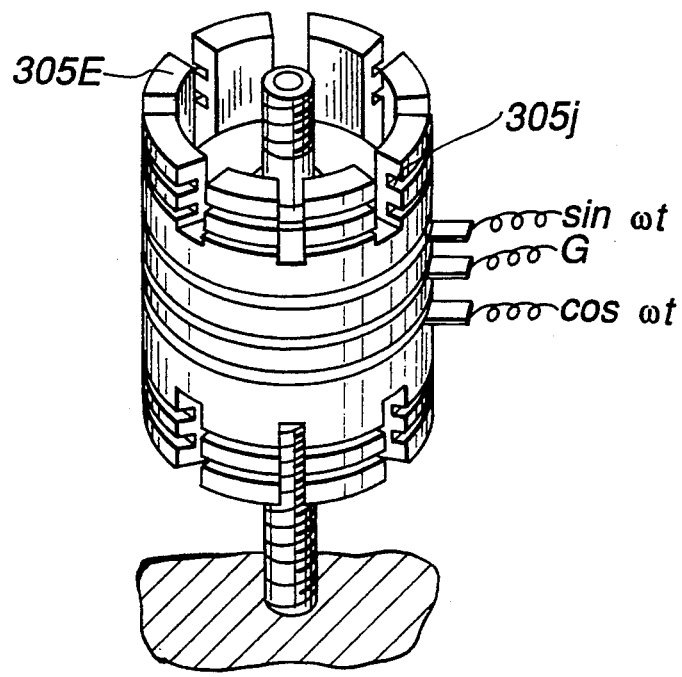
FIG. 44 is a perspective view which illustrates an essential portion of a twenty-eighth embodiment of an ultrasonic oscillator according to the present invention.
Figure 45:
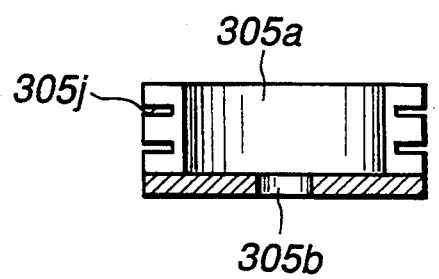
FIG. 45 is a side elevational cross sectional view which illustrates the resonator shown in FIG. 44.

FIG. 44 is a perspective view which illustrates an essential portion of an ultrasonic oscillator according to a twenty-eighth embodiment which is a modification of the twenty-seventh embodiment. FIG. 45 is a side elevational cross sectional view which illustrates the resonator shown in FIG. 44.

A resonator 305E according to the twenty-eighth embodiment has two concentric grooves 305j formed in the side outer surface around the axis. The grooves 305j are formed so as not penetrate the U-shaped recess 305a in the resonator.

According to the twenty-eighth embodiment, the rigidity in the bending direction can be reduced particularly, the frequency and impedance in the resonant state can be further lowered, and mechanical Qm can be enlarged.

Each of the foregoing embodiments has the arrangement that the oscillator is held between the fastening member having the flange and the projection, which are in contact with the portion adjacent to the central portion of the oscillator, and the securing nut having the same shape to press and secure the oscillator. Therefore, the primary mode bending oscillation can be strongly excited in the outer portion of the end surface of the oscillator. Furthermore, the pressure is applied to only the central portion of the oscillator to weaken the pressure at the outer portion. Therefore, damping of the oscillation amplitude at the outer portion of the end surface of the oscillator taking place due to the pressurization can be reduced. As a result, large-amplitude oscillations can be generated at the outer portion of the end surface as compared with the oscillator having a thread at the central portion of the resonator to be pressed and secured by a bolt or the like. Hence, the member to be driven and disposed on the end surface can be rotated at a high rotational speed and strong torque.

Since the taper, annular projection or spherical shape structure is formed on the end surface of the oscillator so as to be brought into line-contact with the member to be driven at only a portion adjacent to the outer portion of the end surface, the contact area can be reduced. Therefore, the contact with the member to be driven at an inner portion of the end surface can be prevented. Hence, chatter oscillations and sound generation can be reduced.

Furthermore, the grooves formed on the outer surface or the end surface of the resonator will weaken the rigidity of the resonator. In addition, the bending oscillations can easily be excited and oscillations having a large amplitude can be generated at the outer portion of the end surface. As a result, the characteristics of the motor can be improved.

As described above, according to this embodiment, the oscillation amplitude can be made maximum at the two end surfaces. Therefore, a significant effect can be exhibited in that the rotor disposed on the end surface can be stably rotated by strong torque.

Figure 46:
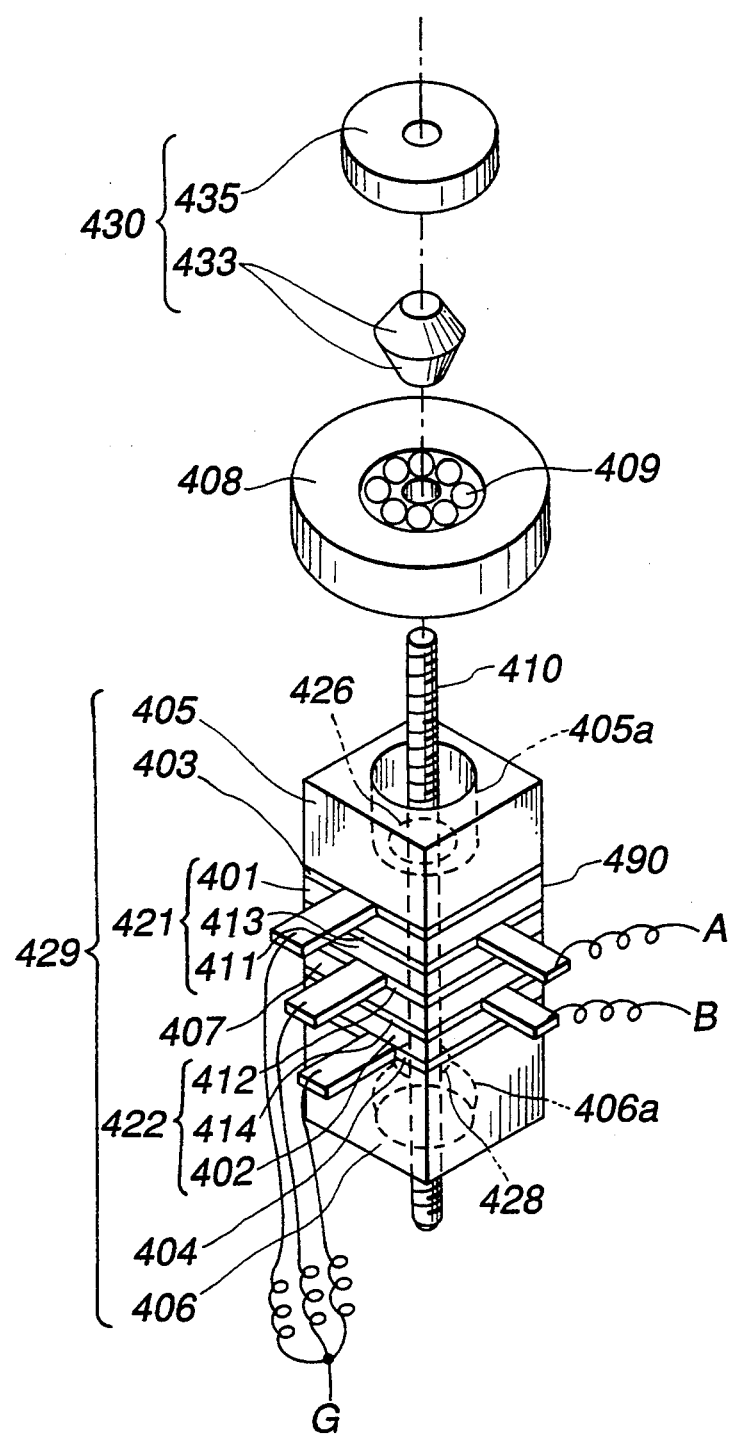
FIG. 46 is an exploded perspective view which illustrates an ultrasonic motor to which an ultrasonic oscillator according to a twenty-ninth embodiment of the present invention is adapted.

FIG. 46 is an exploded perspective view which illustrates an ultrasonic motor to which an ultrasonic oscillator according to a twenty-ninth embodiment of the present invention is adapted.

The ultrasonic motor according to this embodiment has the main portion comprising a square ultrasonic oscillator 429, a rotor 408 including a bearing 409 and serving as a member to be driven, and a pressing means for pressing the rotor 408 against the outer potion of the end surface of the oscillator 429.

Figure 47:
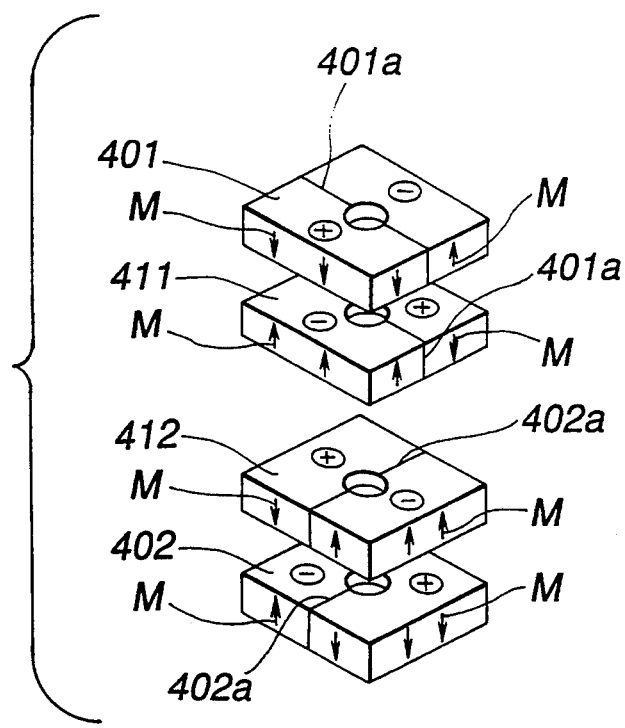
FIG. 47 is a perspective view which illustrates the piezoelectric element shown in FIG. 46.
Figure 48:
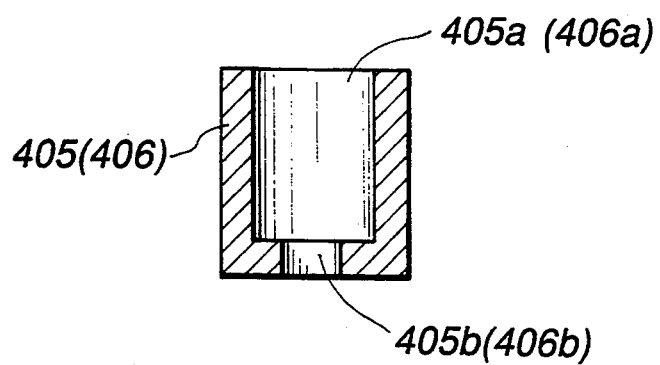
FIG. 48 is a cross sectional view which illustrates the resonator shown in FIG. 46.

The ultrasonic oscillator 429 comprises first and second piezoelectric element groups 401, 402, resonators 405, 406 and a fastening member for fastening these elements. The first and second piezoelectric element groups 421 and 422 are constituted by stacking two square piezoelectric elements 401, 411 and by stacking 412 and 402 while interposing electrode plates 413 and 414. The piezoelectric elements 401, 411, 412 and 402 are, as shown in FIG. 47, divided into two sections by first and second boundary lines 401a and 402a passing through the central axis to invert one another, the polarizing directions M running parallel to the central axis. Furthermore, the polarizing directions of the piezoelectric element group respectively oppose each other. It should be noted that the first and the second boundary lines 401a and 402a are deviated from each other by 90°.

Copper electrode plates 403 and 404 each having a projection for soldering a lead wire are respectively disposed between the first piezoelectric element group 421 and a resonator 405 and between the second piezoelectric element group 422 and a resonator 406. An electrode plate 407 is disposed between the first piezoelectric elements. The electrode plates 403, 404 and 407 are connected commonly to be an earth potential.

The resonators 305 and 306 respectively have square outer surfaces which are the same as those of the piezoelectric elements 401, 402, 411 and 412. The resonators 405 and 406 are made of a material, for example, an aluminum alloy, stainless steel, phosphor bronze, duralmin or a titanium alloy or the like having excellent oscillation transmissivity. The resonators 305 and 306 according to the this embodiment are made of a material obtained by subjecting aluminum alloy A5056 to alumire oxalate treatment by a thickness of 30 μm.

The resonators 405 and 406 respectively have fastening member through holes 405b and 406b at the central portions thereof through which the fastening member 410 passes such as a bolt. Furthermore, U-shape recesses 405a and 406a are formed in the resonators 405 and 406 in a direction from the two end surfaces (the end surfaces of the resonators 405 and 406) of the ultrasonic oscillator toward the piezoelectric elements 401 402, 411 and 412, the resonators 405 and 406 being formed into thin shapes adjacent to the end surfaces. As a result, the end surfaces of the resonators 405 and 406 do not come in contact with the fastening member 410.

The piezoelectric elements 401, 402, 411, 412, the electrode plates 403, 404, 407, 413, 414, and the resonators 405 and 406 are stacked as shown in FIG. 46. Furthermore, an adhesive agent such as an epoxy adhesive agent is applied among the aforesaid component members. Then, the resonators 405 and 406 are penetrated by the fastening member 410 having a flange which comes in contact with the inlet portions of the fastening member through holes 405b and 406b for securing the resonators 305 and 306 at only the central portions. Furthermore, a securing nut 428 having a contact portion having the same shape as that of the flange 426 is used to tighten the other end portion to press the component members. After the adhesive agent has been hardened, the ultrasonic oscillator 429 for use in the twenty-ninth embodiment can be obtained.

The fastening member 410 is extended in a direction of the central axis of the ultrasonic oscillator 492, and an end portion of the fastening member 410 is secured to a securing frame (omitted from illustration). A rotor 408 including a bearing and serving as a member to be driven is pressed and secured to another end portion of the fastening member 410 by a pressing means 430. The pressing means comprises two annular leaf springs 433 to face each other so that the quantity of pressurization can be varied by a pressure variable nut 435.

The rotor 408 is made of SKD11 subjected to a heat treatment to have hardness of Hv 700 or harder. The contact surface between the rotor 408 and the resonator 405 has a surface roughness of Rmax 0.1 μm or less.

When sine wave voltages, the phase of which are deviated from each other by 90° and the frequency of which is slightly higher than the resonant frequency, are applied to the electrode plates 413 and 414 from a drive circuit (omitted from illustration) while making the electrode plates 403, 404 and 407 to be the common earth, primary bending oscillations rotating around the central axis are generated at the end surface of the oscillator 429. As a result, the rotor 408 is rotated.

Since the piezoelectric elements of each group are each formed into a square, the boundary lines having inverted polarizing directions can easily and accurately be made coincide by aligning four corner portion 490. Therefore, the deviation of the resonant frequency among the piezoelectric elements and spurious phenomenon taken place adjacent to the resonant frequency can be eliminated. Furthermore, the first piezoelectric element group and the second piezoelectric element group can be accurately deviated by 90°.

According to the twenty-ninth embodiment, the piezoelectric elements, the electrode plats and the resonators are formed into squares and the position aligning corner portions 490 are aligned to one another as described above. Therefore, the boundary lines can be made coincide with one another. As a result, the resonant frequency of the piezoelectric elements can be made coincide, and the generation of a spurious phenomenon can be prevented. Hence, the oscillations at the resonant frequency are made considerably large, causing an ultrasonic motor having a large mechanical Qm to be obtained. Therefore, the energy conversion efficiency can be improved, causing an ultrasonic motor exhibiting an excellent efficiency and capable of generating strong torque to be manufactured. Furthermore, the fact that the piezoelectric groups are accurately deviated from one another by 90° will eliminate the dispersion of the manufactured motors. In addition, the phase difference of the two-phase sine wave voltage to be applied can be fixed to 90°, resulting in an effect of omission of performing the adjustment of the phase difference of the drive circuit.

A similar effect can, of course, be obtained from an arrangement that polygon piezoelectric elements are used to perform the position alignment by utilizing the corner portions in place of the square shapes.

Figure 49:
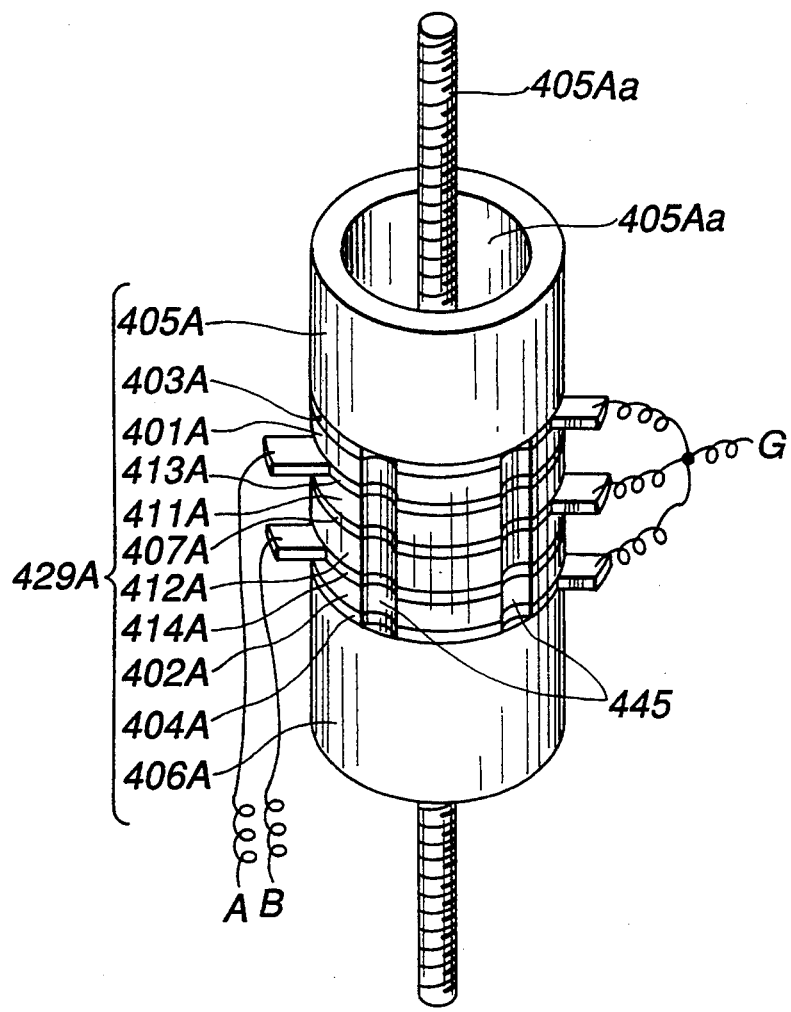
FIG. 49 is a perspective view illustrates an essential portion of an ultrasonic motor to which an ultrasonic oscillator according to a thirtieth embodiment of the present invention is adapted.

FIG. 49 is a perspective view which illustrates an essential portion of an ultrasonic motor to which an ultrasonic oscillator according to a thirtieth embodiment is adapted.

Figure 50:
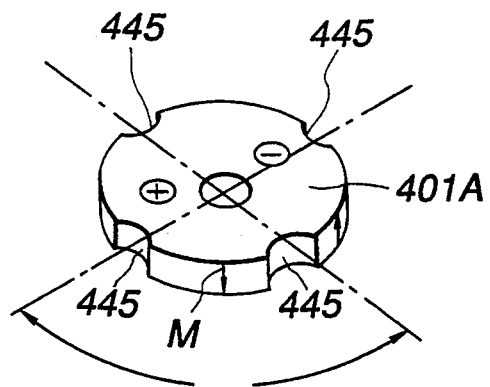
FIG. 50 is a perspective view which illustrates the piezoelectric element shown in FIG. 49.
Figure 51:
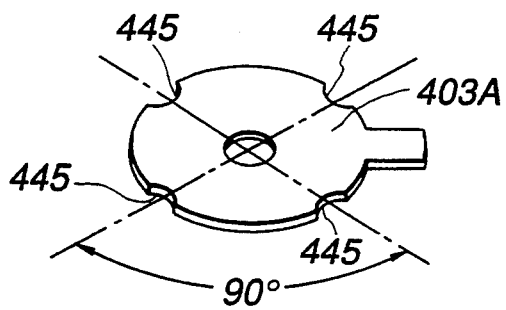
FIG. 51 is a perspective view which illustrates an electrode plate shown in FIG. 49.

A major difference from the twenty-ninth embodiment lies in that semicircular grooves 445 are formed in the outer surfaces of the piezoelectric elements and the electrode plates at intervals of 90° as shown in FIGS. 50 and 51. Furthermore, the shape is made circular. Since this embodiment is the same as the twenty-ninth embodiment except for the foregoing arrangements, the same elements are given reference numerals with symbol A added thereto and the description about the structure is omitted here. It should be noted that square grooves may be employed in place of the semicircular grooves.

The thirtieth embodiment arranged as described above enables the boundary lines of the opposite polarizing directions to be easily and accurately made to coincide with each other by aligning the grooves 445 formed in the piezoelectric elements of the piezoelectric element groups or the electrode plates similar to the twenty-ninth embodiment. Therefore, the first piezoelectric element group and the second piezoelectric element group can be accurately deviated from each other by 90°. Furthermore, fine bending oscillations can be obtained because the rigidity can be made uniform in all directions of the cross section due to an arrangement that the ultrasonic oscillator is formed into the cylindrical shape in place of the square shape.

Furthermore, the thirtieth embodiment enables spurious phenomenon to be prevented because the resonant frequencies can be made to coincide with each other due to the grooves 445 formed in the piezoelectric elements. In addition, fine bending oscillations can be obtained and the irregular rotation can be prevented satisfactorily because a cylindrical ultrasonic oscillator is formed.

Figure 52:
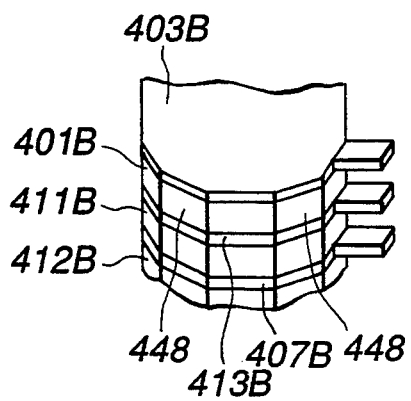
FIG. 52 is a perspective view which illustrates an essential portion of a thirty-first embodiment of an ultrasonic oscillator.
Figure 53:
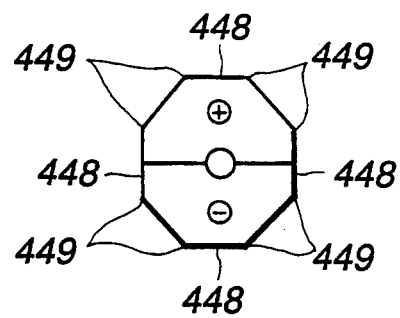
FIG. 53 is a plan view which illustrates the piezoelectric element shown in FIG. 52.
Figure 54:
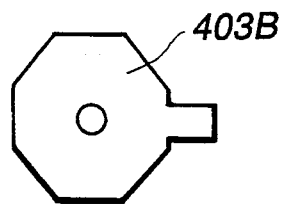
FIG. 54 is a plan view which illustrates the electrode plate shown in FIG. 52.

FIG. 52 is a perspective view which illustrates an essential portion of an ultrasonic oscillator according to a thirty-first embodiment which is a modification of the thirtieth embodiment. The thirty-first embodiment markedly differs from the thirtieth embodiment in that the ultrasonic oscillator is formed into a rectangular, and eight corners 449 are created by forming four chamfered portions 448 in four places of each of the piezoelectric elements and the electrode plates. Since the thirty-first embodiment is the same as the thirtieth embodiment except for the foregoing arrangements, the same elements are given the same reference numerals to which symbol B is appended and the description about the structure is omitted here. This modification has an arrangement that the eight corners 449 are aligned to enable the boundary lines to be made coincide with each other.

Figure 55:
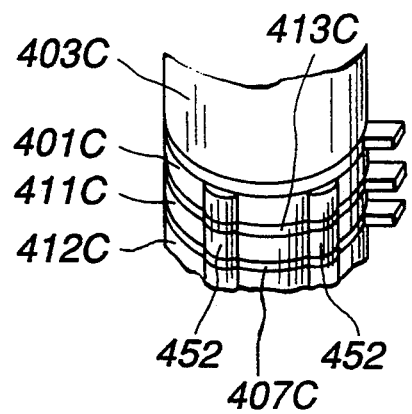
FIG. 55 is a perspective view which illustrates an essential portion of a thirty-second embodiment of an ultrasonic oscillator according to the present invention.
Figure 56:
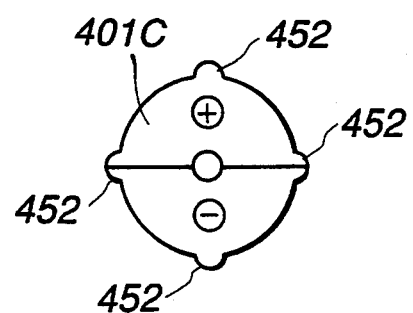
FIG. 56 is a plan view which illustrates a piezoelectric element shown in FIG. 55.

FIG. 55 is a perspective view which illustrates an ultrasonic oscillator according to a thirty-second embodiment which is another modification of the thirtieth embodiment.

Figure 57:
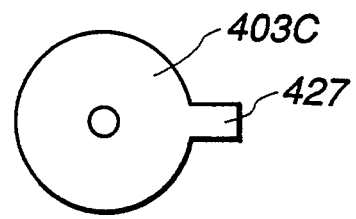
FIG. 57 is a plan view which illustrates the electrode plate shown in FIG. 55.

The thirty-second embodiment differs from the thirtieth embodiment in that four projections 452 are formed at angular intervals of 90° on the outer surface of the piezoelectric element 401C. Since the thirty-second embodiment is the same as the thirtieth embodiment except for the foregoing arrangements, the same elements are given the same reference numerals to which symbol C is appended and the description about the structure is omitted here. The electrode plates 403C (404C, 407C, 413C and 414C) are not formed into the same shape as the piezoelectric element 401C but the same may be stacked by utilizing projections 427 for soldering shown in FIG. 57. By aligning the projections 427 at the time of stacking, the boundary lines can be aligned to each other.

According to the thirty-first and thirty-second embodiments, the boundary lines can be aligned by forming the chamfered portions 448 or the projections 452 on the outer surface at intervals of, for example, 90°.

Figure 58:
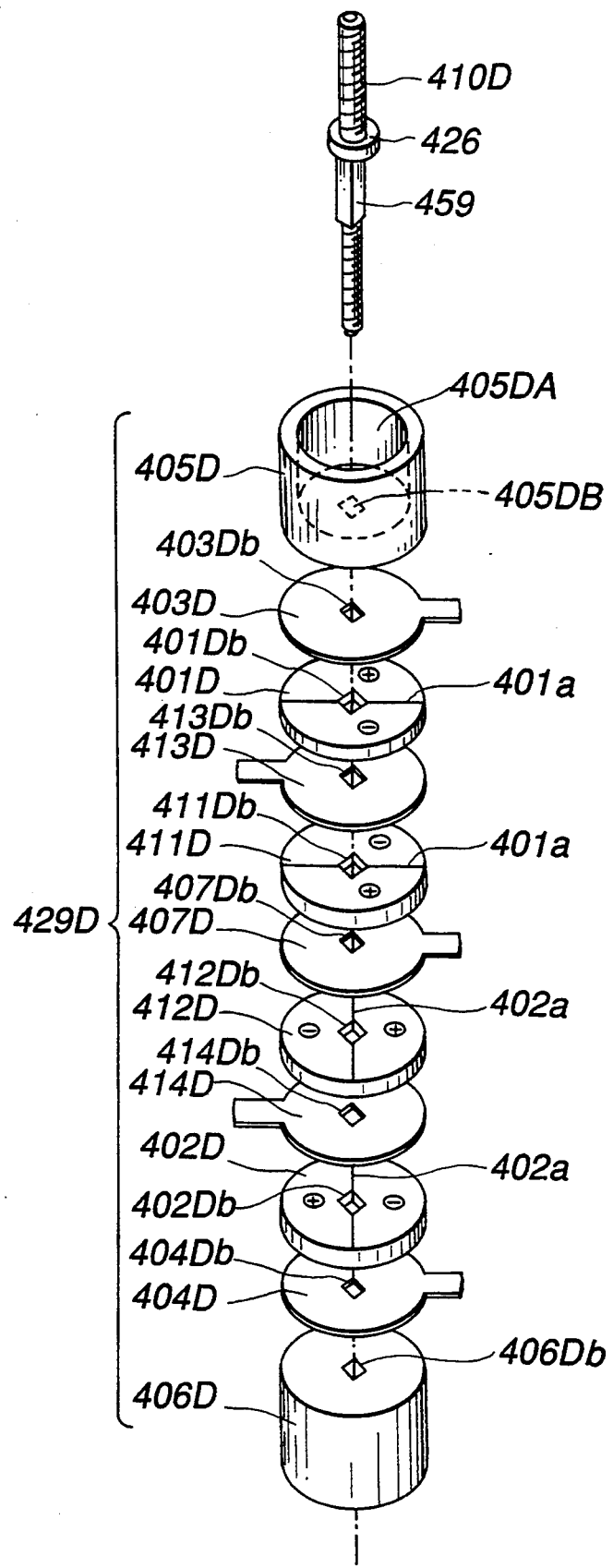
FIG. 58 is an exploded perspective view which illustrates an essential portion of an ultrasonic motor to which an ultrasonic oscillator according to a thirty-third embodiment of the present invention is adapted.
Figure 59:
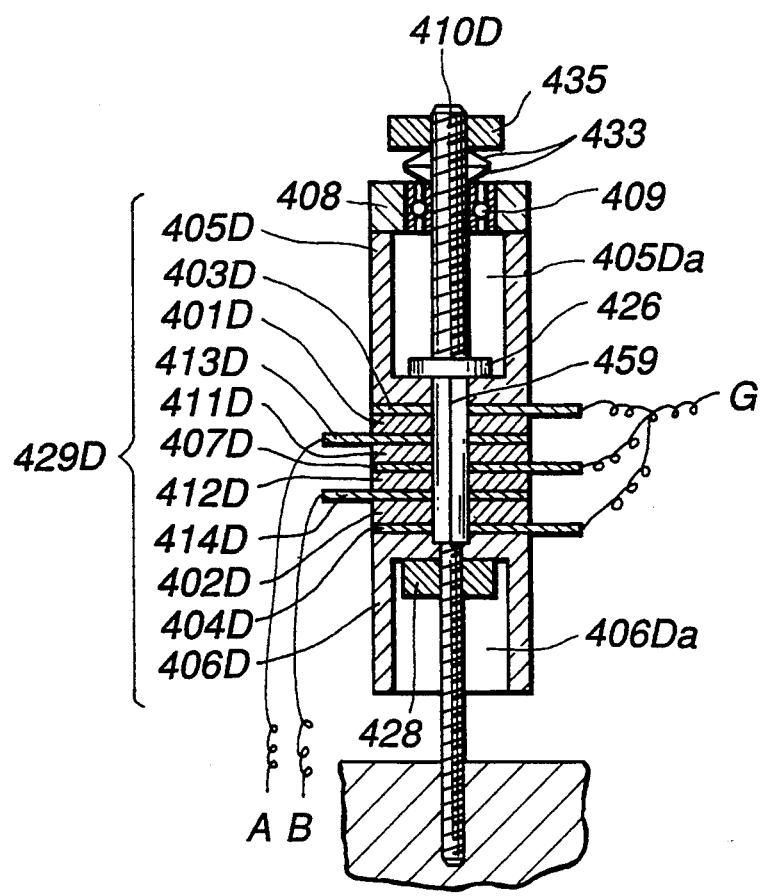
FIG. 59 is a side elevational cross sectional view which illustrates the thirty-third embodiment.

FIG. 58 is an exploded perspective view which illustrates an ultrasonic motor to which an ultrasonic oscillator according to a thirty-third embodiment of the present invention is adapted.

The thirty-third embodiment differs from the foregoing embodiments in that the boundary lines of the opposite polarizing directions are aligned by utilizing the shape of through holes of the resonators, piezoelectric element and the electrode plates, through which a fastening member passes. Since the thirty-third embodiment is the same as the thirtieth embodiment except for the foregoing arrangements, the same elements are given the same reference numerals to which symbol D is appended and only the different portions will now be described.

That is, the shape of each of the through holes which are formed in the resonators, the piezoelectric elements and the electrode plates and through which the fastening member passes is formed into, for example, a square as shown in FIG. 58. Furthermore, the portion of the fastening member 410D corresponding to the foregoing portions is formed into a guide portion 459 having the same square shape as that of each of the through holes of the piezoelectric elements and so forth. By fastening the piezoelectric elements and so forth by the fastening member 410D, first and second boundary lines 401a and 402a can be aligned to each other correctly. Since the fastening member 410D is applied with an insulating material in this case, a short circuit due to conduction of the evaporated electrodes of the piezoelectric elements and the electrode plates in the guide portion 459 of the fastening member 410D is prevented.

Figure 60:
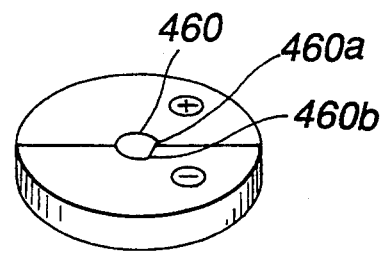
FIG. 60 is a perspective view which illustrates another example of the piezoelectric element according to the thirty-third embodiment.

Although the thirty-third embodiment has an arrangement that each of the through holes through which the fastening member passes is formed into the square, this embodiment is not limited to this. For example, an arrangement may be employed in which a through hole 60 having two corners 460a and 460b formed by cutting as shown in FIG. 60, and the guide portion 459 of the fastening member 410D is fitted to the two corners 460a and 460b.

According to the thirty-third embodiment, the boundary lines of the piezoelectric elements can easily be aligned to each other by simply staking the elements while being aligned to the guide portion 459 of the fastening member 410D. Therefore, the components can easily be assembled and a cost reduction can be expected.

Figure 61:
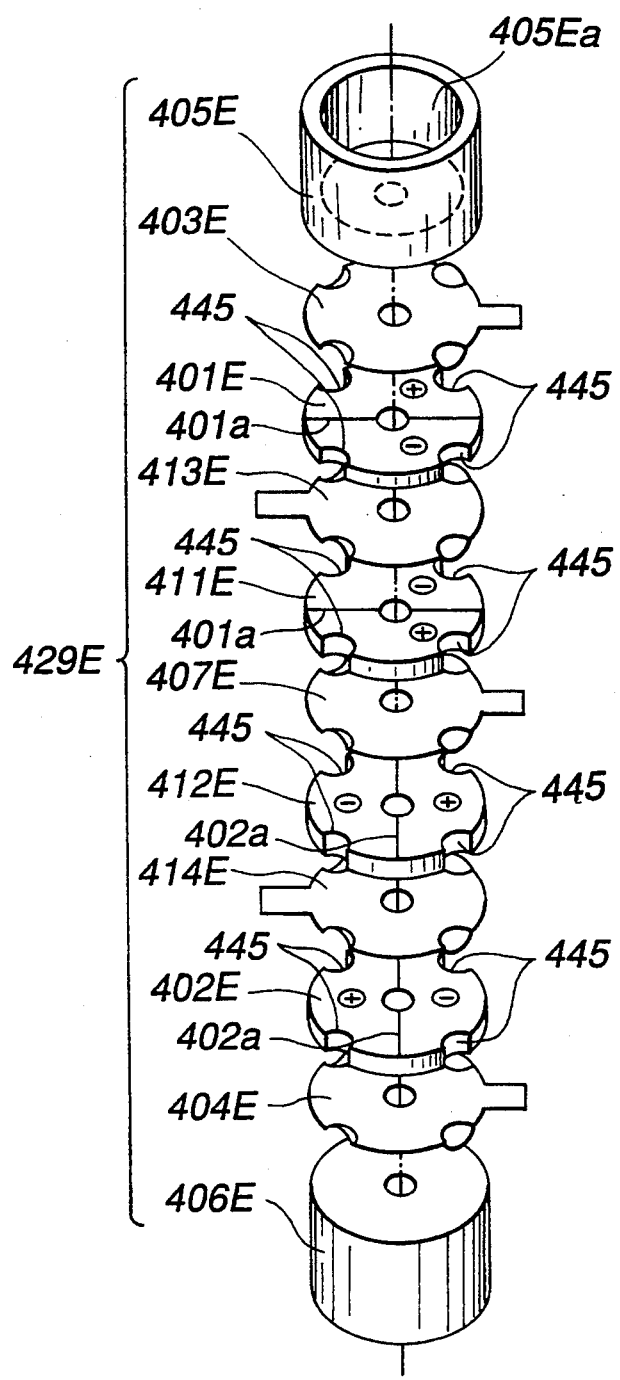
FIG. 61 is an exploded perspective view which illustrates an essential portion of an ultrasonic motor according to a thirty-fourth embodiment of the present invention.

FIG. 61 is an exploded perspective view which illustrates an essential portion of an ultrasonic motor to which an ultrasonic oscillator according to a thirty-fourth embodiment of the present invention is adapted.

The thirty-fourth embodiment differs from the foregoing embodiments in that the boundary lines of the opposite polarizing directions are aligned by fitting projections in portions of the electrode plates to grooves formed in portions of the piezoelectric elements. Since the thirty-fourth embodiment is the same as the thirtieth embodiment except for the foregoing arrangements, the same elements are given the same reference numerals to which symbol E is appended and only the different portions will now be described.

Figure 62:
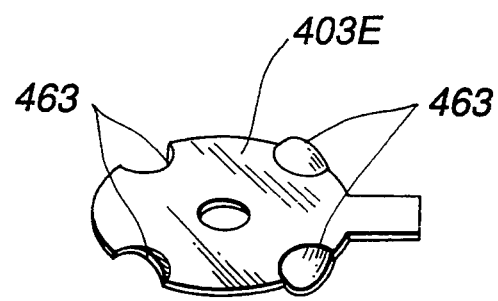
FIG. 62 is a perspective view which illustrates the electrode plate shown in FIG. 1.
Figure 63:
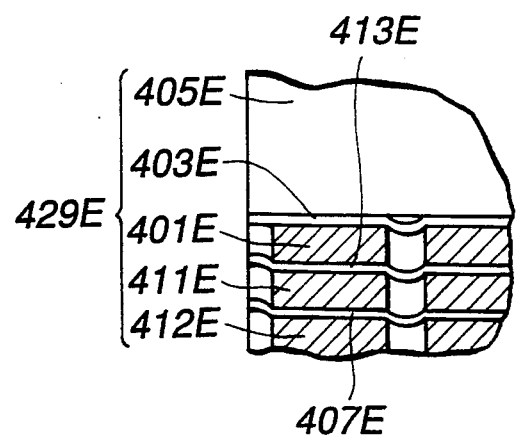
FIG. 63 is a perspective view which illustrates an essential portion which illustrates a state of assembly according to the thirty-fourth embodiment.

That is, the piezoelectric element 401E (402E, 411E and 412E) has four semicircular grooves 445 at the outer periphery thereof at intervals of 90°. The electrode plate 403E has four projections 463 on at intervals of 90° at the periphery thereof as shown in FIG. 62 to align to the semicircular grooves 445 of the piezoelectric element. Furthermore, the directions of the adjacent projections 463 are inverted. Therefore, the polarizing directions M of the piezoelectric elements are aligned similarly to the twenty-ninth embodiment and the semicircular groove 445 and the projections 463 are aligned to each other at the time of stacking them as shown in FIG. 63. Thus, an ultrasonic oscillator 429E is constituted.

Since the thirty-fourth embodiment constituted as described above enables the boundary lines 401a and 402a of the polarized regions of the piezoelectric elements to be aligned to each other by simply aligning the grooves 445 of the piezoelectric elements to the projections 463 of the electrode plates. Therefore, the elements can be assembled easily similarly to the thirty-third embodiment. The projections 463 of the electrode plates 403E and 404E facing the resonators and interposed between the resonators 405E and 406E and between the piezoelectric elements 401E and 402E are flattened by the pressure of the fastening member and the securing nut in the assembled state shown in FIG. 63. Therefore, the projections 463 do not hinder the connection of the resonators and the piezoelectric element.

According to the thirty-fourth embodiment, the elements can be assembled easily and the cost can be reduced. Furthermore, the cost can be further reduced because the electrode plates having the projections can be manufactured very easily by press working or the like.

The foregoing embodiments enable an ultrasonic motor to be provided in which the boundary lines of the piezoelectric element to be aligned accurately, the operation circuit of which can be simplified, in which the resonant frequencies can be made to coincide with each other and the spurious phenomenon can be prevented and which reveals high efficiency and strong torque.

As described above, the foregoing embodiments have arrangements that two or more aligning grooves, projections or corners are formed on the outer or inner peripheries of the piezoelectric elements serving as the first and second electricity-to-mechanical energy conversion elements. Therefore, a significant effect is exhibited in that an ultrasonic motor can be obtained in which the boundary lines of the piezoelectric elements can be easily and accurately aligned and which reveals high efficiency and strong torque.

Figure 64:
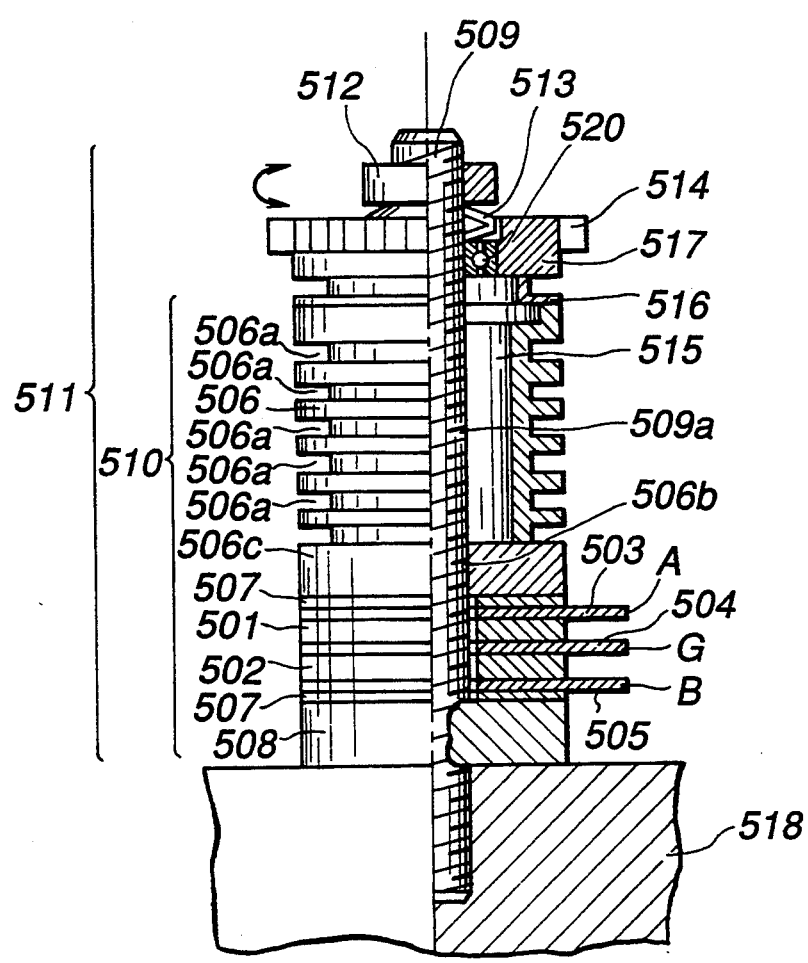
FIG. 64 is a side elevational cross sectional view which illustrates an ultrasonic motor to which an ultrasonic oscillator according to a thirty-fifth embodiment of the present invention is adapted.
Figure 65:
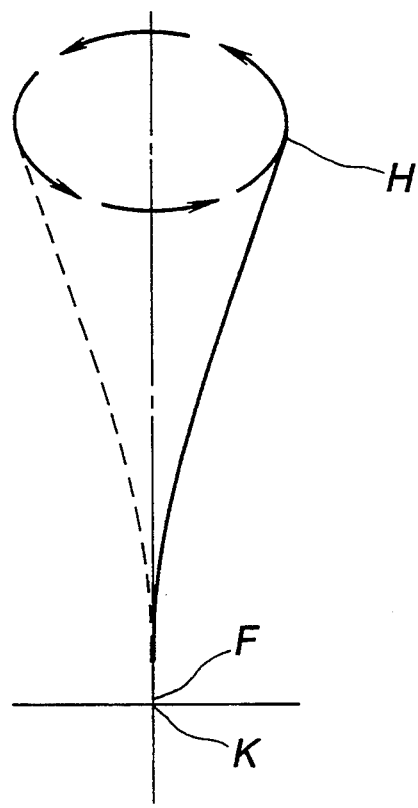
FIG. 65 is a graph which illustrates a state of oscillations of the ultrasonic motor to which the ultrasonic oscillator according to the thirty-fifth embodiment is adapted.
Figure 66:
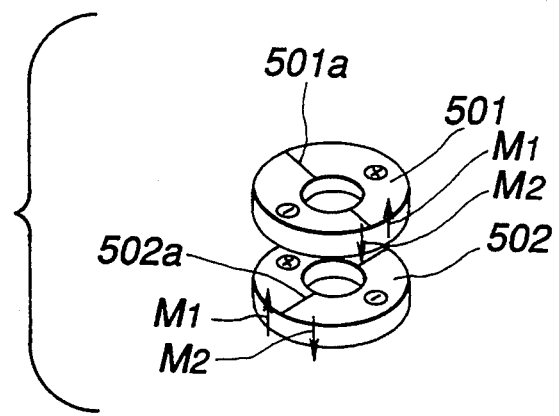
FIG. 66 is an enlarged exploded perspective view which illustrates a state of polarization of the piezoelectric elements of the ultrasonic oscillator according to the thirty-fifth embodiment.

FIGS. 64 to 66 illustrate an ultrasonic motor to which an ultrasonic oscillator according to a thirty-fifth embodiment of the present invention is adapted. FIG. 64 is a side elevational cross sectional view which illustrates the ultrasonic motor according to this embodiment, FIG. 65 is a graph which illustrates a state of oscillations of the ultrasonic motor, and FIG. 66 is an enlarged perspective view which illustrates a state of polarization of the piezoelectric element of the ultrasonic motor.

As shown in FIG. 64, a ultrasonic motor 511 according to this embodiment comprises an ultrasonic oscillator 510 having first and second piezoelectric elements 501 and 502 respectively disposed among three electrode plates 503, 504 and 505, a resonator 506 disposed to hold the first and the second piezoelectric elements 501 and 502 by the end surfaces thereof, a flange portion 508 serving as a resonator and a fastening member 509 which axially fasten the foregoing elements to integrate them. Furthermore, the ultrasonic motor comprises a rotor 517 which is pressed against an end surface (the top surface) of the ultrasonic oscillator 510 and which is a member to be rotated in a predetermined direction by the ultrasonic oscillations of the ultrasonic oscillator 510.

The first and the second piezoelectric elements 501 and 502 are each formed into an annular shape as shown in FIG. 66 and polarized opposite directions as designated by arrows M1 and M2 by polarization boundary lines 501a and 502a which respectively pass through the central portions of the first and the second piezoelectric elements 501 and 502. The first and the second piezoelectric elements 501 and 502 are disposed in a direction of stacking in such a manner that their polarization boundary lines 501a and 502a are deviated from each other by an angular degree of 90°.

The electrode plates 503, 504 and 505 are copper electrode plates each having a diameter substantially the same as that of each of the first and second piezoelectric elements 501 and 502. The electrode plates 503, 504 and 505 are arranged to apply voltages and each having a thickness of, for example, 0.075 mm. The electrode plates 503, 504 and 505 have projecting terminals A, G and B for soldering lead wires which are respectively connected to a power source (omitted from illustration).

The resonator 506 is formed into a hollow cylindrical shape having a bottom portion 506c and made of, for example, an aluminum alloy, stainless steel, phosphor bronze, duralmin or a titanium alloy or the like having excellent oscillation transmissivity. Furthermore, this embodiment has an arrangement that the resonator 506 is made of aluminum alloy subjected to an alumite oxalate coating followed by steam sealing. As a result of the steam sealing treatment, the holes in the alumite are filled with hydrate to the bottom. The resonator has a thread portion 506b at the central portion of a bottom portion 506c thereof, the thread portion 506b being engaged to a thread portion 509a formed on the surface of the fastening member 509. Thus, the thread portion 506b is engaged with the fastening member 509. The resonator 506 includes a U-shaped hollow portion 515 having an opening portion at the top surface of the resonator 506, the U-shaped hollow portion 515 being formed above the bottom portion 506c. As a result, oscillations at the top surface of the resonator 506 are not restricted by the fastening member 509. Furthermore, the resonator 506 has a plurality of grooves 506a formed on the outer surface thereof toward the central portion to contribute to enlarge the oscillations.

A flange portion 508 (a resonator) is formed in the lower portion of the fastening member 509, the flange portion 508 having a contact surface, the size and the shape of which are substantially the same as those of each of the first and the second piezoelectric elements 501 and 502. As a result, the flange portion 508 and the resonator 506 hold the electrode plates 503, 504, 505, the first and the second piezoelectric elements 501 and 502. Furthermore, annular insulating members 507 made of, for example, alumina are formed between the electrode plate 503 and the resonator 506 and between the electrode plate 505 and the flange portion 508.

The ultrasonic oscillator 510 is constituted by stacking the first and the second piezoelectric elements 501, 502, the electrode plates 503, 504 and 505, the resonator 506 and the flange portion 508 as illustrated following by application of an epoxy type adhesive agent to the surfaces of the foregoing elements, and by pressing the elements by the fastening member 509 which penetrates the central portions of the elements followed by hardening of the adhesive agent.

Furthermore, the fastening member 509 has a bolt portion further below the flange portion 508 formed in the lower portion thereof. The fastening member 509 presses the ultrasonic oscillator 510 at a position above the flange portion 508 and supports the rotor 517. The fastening member 509 presses and supports the lower end surface of the ultrasonic oscillator 510 at a position below the flange portion 508 to fix the ultrasonic motor 511.

The rotor 517 is disposed on the top surface of the ultrasonic oscillator 510, the rotor 517 being rotated in a predetermined direction due to the ultrasonic oscillations of the ultrasonic oscillator 510 and borne by the fastening member 509 via a plurality of bearings 520. The rotor 517 has a pressing mechanism in a portion opposing its surface which is in contact with the ultrasonic oscillator 510, the pressing mechanism being composed of a spring 513, which is borne by the fastening member 509, and a nut 512. As a result, the force for pressing the rotor 517 can be varied.

The rotor 517 is formed by SK material having a hardness of Hv 650 or harder due to a heat treatment. Furthermore, the rotor 517 has a portion, which is in contact with the resonator 506, and which is formed into a thin-wall flange 516 having an L-shaped cross sectional shape. Furthermore, a gear 514 for taking out an output is disposed on the outer surface of the rotor 517.

In the ultrasonic motor 511 constituted as described above, primary mode bending oscillations are rotated around the central axis of the oscillator 510 when sine wave voltage approximating to the resonant frequency is applied to the terminals A and B of the electrode plates 503 and 505 while being deviated in terms of time by 90° followed by grounding the terminal G of the electrode plate 504. As a result, the rotor 517 is rotated in a predetermined direction.

The operation of the ultrasonic oscillator according to the thirty-fifth embodiment will now be described.

FIG. 65 is a graph which illustrates a state where the ultrasonic oscillator is oscillated.

When sine wave voltages having phases deviated by 90° are applied to the ultrasonic oscillator according to the thirty-fifth embodiment, primary-mode bending oscillations are generated as elliptic oscillations rotating around the central axis because one of the end surfaces (the lower end surface) of the ultrasonic oscillator 510 is fixed at end K, the primary-mode bending oscillations being oscillations, the node F of which is at the fixed end K and the antinode H of which is the residual end surface (the top surface). The elliptic oscillations cause the rotor 517 pressed against the ultrasonic oscillator 510 to be rotated. If the phases of the two sine wave voltages are deviated by 180°, the rotational direction of the elliptic oscillations is inverted. As a result, the rotor 517 is rotated inversely.

Figure 72:
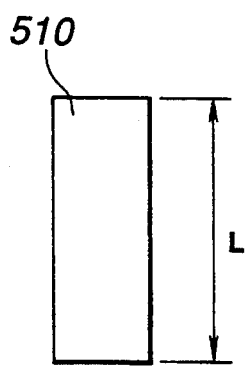
FIG. 72 illustrates a state of oscillations of an ultrasonic motor to which the ultrasonic oscillator according to the thirty-fifth embodiment is adapted.
Figure 73:
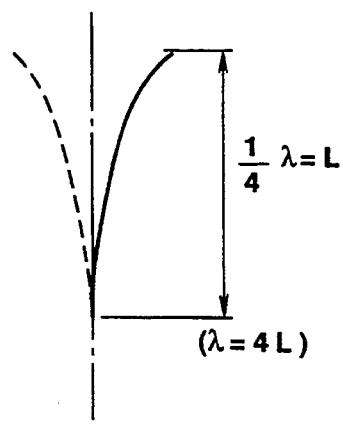
FIG. 73 is a graph which illustrates a state of oscillations of the ultrasonic motor to which the ultrasonic oscillator according to the thirty-fifth embodiment is adapted.

Assuming that the overall length of the ultrasonic oscillator 510 is L as shown in FIG. 72, the wavelength λ of the bending oscillations is expressed as follows as shown in FIG. 73:

$(\frac{1}{4}) \cdot \lambda = L \therefore \lambda = 4L$

Therefore, the resonant frequency can be lowered considerably as compared with that of the conventional ultrasonic oscillator having the two end surfaces which are free ends.

According to the thirty-fifth embodiment, the first and the second piezoelectric elements 501 and 502 are disposed adjacent to the fixed end K, that is, the node F of the bending oscillations. Therefore, the force factor can be enlarged and the electric energy can efficiently be converted into oscillation energy. As a result, the stress acting on the ultrasonic oscillator and the received electric power per unit time can be reduced, causing the heat generation to be prevented. Furthermore, the operational frequency can be lowered even if a small-size ultrasonic motor is used, causing an effect to be obtained in that the operation circuit can easily be designed.

Furthermore, the arrangement that the opening is formed in the top surface of the resonator 506 as described above enables the portion in the vicinity of the top surface not to be in contact with the fastening member 509. In addition, the groove 506a formed in the resonator 506 contributes to lower the rigidity in the bending direction and to satisfactorily eliminate the influence of the rigidity of the fastening member 509. Therefore, the amplitude of the oscillations can be made maximum at the top surface of the ultrasonic oscillator 510, causing the torque to be strengthened. Furthermore, the ultrasonic motor can be secured to the lower end surface of the ultrasonic oscillator 510 easily and reliably.

Figure 67:
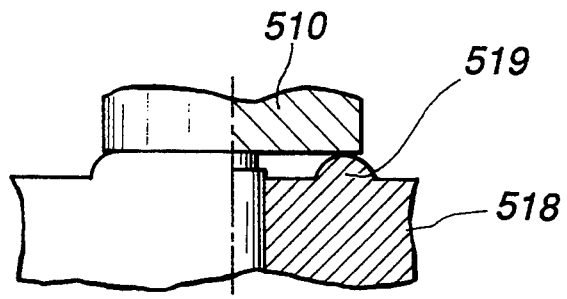
FIG. 67 is a side elevational cross sectional view which illustrates an essential portion of a thirty-sixth embodiment of an ultrasonic oscillator according to the present invention.

FIG. 67 is a side elevational cross sectional view which illustrates an essential portion of an ultrasonic oscillator according to a thirty-sixth embodiment which is a modification of the thirty-fifth embodiment.

The thirty-sixth embodiment has an arrangement of the ultrasonic oscillator according to the thirty-fifth embodiment made in such a manner that a portion supported by the securing member 518 (see FIG. 1) is improved. An annular projection 519 is formed on the top surface of the securing member 518 which comes in contact with the lower end surface of the ultrasonic oscillator 510. As a result, only the outer surface of the lower end surface of the ultrasonic oscillator 510 can be reliably supported. The outer side surface of the ultrasonic oscillator which performs bending oscillations is generally deformed significantly with respect to the central portion of the same. Therefore, one of the end surfaces of the ultrasonic oscillator can be completely made to be the fixed end (the node) by supporting only the outer surface of the lower end surface. A similar effect can, of course, be obtained by forming the annular projection 519 on the lower surface facing the flange portion 508 of the fastening member 509 though omitted from illustration.

An ultrasonic oscillator according to a thirty-seventh embodiment of the present invention will now be described.

Figure 68:
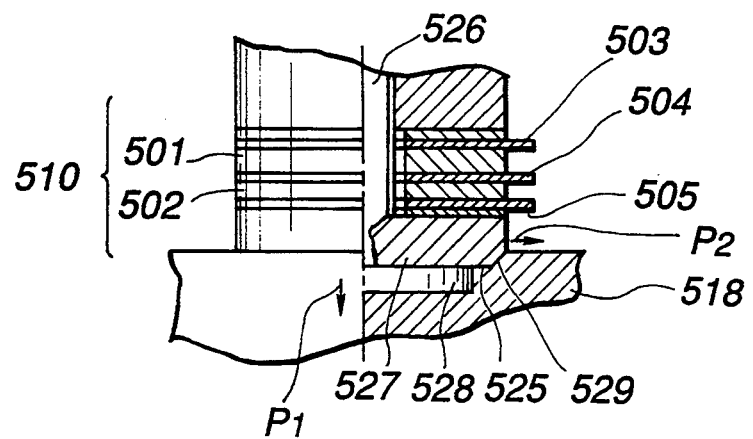
FIG. 68 is a side elevational cross sectional view which illustrates an essential portion of a thirty-seventh embodiment of an ultrasonic oscillator according to the present invention.

FIG. 68 is a side elevational cross sectional view which illustrates an essential portion of the ultrasonic oscillator according to a thirty-seventh embodiment and which illustrates the lower portion (the relationship between a fastening member and a securing member) of the ultrasonic motor.

The thirty-fifth embodiment has the arrangement that the fastening member 509 is extended to a position below the flange portion 508 (see FIGS. 64 to 66) and is secured to the securing member 518 at the extended portion. The thirty-seventh embodiment has a fastening member 526 formed in only a portion above the flange portion 527 to serve as only a bolt for pressing the ultrasonic oscillator 510. Furthermore, the securing member 518 has a two-stepped recess 528 having a stepped portion 525 is formed at its position to which the ultrasonic motor according to the thirty-seventh embodiment is secured. Furthermore, a flange 527 having a chamfering 529 in the press-fitting direction is inserted while being brought into contact with the stepped portion 525. Then, an adhesive agent such as an epoxy type adhesive agent is applied to a portion between the flange portion 527 and the securing member 518 to fix the ultrasonic motor.

By press-fitting and bonding the flange portion 527 of the fastening member 526 to the securing member 518 as described above, either of the end surfaces (the lower end surface) of the ultrasonic oscillator 510 is made to be the fixed end (node). With this supporting method, both of the radial directional oscillations P2 and the vertical oscillation P1 at the outer surface of the lower end surface of the ultrasonic oscillator 510 can be fixed. Therefore, they can be made to be complete fixed ends. The residual operations are the same as those of the thirty-fifth embodiment.

The thirty-seventh embodiment has the arrangement that the recess 528 having the stepped-portion 525 is formed in the securing member 518 and either of the end surfaces (the lower end surface) of the ultrasonic oscillator 510 is press-fitted and bonded. As a result, the lower end surface of the ultrasonic oscillator 510 can be made the fixed end of the bending oscillation. Therefore, the operational frequency can be lowered and the heat generation can be prevented.

Figure 69:
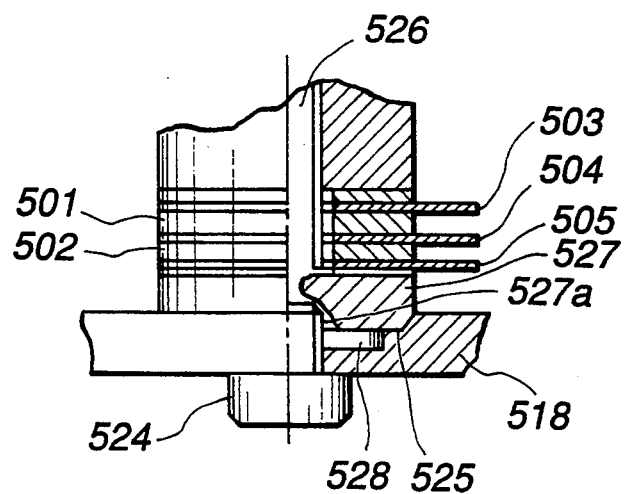
FIG. 69 is a side elevational cross sectional view which illustrates an essential portion of a thirty-eighth embodiment of an ultrasonic oscillator according to the present invention.

FIG. 69 is a side elevational cross sectional view which illustrates an essential portion of an ultrasonic oscillator according to a thirty-eighth embodiment which is a modification of the ultrasonic oscillator according to the thirty-seventh embodiment.

The recess 528 having the stepped portion 525 formed into the same shape as that according to the thirty-seventh embodiment is formed in the securing member 518 to receive the flange portion 527 of the fastening member 526 which is press-fitted. The flange portion 527 has a thread portion 527a at the central portion thereof formed from the lower end surface toward the piezoelectric elements 501 and 502. As a result, a fixing bolt 524 is inserted from the portion adjacent to the securing member 518 to secure the flange portion 527 to the securing member 518. Also this supporting method enables a similar effect to that obtainable from the thirty-seventh embodiment to be obtained.

An ultrasonic motor to which an ultrasonic oscillator according to a thirty-ninth embodiment of the present invention is adapted will now be described.

Figure 70:
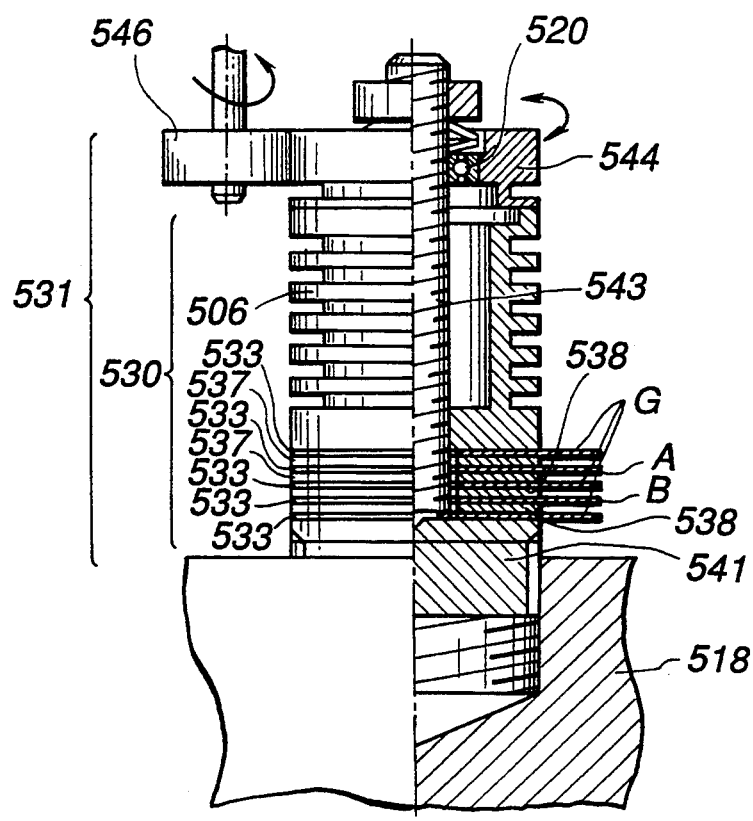
FIG. 70 is a side elevational cross sectional view which illustrates an ultrasonic motor to which an ultrasonic oscillator according to a thirty-ninth embodiment of the present invention is adapted.
Figure 71:
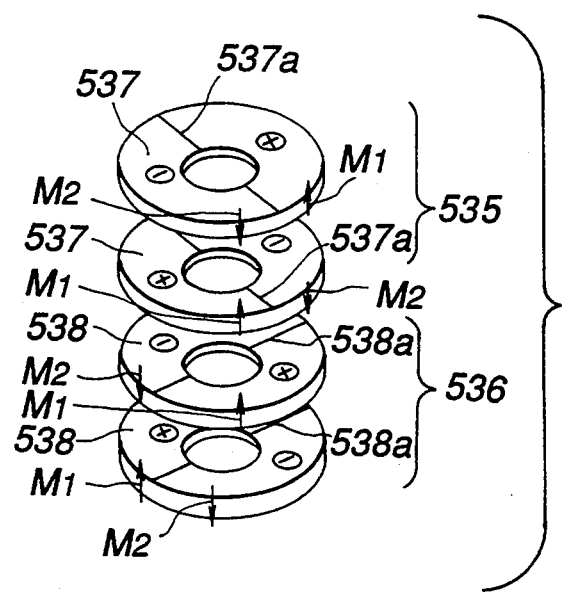
FIG. 71 is an enlarged exploded perspective view which illustrates a state of polarization of the piezoelectric elements of the ultrasonic oscillator according to the thirty-ninth embodiment of the present invention.

FIGS. 70 and 71 respectively are a side elevational view which illustrates the ultrasonic motor and an enlarged and exploded perspective view which illustrates the structure of a piezoelectric element.

As shown in FIG. 71, an annular first piezoelectric element group 535 and a second piezoelectric element group 536 are respectively divided into two polarized regions in such a manner that the polarizing directions M1 and M2 are inverted relative to each other. Each of the piezoelectric element groups 535 and 536 are composed of two piezoelectric elements 537 and 538 which are stacked in such a manner that the polarizing directions M1 and M2 are inverted relative to each other and boundary lines 537a and 538a of the polarizing regions coincide with each other. The first and second piezoelectric element groups 535 and 536 are disposed in such a manner that a first boundary line 537a of the first piezoelectric element group 535 and a second boundary line 538a of the second piezoelectric element group 536 are deviated from each other by an angular degree of 90°.

Furthermore, copper electrode plates 533 each having a terminal for soldering a lead wire and having a thickness of, for example 50 μm is each disposed between the two piezoelectric elements 537 of the first piezoelectric element group 535, between the two piezoelectric elements 538 of the second piezoelectric element group 536, and among the first piezoelectric element group 535, the second piezoelectric element group 536, the resonator 506 and a large-diameter thread portion 541 of the fastening member 518 as shown in FIG. 70. The electrode plate 533 has terminals A, B and G as illustrated so as to be applied with the voltage similar to the thirty-fifth embodiment.

The resonator 506 is constituted similar to the thirty-fifth embodiment. A fastening member 543 has a large-diameter thread portion 541, the diameter of which is the same as that of each of the piezoelectric elements 537 and 538 as illustrated. Furthermore, the fastening member 543 has a bolt portion for pressing the ultrasonic oscillator 530 from the central portion. An epoxy type adhesive agent is applied to portions among the first piezoelectric element group 535, the second piezoelectric element group 536, the electrode plates 533, the resonator 506 and the large-diameter thread portion 541. Then, the bolt portion of the fastening member 543 is inserted into the foregoing elements to press them, and the adhesive agent is hardened. As a result, the ultrasonic oscillator 530 is constituted. A rotor 544 including a bearing 520 is pressed and secured to the top surface of the ultrasonic oscillator 530 by a pressing means arranged similar to that according to the thirty-fifth embodiment. Hence, the ultrasonic motor 531 is constituted. Furthermore, a rotor 546 of an output receiving mechanism is pressed against the side surface of the rotor 544 to outwardly transmit the rotational force. The ultrasonic motor 531 is secured to a securing member 518 by the large-diameter thread portion 541 of the fastening member 543. Since the residual structures are the same as those according to the thirty-fifth embodiment, their descriptions are omitted here.

The ultrasonic oscillator 530 is, by means of the thread, secured to the securing member 518 by the large-diameter thread portion 541 of the fastening member 543 formed on the outer surface thereof. Furthermore, the outer surface of the ultrasonic oscillator 530 is secured. As a result, either of the end surfaces (the lower end surface) of the ultrasonic oscillator 530 can be assuredly made to be the fixed end (node). Furthermore, both of the radial oscillations and the vertical oscillations can be restricted similarly to the thirty-seventh embodiment. Therefore, it can be made to the complete fixed end. Furthermore, the increase of the number of piezoelectric elements 537 and 538 enable oscillations having a large amplitude to be generated at the top surface of the ultrasonic oscillator 530. Since the residual operations are the same as those of the thirty-fifth embodiment, their descriptions are omitted here.

The thirty-ninth embodiment has the arrangement that only the outer side surface of the ultrasonic oscillator 530 is secured by using the thread portion 541 of the fastening member 543 having the same diameter of each of the piezoelectric elements 537 and 538. Therefore, either of the end surfaces (the lower end surface) of the ultrasonic oscillator 530 can be assuredly made to be the fixed end (the node) while eliminating a necessity of forming an annular projection on the securing member 518. If the roller 546 arranged as illustrated and serving as the output receiving mechanism is pressed, the pressing force is applied to the ultrasonic motor 531 from the side position. The supporting method according to this embodiment is able to bear the pressing force.

Strong torque can, of course, be obtained because the number of the piezoelectric elements is increased.

As described above, according to the foregoing embodiment, an ultrasonic motor can be provided, the operational frequency of which can be lowered, in which the heat generation can be prevented, and which reveals strong torque and a high efficiency.

Figure 74:
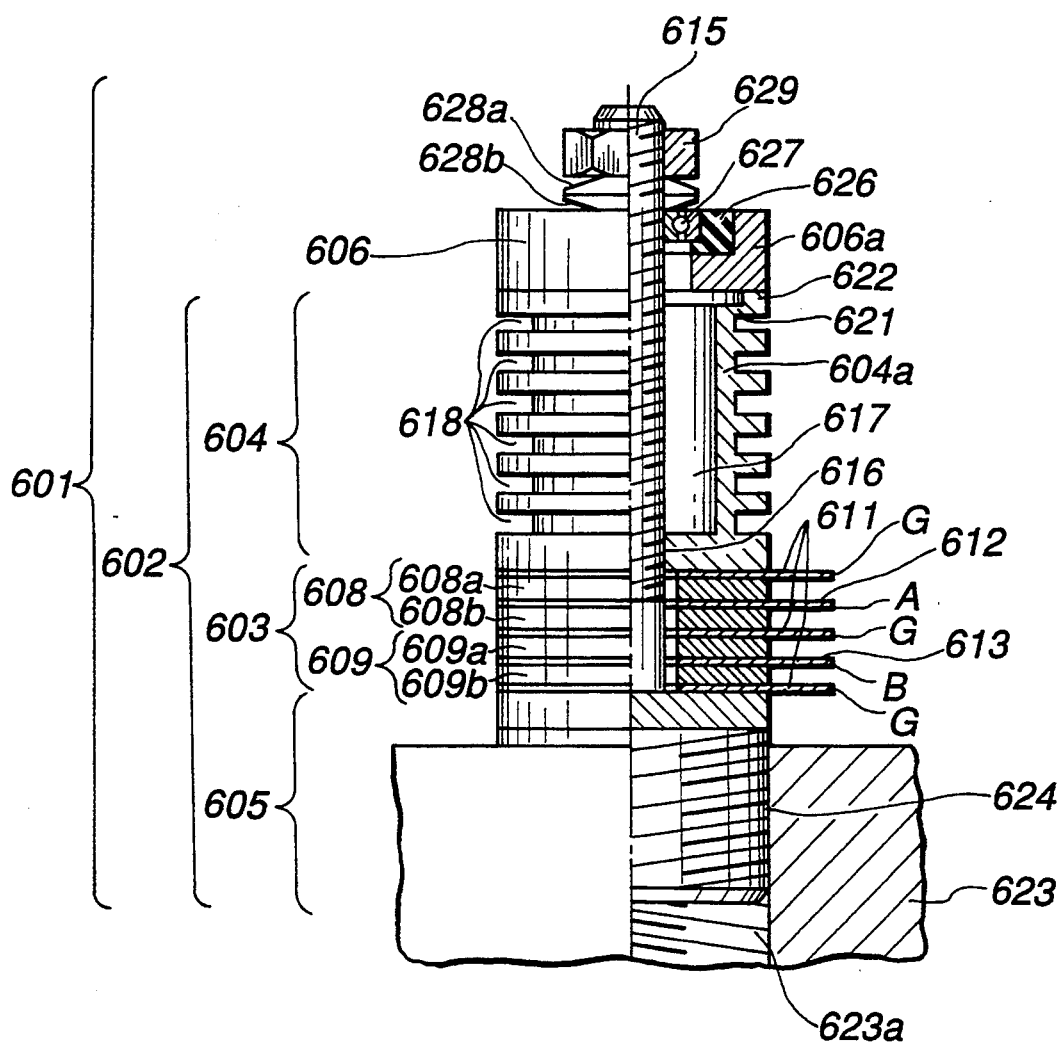
FIG. 74 is a side elevational view which illustrates the cross section of a right half portion of an ultrasonic motor to which an ultrasonic oscillator according to a fortieth embodiment of the present invention is adapted.

FIG. 74 is a side elevational view which illustrates an ultrasonic motor according to a fortieth embodiment. FIG. 74 illustrates the right half portion of the same by a cross section.

The fortieth embodiment has an arrangement that piezoelectric elements are used as the electricity-to-mechanical energy conversion elements.

An ultrasonic motor 601 mainly comprises an ultrasonic oscillator 602, and a rotor 606 pressed against the upper side surface of the ultrasonic oscillator 602 and serving as a member to be driven. The ultrasonic oscillator 602 is constituted by holding and coupling an oscillator 603 for generating original oscillations between an upper resonator 604 disposed on the top surface of the oscillator 603 and a lower resonator 605 disposed under the lower end surface.

The oscillator 603 comprises a first piezoelectric element group 608 and a second piezoelectric element group 609 each of which is composed of two annular piezoelectric elements 608a and 608b and the piezoelectric elements 609a and 609b disposed in the direction of the thickness. The piezoelectric elements are each divided into semicircular polarized regions and are disposed in such a manner that the boundary line of the boundary region of the piezoelectric element 608a and the boundary line of the boundary region of the piezoelectric element 608b coincide with each other. Furthermore, the boundary line between the piezoelectric element 608a and the piezoelectric element 608b and that between the piezoelectric element 609a and the piezoelectric element 609b coincide with each other. The two semicircular polarized regions of each of the piezoelectric element are polarized in the inverted direction relative to each other. In addition, the polarizing directions of the confronting surfaces of the two piezoelectric elements 608a and 608b and the piezoelectric elements 609a and 609b, each of which constitutes the piezoelectric element groups 608 and 609, are inverted to each other.

Furthermore, copper electrode plates 611 having a projection G for soldering a lead wire are each interposed between the first piezoelectric element group 608 and the second piezoelectric element group 609, between the top surface of the first element group 608 and the lower end surface of the top resonator 604, and between the lower end surface of the second element group 609 and the top surface of the lower resonator 605 so as to be grounded via a lead wire (omitted from illustration). Also copper electrode plates 612 and 613 having projections A and B for soldering lead wires are each disposed between the two piezoelectric elements 608a and 608b of the piezoelectric element group 608 and between the piezoelectric elements 609a and 609b of the piezoelectric element group 609. As a result, sine wave voltages, the phases of which are deviated from each other by an angular degree of 90°, are applied to the copper electrode plates 612 and 613 from an operation circuit (omitted from illustration).

The upper resonator 604 is formed into a short cylindrical shape having the same diameter as that of the oscillator 603. Furthermore, the resonator 604 has a central axial hole adjacent to the oscillator 603. The inner surface of the central axial hole has a female thread portion 616 formed therein to be fastened to a fastening member 615 serving as the supporting shaft. Furthermore, a U-shaped recess 617 is formed from the top surface of the upper resonator 604 toward the lower piezoelectric element to prevent contact between the inner portion of the upper resonator 604 and the fastening member 615. In addition, a plurality of surface grooves 618 are formed in the outer surface of the upper resonator 604 at substantially the same intervals to weaken the rigidity.

Furthermore, a flange portion 621 serving as a spring characteristics portion is formed adjacent to a contact portion 622 of the upper resonator 604 which comes in contact with the rotor 606. The flange portion 621 is horizontally extended from the top end portion of the body cylindrical portion 604a of the upper resonator 604 toward the outer surface, the flange portion 621 being formed into a thin wall shape. The flange portion 621 has a contact portion 622 having a substantially rectangular cross sectional shape formed upwards at the leading portion of the flange portion 621 toward the outer surface. The contact surface formed at the top end portion of the contact portion 622 is machined to have an accurate flat surface.

The upper resonator 604 is made of a material (for example, an aluminum alloy, stainless steel, phosphor bronze, duralmin or a titanium alloy or the like) having excellent oscillation transmissivity. The fortieth embodiment has an arrangement that the upper resonator 604 is made of aluminum alloy and an alumite oxalate film is formed on the surface thereof. Furthermore, a steam sealing treatment is performed to have the small holes of the alumite film filled with hydrate to the bottom.

The lower resonator 605 is formed into a short cylindrical shape having the same diameter as that of the oscillator 603 and made of a material (brass, copper or the like) having an inferior oscillation transmittance relative to the material of the upper resonator. The fortieth embodiment has the lower resonator 605 made of brass. Furthermore, a fastening member 615 such as a bolt serving as a supporting shaft extending from the top surface of the lower resonator 605 toward the central axis is integrally formed. In addition, the lower resonator 605 has a male thread 624 to fasten the ultrasonic motor 601 to a securing member 623 on the outer surface thereof to be engaged with a female thread 623a formed in the surface of the securing member 623.

The ultrasonic oscillator 602 constituted by the oscillator 603 and the upper resonators 604 and 605 is assembled in accordance with the following procedure: an epoxy type adhesive agent is applied among the elements, and first piezoelectric element group 608, the second piezoelectric element group 609, the electrode plates 611, 612 and 613 are placed on the lower resonator 605 while being penetrated by the fastening member 615 of the lower resonator 605. Furthermore, the upper resonator 604 is engaged to the fastening member 615 to hold and press the resonators 603 between the two oscillator 604 and 605. Then, the adhesive agent is hardened to constitute the ultrasonic oscillator 602.

The fastening member 615 integrally formed with the lower resonator 605 is arranged to press and secure the ultrasonic oscillator 602 as described above. Furthermore, the fastening member 615 also supports the rotor 606 having the pressing means. The rotor 606 comprises a relative thick annular rotor body 606a, a rubber ring 626 is received by a circular recess formed at the central portion of the upper portion of the rotor body 606a to prevent the transmission of the oscillations and a bearing 627 for fastening the rotor 606 disposed on the radial directional inside of the rubber ring 626. The bearing 627 is arranged to be fastened to the fastening member 615. That is, the rotor body 606a is rotatively supported by the fastening member 615 while interposing the rubber ring 626 and the bearing 627.

The rotor 606 is pressed against the top surface of the oscillator 602 by the pressing means. The fortieth embodiment has an arrangement that the pressing means is constituted by disposing two belleville springs 628a and 628b penetrated the fastening member 615 and disposed to face each other. Furthermore, a nut 629 is engaged to a portion above the two bellevile springs 628a and 628b to press the rotor 606. The quantity of pressing can be varied by changing the quantity of driving the nut 629. It should be noted that the rotor body 606a is made of SK material subjected to a heat treatment to have hardness of Hv 650.

The operation of the ultrasonic oscillator according to the fortieth embodiment thus constituted will now be described.

FIG. 75 illustrates a state where the ultrasonic oscillator according to this embodiment is oscillated.

When sine wave voltages are applied to the electrode plates 612 and 613, primary-mode bending oscillations are generated which has the node at the lower end portion and the antinode at the top surface of the ultrasonic oscillator 602 because the lower end portion of the ultrasonic oscillator 602 is the fixed end. The bending motion is the synthesis of linear oscillations in the perpendicular direction relative to each other generated by the two piezoelectric element groups 608 and 609 because the first piezoelectric element group 608 and the second piezoelectric element group 609 are disposed to have their electrode boundary lines deviated from each other by an angular degree of 90°. By deviating the phases of the sine wave voltages to be applied to the electrode plates 612 and 613 by an angular degree of 90°, the linear oscillations are substantially sine wave oscillations having phases which are deviated by an angular degree of 90°. By synthesizing the linear oscillations as described above, the bending oscillations are made to be elliptic oscillations including a circuit rotating around the central axis of the oscillator as shown in FIG. 75. The elliptic oscillations enable the rotor 606 pressed against the ultrasonic oscillator 602 to be rotated. If the difference between the phase of the sine wave voltage to be applied to the electrode plate 612 and that to be applied to the electrode plate 613 is further deviated by an angular degree to 180° to 270°, the rotational direction of the elliptic oscillations is inverted as designated by a dashed line arrow shown in FIG. 75. As a result, the rotor can be rotated inversely.

According to the fortieth embodiment, the ultrasonic oscillator 602 is able to stably come in contact with the rotor 606 by a thin-wall flange portion 621 which is formed adjacent to the contact portion 622 and which is a spring characteristic portion having spring characteristics. FIG. 76 schematically illustrates the state of contact brought between the rotor 606 and the oscillator contact portion 622. FIG. 77 illustrates a state where the oscillator contact portion 622 is in contact with the rotor 606. When the contact portion 622 is pressed against the rotor 606, the thin-wall flange portion 621 is deflected downwards. As a result, the rotor and the contact portion 622 are in contact with each other by a plane in place of a point. As a result of the plane contact, the contact area is increased and the force applied to a unit area can be reduced.

As a result of the deformation of the spring flange portion 621, the end surfaces of the rotor 606 and the contact portion 622 are in contact with each other for a longer time than the time of contact realized with the conventional structure. Therefore, the rotational force can easily be transmitted to the rotor 606. FIG. 76 illustrates a state of a portion opposing the point of application passing through the central portion of the end surface. As shown in FIG. 76, the rotor 606 and the contact portion 622 are assuredly separated from each other like a conventional structure.

The oscillator contact portion 622 can be operated as described under the following conditions:

Assuming that the resonant frequency of the ultrasonic oscillator 602 is f1, and the resonant frequency of the spring flange portion 621 of the contact portion 622 is f2, the following relationship must be held:

$$f1 \leq f2$$

The reason for this is that the presence of the resonant frequency of the spring flange portion 621 lower than the resonant frequency of the ultrasonic oscillator 602 will generate other undesirable mode oscillations, causing the contact to be made unstable. The resonant frequency of the thin-wall spring flange portion 621 can be freely determined and easily adjusted by changing the thickness or the dimensions of the thin-wall portion.

The rubber ring 626 disposed in the rotor 606 acts to cause the ultrasonic oscillations generated by the oscillator 602 to act on only the rotor and to prevent undesirable transmission to the fastening member 615. That is, the rubber ring 626 has an effect to insulate the oscillation.

The point is that the fortieth embodiment has the arrangement that the thin-wall spring flange portion 621 is formed in the contact portion 622 of the oscillator. Therefore, the rotor and the oscillator contact portion 622 can be stably in plane contact with each other. Therefore, the force per unit area acting on the contact portion 622 can be reduced and the wear resistance can be improved. Furthermore, the transmittance of the rotational force can be improved due to the increase of the contact time. As a result, strong torque and stable rotations can be realized. Furthermore, the cost can be reduced because the contact position is shifted from the edge of the oscillator as arranged in the conventional structure to the end surface of the oscillator.

Figure 78:
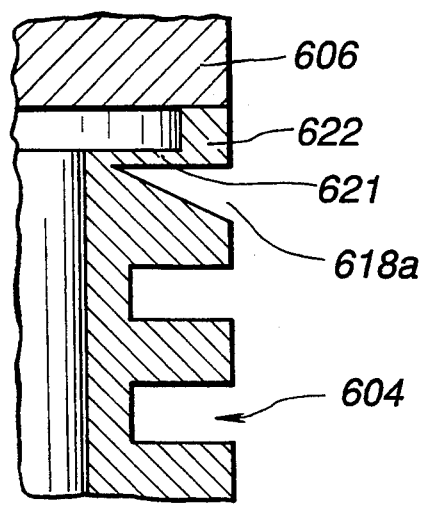
FIG. 78 is an enlarged cross sectional view which illustrates an essential portion of a contact portion between an ultrasonic oscillator according to a forty-first embodiment and the rotor.

FIG. 78 illustrates a forty-first embodiment which is a modification of the fortieth embodiment and is a partially enlarged view which illustrates a contact portion.

Also the forty-first embodiment has the same operation and effect as that obtainable from the fortieth embodiment.

Figure 79:
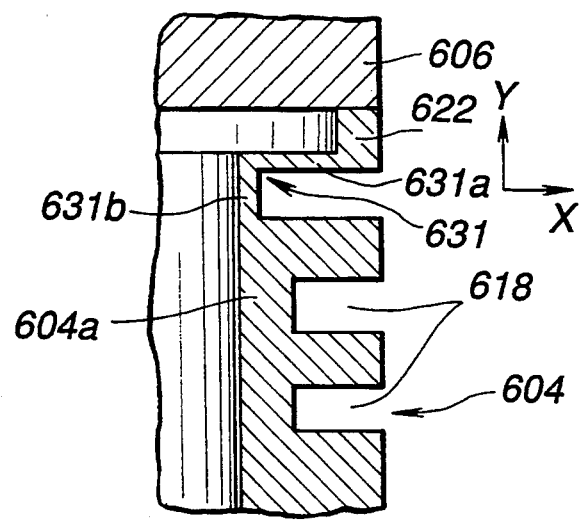
FIG. 79 is an enlarged cross sectional view which illustrates an essential portion of a contact portion between an ultrasonic oscillator according to a forty-second embodiment and the rotor.

FIG. 79 is an enlarged cross sectional view which illustrates the contact portion between an ultrasonic oscillator and a rotor according to a forty-second embodiment of the present invention.

Since the structure of an ultrasonic motor to which the ultrasonic oscillator according to the forty-second embodiment is adapted is substantially the same as that according to the fortieth embodiment, only the different portions will now be described.

This embodiment has an arrangement that an L-shaped spring characteristics portion 631 is formed in the contact portion 622 which is made of a material similar to the upper resonator 604 and which comes in contact with the rotor 606. More in detail, the L-shaped spring characteristics portion 631 comprises a horizontal flange portion 631a horizontally formed from the contact portion 622 toward the central axis by deeply cutting the uppermost surface groove 618. The L-shaped spring characteristics portion 631 further comprises a vertical wall portion 631b of the body cylindrical portion 604a of the upper resonator 604, the vertical wall portion 631b being formed on the horizontal flange portion 631a adjacent to the central axis. The flange portion according to the fortieth embodiment corresponds to the horizontal flange portion 631a according to this embodiment. This embodiment further comprises the vertical wall portion 631b.

The fortieth embodiment has the arrangement that the flange portion is deformed in only the axial direction (a direction designated by an arrow Y shown in FIG. 79) of the ultrasonic oscillator 602. However, the forty-second embodiment employs the spring characteristics portion 631 having the L-shaped cross sectional shape to deform the horizontal flange portion 631a in the axial direction (the direction designated by the arrow Y) of the ultrasonic oscillator 602. Furthermore, the vertical wall portion 631b is deformed in the radial direction (a direction designated by the arrow X).

Since the oscillator contact portion 622 and the rotor 606 are brought into plane-contact with each other similar to the fortieth embodiment, the force per unit area can be reduced. Furthermore, the rotational force can easily be transmitted. Furthermore, the L-shaped spring characteristics portion 631 has spring characteristics in both of the directions X and Y. Therefore, the characteristics for following the bending oscillations of the ultrasonic oscillator 602 can be improved. Hence, the end surface of the contact portion 622 can easily be brought into contact with the rotor 606, causing the contact state to be made more assuredly.

The forty-second embodiment thus arranged enables a further satisfactory contact state to be obtained, causing further stable rotations and strong torque to be realized.

Figure 80:
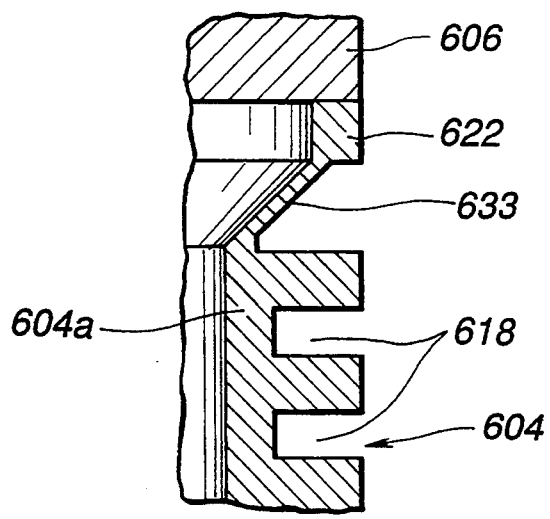
FIG. 80 is an enlarged cross sectional view which illustrates an essential portion of a contact portion between an ultrasonic oscillator according to a forty-third embodiment and the rotor.

FIG. 80 is a partially enlarged view which illustrates a forty-third embodiment which is a modification of the forty-second embodiment.

The forty-third embodiment has a spring characteristics portion 633 inclined from the contact portion 622 of the oscillator 602 toward the lower portion in the axial direction of the upper resonator 604 so as to be connected to the body cylindrical portion 604a of the upper resonator 604. Even if the spring characteristics portion having the foregoing shape is used, the spring characteristics can be attained in both of the directions X and Y and an effect similar to that obtainable from the forty-second embodiment can be obtained.

Figure 81:
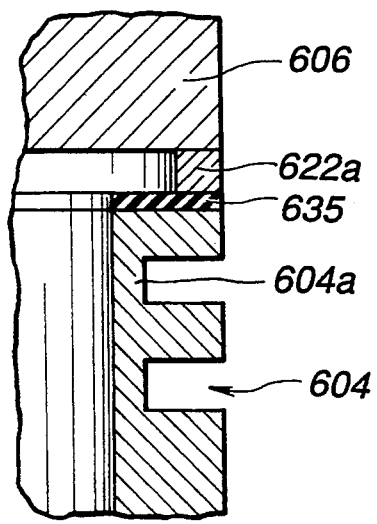
FIG. 81 is an enlarged cross sectional view which illustrates an essential portion of a contact portion between an ultrasonic oscillator according to a forty-fourth embodiment and the rotor.

FIG. 81 is an enlarged cross sectional view which illustrates a contact portion between the ultrasonic oscillator and a rotor according to a forty-fourth embodiment.

The ultrasonic motor 601 according to the forty-fourth embodiment has an arrangement substantially the same as that according to the fortieth and the forty-second embodiments. The descriptions will, therefore, be made about the different portions.

The forty-fourth embodiment has an arrangement that an elastic sheet member 635 having a contact surface substantially the same as the top end surface of the body cylindrical portion 604a of the upper resonator 604 is connected to the upper end surface, the elastic sheet member 635 being formed into a thin-wall annular shape. The elastic sheet member 635 is made of a polymer, the rigidity of which is lower than that of metal and which has flexibility. Furthermore, an annular contact member 622a made of the same material as that of the upper resonator 604 is connected to the upper portion of the elastic sheet member 635. The forty-fourth embodiment has an arrangement that the elastic sheet member 635 forms the spring characteristics and is made of Neoprene rubber as the polymer.

Figure 82:
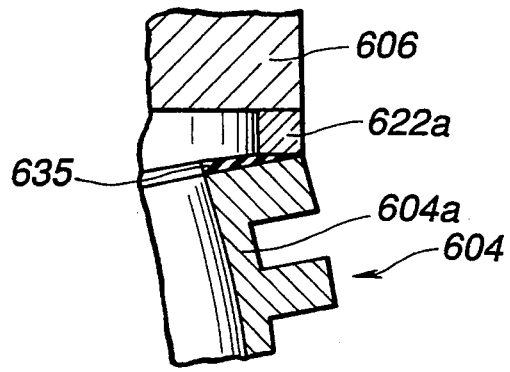
FIG. 82 is an enlarged cross sectional view which illustrates an essential portion of a contact portion between an ultrasonic oscillator according to a forty-fourth embodiment and the rotor.

FIG. 82 is an enlarged cross sectional view which schematically illustrates a state of operation of the contact portion 622a and the rotor 606 of the oscillator thus constituted.

Since the polymer has low rigidity and possesses flexibility as described above, it is elastically deformed by the stress transmitted from the contact member 622a to bring the contact member 622a into plane-contact with the rotor 606. The spring characteristics of the polymer is obtained from the elastic deformation and an operation can be performed which is similar to that obtainable from the thin-wall flange portion according to the fortieth and forty-second embodiment.

Even if the elastic deformation of the polymer is used as described above, a similar effect can be obtained to that obtainable from the fortieth and the forty-second embodiments. Therefore, strong torque, stable rotations and wear resistance can be attained.

The polymer is not limited to the Neoprene rubber according to the forty-fourth embodiment. Engineering plastic which meets the conditions, for example, PPS resin containing carbon short fiber may be employed. Similar to the fortieth and forty-second embodiments, it is preferable that the resonant frequency of the portion including the elastic sheet member 635 and the contact member 622a is higher than the resonant frequency of the ultrasonic oscillator.

As described above, according to the foregoing embodiment, stable motor performance can be obtained due to the reliable contact between the oscillator and the member to be driven. Furthermore, the contact portion has durability against wear.

Figure 83:
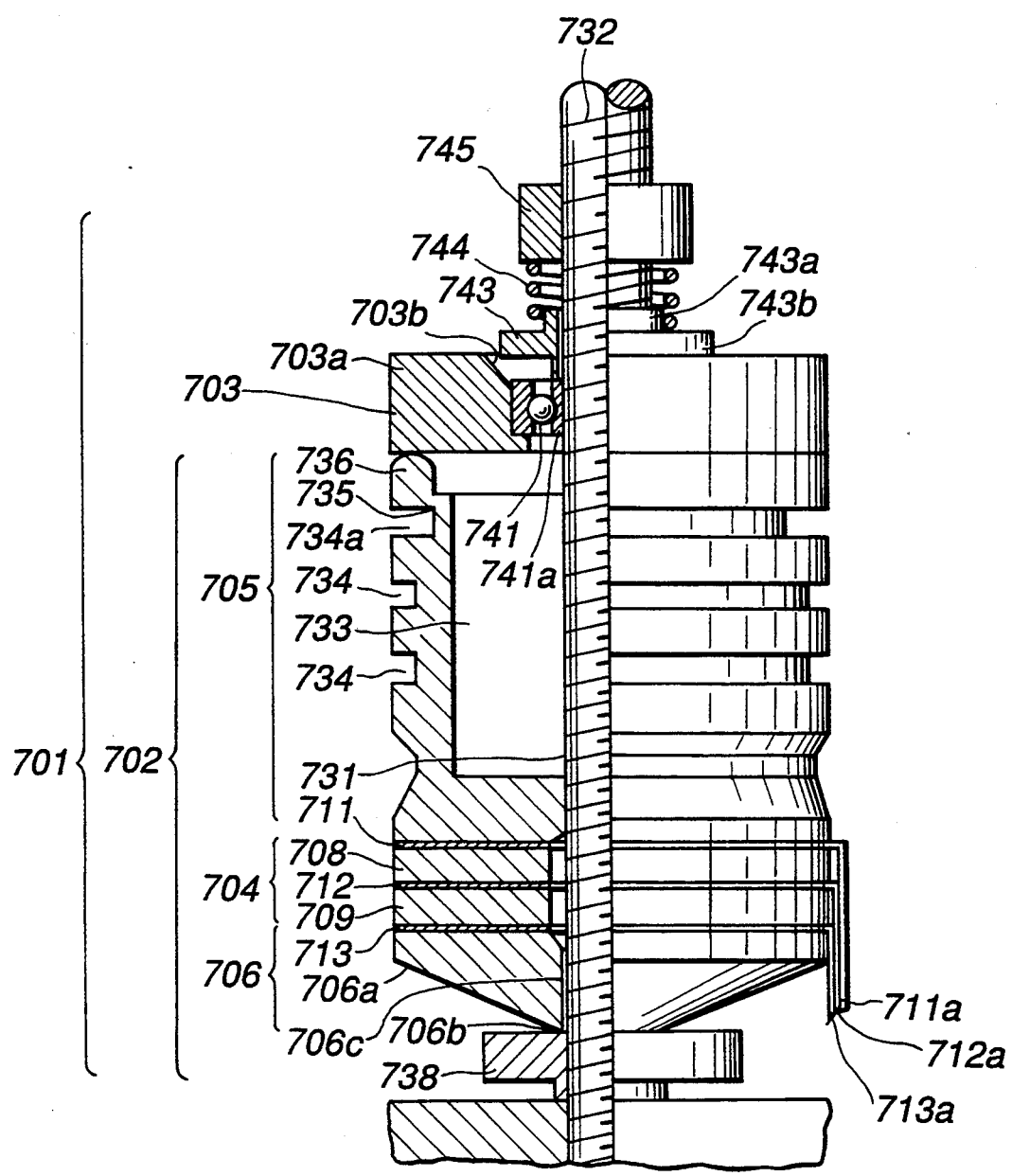
FIG. 83 is a side elevational view which illustrates the cross section of a left half portion of an ultrasonic motor to which an ultrasonic oscillator according to a forty-fifth embodiment of the present invention is adapted.

FIG. 83 illustrates a forty-fifth embodiment of the present invention.

This embodiment has piezoelectric elements each having the surface, to which voltage is applied, and which is applied with evaporated silver, the piezoelectric elements serving as the electricity-to-mechanical energy conversion elements.

An ultrasonic motor 701 mainly comprises an ultrasonic oscillator 702 and a rotor 703 pressed against the top surface of the ultrasonic oscillator 702 and serving as a member to be driven. The ultrasonic oscillator 702 is constituted by holding a resonator 704 for generating original oscillations by an upper resonator 705 disposed on the top surface of the oscillator 704 and a lower resonator 706 disposed on the lower end surface of the same.

Figure 87:
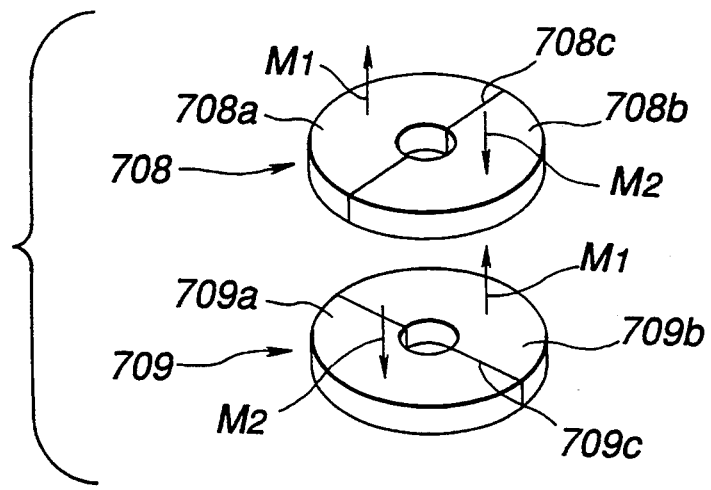
FIG. 87 is a perspective view which illustrates first and second piezoelectric elements of the ultrasonic oscillator according to the forty-fifth embodiment.

The oscillator 704 has an annular first piezoelectric element 708 and a second piezoelectric element 709 stacked in the direction of their thickness. The piezoelectric elements 708 and 709 respectively are divided into semicircular polarized regions 708a and 708b and regions 709a and 709b as shown in FIG. 87. The piezoelectric elements 708 and 709 are so disposed that boundary line 708c of the polarized region of the piezoelectric element 708 and a boundary line 709c of the polarized region of the piezoelectric element 709 are deviated from each other by an angular degree of 90°. The directions of polarizations of the polarized regions 708a and 708b are inverted relative to each other. For example, the region 708a is polarized upwards (as designated by an arrow M1) and the region 708b is polarized downwards (as designated by an arrow M2). Also the piezoelectric element 709 is polarized in such a manner that the region 709a has a downward polarization (as designated by an arrow M2) and the region 709b has an upward polarization (as designated by an arrow M1).

As shown in FIG. 83, flexible printed substrates 711, 712 and 713 serving as electrode plates for applying voltage to the piezoelectric elements 708 and 709 respectively are disposed on the top surface of the first piezoelectric element 708, between the first piezoelectric element 708 and the second piezoelectric element 709 and on the lower end surface of the second piezoelectric element 709.

Figure 84:
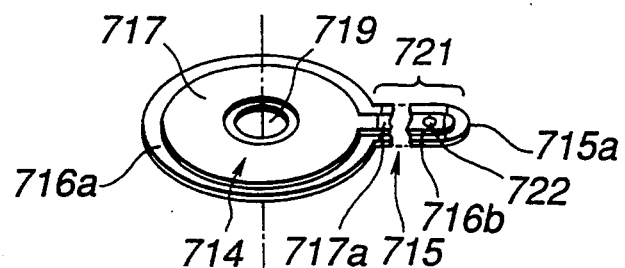
FIG. 84 is a perspective view which illustrates a flexible printed substrate of the ultrasonic oscillator according to the forty-fifth embodiment.
Figure 85:
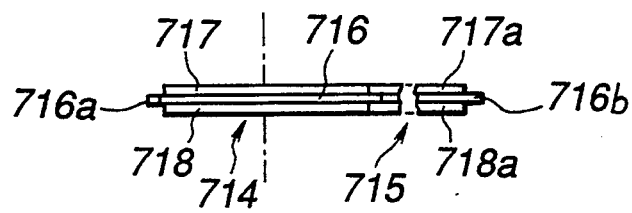
FIG. 85 is a side elevational view which illustrates the flexible printed substrate of the ultrasonic oscillator according to the forty-fifth embodiment.

As shown in FIGS. 84 and 85, each of the flexible printed substrates 711, 712 and 713 has an elongated connection portion 715 extending in the radial direction and an annular voltage applying portion 714 formed by a base plate 716 and copper foil films 717 and 718 disposed on the top surface and the lower surface of the base plate 716.

The voltage applying portion 714 has a central axis hole 719 having the same diameter as that of the piezoelectric elements 708 and 709. The voltage applying portion 714 is formed by printing copper foil films 717 and 718, which apply voltages, to reach the outer periphery and to a position adjacent to the hole 719 in the inward direction, the copper foil films 717 and 718 being formed on the upper and lower surfaces of an annular base plate 716a having the same outer diameter as that of the piezoelectric elements 708 and 709.

Figure 86:
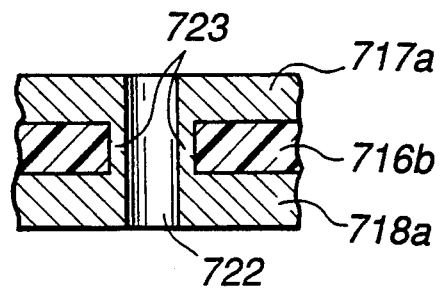
FIG. 86 is an enlarged cross sectional view which illustrates a through hole of the flexible printed substrate of the ultrasonic oscillator according to the forty-fifth embodiment.

The connection portion 715 is formed by an elongated base plate 716b integrally projecting in the radial direction from the base plate 716a of the voltage applying portion 714 and elongated copper foil films 717a and 718a formed integrally with the copper foil films 717 and 718 on the upper and the lower surfaces of the elongated base plate 716b, the copper foil films 717a and 718a having a size which is relatively smaller than that of the base plate 716b. The two sides of the connection portion 715 are subjected to an insulating treatment 721 in order to prevent undesirable conduction to other portions. Furthermore, the copper foil appears in only the leading portion of the connection portion 715. In addition, a through hole 722 is formed in the leading portion of the connection portion 715. The through hole 722 has a copper foil film 723 applied to the inner wall thereof to establish conduction between the upper copper foil 717a and the lower copper foil 718a as shown in FIG. 86. It should be noted that the through hole 722 is formed in a portion subjected to the insulating treatment 721. On the other hand, a leading portion 715a of the connection portion 715 is formed into a semicircular shape.

This embodiment has an arrangement such that the base plate 716 is made of a polyimide resin to have a thickness of 25 μm. The copper foil films 717 and 718 each have a thickness of 9 μm.

Referring back to FIG. 83, the resonator 705 is made of a material for example, an aluminum alloy, stainless steel, phosphor bronze, duralmin or a titanium alloy or the like having excellent oscillation transmissivity. The resonator 705 according to this embodiment is made of SUS440C subjected to heat treatment to have a hardness of Hv 800 or harder.

The resonator 705 is formed into a short cylindrical shape having a bottom and having an outer diameter which is the same as the diameter of the oscillator 704. The resonator has a central axis hole 731 in the lower portion thereof adjacent to the oscillator 704. The central axis hole 731 has, in the inner surface thereof, a female thread portion to be engaged with a fastening member 732 serving as the supporting shaft. Furthermore, a U-shaped recess 733 is formed from the top surface of the upper resonator 705 toward the lower oscillator 704 in order to prevent the contact between the inner portion of the upper resonator 705 and the fastening member 732. In addition, a plurality of peripheral grooves 734 are formed in the outer surface of the upper resonator 705 at substantially uniform intervals in order to weaken the rigidity. In particular, a peripheral groove 734a nearest the contact surface with the rotor is formed more deeply to form a thin-wall flange portion 735 under a top end portion 736. As a result, the top end portion 736 has the spring characteristics.

The lower resonator 706 disposed on the lower surface of the oscillator 704 is made of a material (brass or steel) having inferior oscillation transmission relative to that of the upper resonator 705. The lower resonator 706 according to this embodiment is made of S45C. The lower resonator 706 has a downward taper 706a on the outer surface thereof to cause the lower surface portion 706b to be in linear contact with a pressing nut 738. The central axis hole 706c formed in the lower resonator 706 has a diameter slightly larger than that of the fastening member 732 to prevent direct contact with the fastening member 732.

The upper and the lower resonators 705 and 706 are subjected to an insulating treatment (for example, an insulating film is formed) except for a portion of the upper resonator 705 which comes in contact with the rotor 703 and a portion of the lower resonator 706 which comes in contact with the pressing nut 738.

The ultrasonic oscillator 702 composed of the foregoing oscillator 704, the upper and the lower resonators 705 and 706 is assembled in accordance with the following procedure: after an epoxy type adhesive agent has been applied to the surfaces of the elements to bonded, the upper resonator 705 and the pressing nut 738 are driven to be received by the fastening member 732 in a state where the first and the second piezoelectric elements 708 and 709, the flexible printed substrates 711, 712 and 713 and the lower resonator 706 are penetrated by the fastening member 732, which is a bolt, to press between them. Then, the adhesive agent is hardened so that the ultrasonic oscillator 702 is constituted.

The fastening member 732 holds the ultrasonic oscillator 702 and also holds the rotor 703 as described above. The rotor 703 comprises a relatively thick annular rotor body 703a and a bearing 741 for fastening the rotor 703, the bearing 741 being disposed at the central portion on the radial directional inside portion of the central portion in the direction of the thickness of the rotor body 703a. That is, the rotor body 703a is rotatably supported by the fastening member 732 while interposing a bearing 741.

Furthermore, the rotor 703 is pressed against the top surface of the oscillator 702 by a pressing means. The pressing means according to the forty-fifth embodiment presses the rotor 703 by means of a structure in which a spring mounting 743 is placed on an inner ring 741a fixed to the fastening member 732 and a coil spring 744 is disposed on the mounting 743 and a nut 745 is received by the fastening member 732 from an upper position. The quantity of pressing can be varied by changing the quantity of driving the nut 745. The spring mounting 743 has a flange 743b at an intermediate position of the outer surface of a short cylindrical member 743a. The diameter of an axial hole formed in the short cylindrical member 743a is made to be relatively larger than the outer diameter of the fastening member 732. Furthermore, the rotor body 703a has, in the upper portion of the inner surface thereof, a concave recess 703b in order to prevent contact between the rotor body 703a and the spring mounting 743.

The rotor body 703 according to this embodiment is made of aluminum alloy, the surface of which is subjected to alumite oxalate.

The flexible printed substrates 711 and 713 are arranged to be applied with sine wave voltages from an operation circuit (omitted from illustration) via corresponding connection portions 711a and 713a. Furthermore, the flexible printed substrate 712 is grounded via a connection portion 712a of the flexible printed substrate 712.

Figure 88:
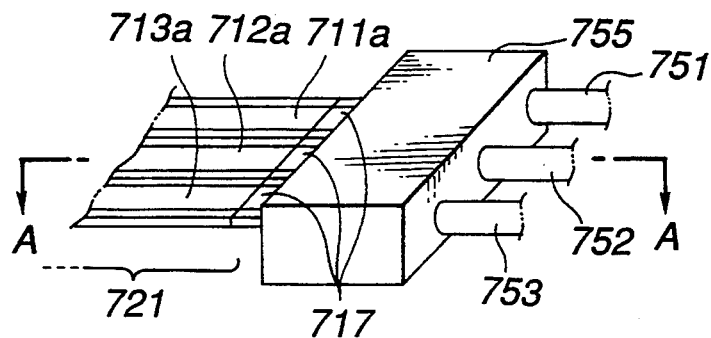
FIG. 88 is a perspective view which illustrates a state of contact between the flexible printed substrate and a lead wire of the ultrasonic oscillator according to the forty-fifth embodiment by means of a connector.

Lead wires are connected to the connection portions 711a, 712a and 713a in such a manner that the leading portions (portions in which the copper foil appears) of the connection portions 711a, 712a and 713a are inserted into a connector 755 to which lead wires 751, 752 and 753 are connected as shown in FIG. 88. As a result, conduction is established so that the lead wires 751, 752 and 753 are connected.

Figure 89:
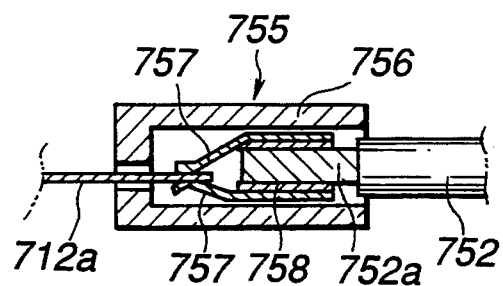
FIG. 89 is a cross sectional view taken along line AA which illustrates the connector shown in FIG. 88.

The internal structure of the connector 755 differs depending upon the products on the market. For example, the cross section of the connector 755, the perspective view of which is shown in FIG. 88, is cut in a direction designated by an arrow A along an alternate long and short dash line is shown in FIG. 89. The connector 755 has an arrangement that two leaf springs 757 are disposed in a connector case 756 to face each other, a conductive portion 752a of a lead wire 752 is inserted and subjected to soldering 758 in either opening formed in the leaf spring 757 to be supported and made conductive. Furthermore, a connection portion 712a of the flexible printed substrate 712 is inserted into the residual opening to be made conductive with the copper foil formed on the substrate 712.

The ultrasonic motor thus structured and according to this embodiment is operated in the same manner as a known ultrasonic motor. That is, when sine wave voltages having the phases deviated from each other by an angular degree of 90° are applied from the voltage applying portion to the first and second piezoelectric elements 708 and 709 via the connection portions 711a and 713a of the flexible printed substrates 711 and 713, bending oscillations rotating around the central axis are generated in the ultrasonic oscillator 702. The bending oscillations cause the rotor 703 to be rotated. The polyimide resin used to make the flexible printed substrates 711, 712 and 713 has a very low oscillation transmission speed as compared with SUS440C or the like employed to make the upper resonator 705. The acoustic impedance of the polyimide resin is considerably different from it. However, the thickness of the substrate is minimized to minimize the absorption of the ultrasonic oscillations by the polyimide resin to prevent hindering of the oscillation characteristics.

The copper foil on the flexible printed substrates 711, 712 and 713 has a thin thickness of 9 $\mu$m to follow small waves and projections and pits of the end surface of each of the resonators 705, 706, and the piezoelectric elements 708 and 709 by the pressure applied at the time of assembling the ultrasonic oscillator 702. Therefore, undesirable separation taking place at the time of employing a metal electrode plate or small void in the oscillator can be prevented. By using the thin flexible printed substrates, performance that can be realized when metal electrode plates are employed can be maintained. The performance of the ultrasonic motor does not deteriorate critically in terms of practical use if the thickness of the flexible printed substrate is 100 $\mu$m or less. However, if the thickness is larger than 100 $\mu$m, the performance deteriorates excessively.

The flexible printed substrate enables the connection portion to be formed along the outer surface of the oscillator thanks to the flexibility which is the feature of the flexible printed substrate.

The ultrasonic motor having the electrode plates made of the flexible printed substrates as shown in FIG. 83 enables the portion projecting from the ultrasonic oscillator to be reduced. Therefore, the ultrasonic motor can be disposed in a small space, causing a satisfactory effect to be obtained if the size of the motor is reduced. Furthermore, the flexible printed substrate can easily be connected to lead wires by using the connector or the like. Therefore, the cost can be reduced because the manufacturing process can be simplified.

Figure 90:
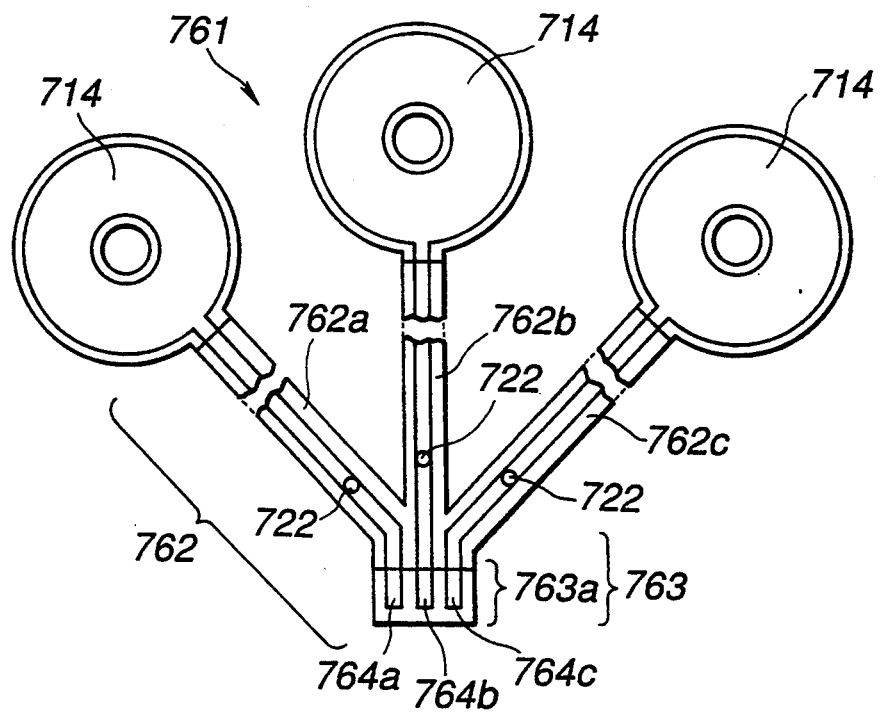
FIG. 90 is a plan view which illustrates a flexible printed substrate of an ultrasonic oscillator according to a forthy-sixth embodiment of the present invention.

FIG. 90 illustrates a forty-sixth embodiment of the present invention. An ultrasonic oscillator according to the forty-sixth embodiment has a similar structure to that according to the forty-fifth embodiment. Therefore, a flexible printed substrate which is different from that according to the foregoing embodiment will now be described. Descriptions about forty-seventh, forty-eighth and forty-ninth embodiments will be made similarly.

The flexible printed substrate according to the forty-sixth embodiment is structured by connecting the three flexible printed substrates according to the forty-fifth embodiment at their leading portions.

A flexible printed substrate 761 has a connection portion 762 branched into three sections. The connection portion 762 has connection branches 762a, 762b and 762c each of which has a voltage applying portion 714 arranged similarly to that according to the forty-fifth embodiment. A starting portion 763 at which the connection portion 762 is branched into three sections is formed as binding the connection branches 762a, 762b and 762c in parallel. Elongated copper foil films 764a, 764b and 764c formed while interposing the connection branches 762a, 762b and 762c are so arranged that they do not contact each other even at the branching starting portion 763.

Similarly to the forty-fifth embodiment, the through hole 722 is formed in each portion adjacent to the branching starting portion 763 to conduct the copper foil on the upper surface to that on the lower surface, the connection portion 762 is subjected to an insulating treatment except for a base portion 763a of the branching starting portion 763, and the end portions of the copper foil films 764a, 764b and 764c are allowed to appear in the base portion 763a.

Figure 91:
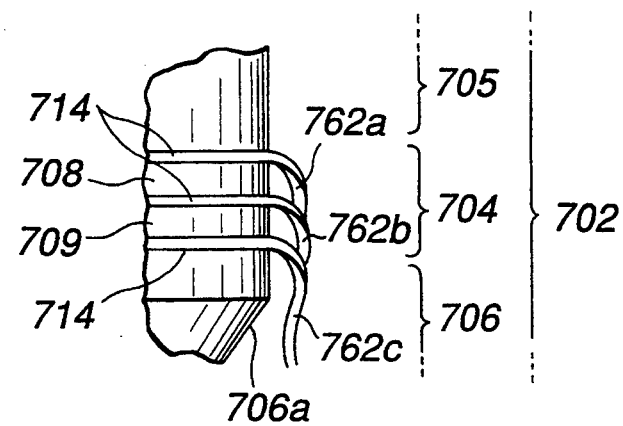
FIG. 91 is an enlarged cross sectional view which illustrates an essential portion of a state of bending of the connection portion of the flexible printed substrate shown in FIG. 90.

FIG. 91 is an enlarged side elevational view which illustrates the connection portion 762 of an ultrasonic oscillator which employs the flexible printed substrate 761. The connection portion 762 of the base substrate 761 is bent at a position adjacent to the voltage applying portion 714 to be bent downwards along the side surface of the oscillator 702.

Also the operation of the ultrasonic motor according to the forty-sixth embodiment arranged as described above is performed similar to the forty-fifth embodiment.

Since the forty-sixth embodiment has the arrangement that the connection portions of the voltage application portions of the three electrode plates are integrally formed at their end portions, connection to the connector can easily be established. As a result, wiring can be connected simply and the reliability of the connection can be improved.

Figure 92:
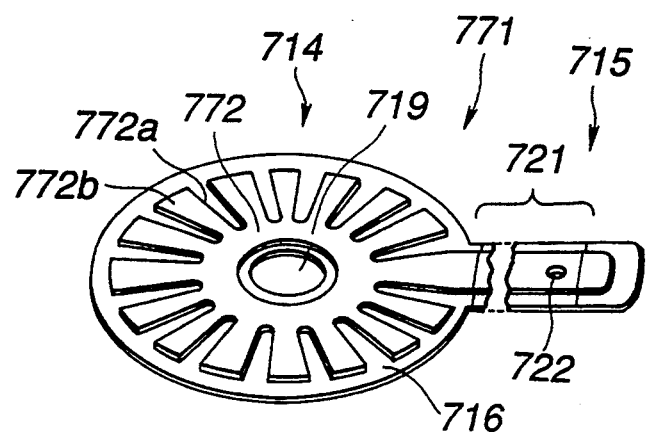
FIG. 92 is a perspective view which illustrates a flexible printed substrate of an ultrasonic oscillator according to a forty-seventh embodiment of the present invention.

FIG. 92 illustrates a forty-seventh embodiment of the present invention. Since the ultrasonic oscillator according to the forty-seventh embodiment is arranged similar to those according to the forty-fifth and the forty-sixth embodiments, only the flexible printed substrate which is the different portion will now be described.

Figure 93:
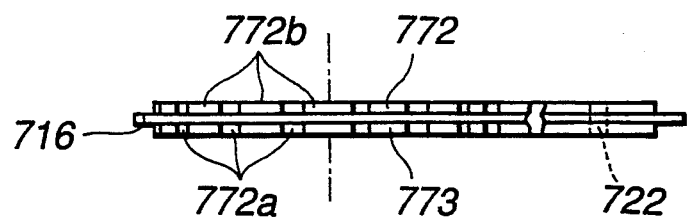
FIG. 93 is a side elevational view which illustrates the flexible printed substrate of the ultrasonic oscillator according to the forty-seventh embodiment of the present invention.

A flexible printed substrate 771 according to the forty-seventh embodiment is structured similar to the flexible printed substrate according to the forty-fifth embodiment. However, the difference lies in that a plurality of radial slits 772a are formed in the copper foil films 772 and 773 (see FIG. 93) of the voltage applying portion 714 in a direction from the outer periphery toward the central portion. The slits 772a are formed along the outer periphery at substantially the same intervals. The depth of each of the slits 772a does not reach the axial hole 719 formed at the central portion and the base portions of the radial projections 772b formed by the slits 772 are integrated around the axis hole 719. Similar to the forty-fifth embodiment, the connection portion 715 is subjected to an insulating treatment at 721 and the through hole 722 is formed at the leading portion of the connection portion 715.

An arrangement that the surfaces of the piezoelectric elements 708 and 709, to which voltages are applied, are subjected to silver evaporation is employed similar to the forty-fifth embodiment.

The forty-seventh embodiment arranged as described above enables the voltage applying portion 714 to easily follow slight waves, projections and pits of the piezoelectric elements 708 and 709 by the radial slits 772a formed in the copper foil films 772 and 773 of the voltage applying portion 714. As a result, voltages can be stably applied to the piezoelectric elements 708 and 709. Furthermore, the arrangement that the surfaces of the piezoelectric elements 708 and 709, to which voltages are applied, are subjected to the silver evaporation, of course, enables voltage to be applied to a portion in which the copper foil is not formed due to the presence of the slit 772a.

According to the forty-seventh embodiment, voltage can be supplied further stably.

Figure 94:
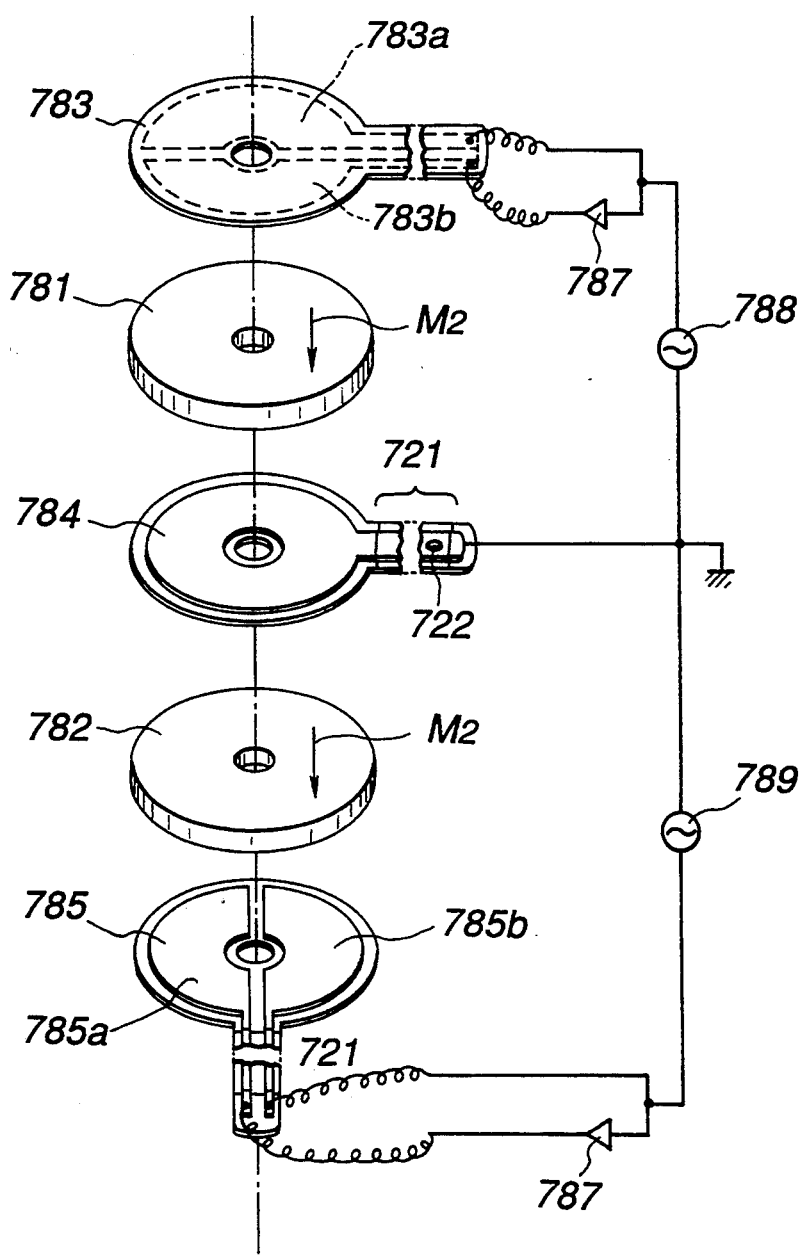
FIG. 94 is an exploded perspective view which illustrates an oscillator of an ultrasonic oscillator according to a forty-eighth embodiment of the present invention.

FIG. 94 illustrates a forty-eighth embodiment of the present invention. Since an ultrasonic motor according to this embodiment is arranged similarly to those according to the forty-fifth, the forty-sixth and the forty-seventh embodiments, only the different portions, that is, the piezoelectric elements of the oscillator 704 and the flexible printed substrate are shown in an exploded perspective view.

The forty-eighth embodiment has an arrangement that piezoelectric elements 781 and 782 are not divided into the two polarized regions unlike the forty-fifth embodiment. The piezoelectric elements 781 and 782 respectively are polarized in only one direction as designated by an arrow M2, the directions being the same in the direction designated by the arrow M2. The shapes of the piezoelectric elements 781 and 782 are the same as those of the piezoelectric element according to the forty-fifth embodiment. The surfaces of the piezoelectric elements 781 and 782 to which voltages are applied are not subjected to silver evaporation.

The flexible printed substrate 784 which is the electrode plate held between the two piezoelectric elements 781 and 782 is arranged similar to that according to the forty-fifth embodiment. Either end surface of each of the piezoelectric element 781 and 782, that is, the flexible printed substrates 783 and 785 placed at the outer end surfaces have copper foil formed in only the portion thereof facing the piezoelectric elements 781 and 782. The copper foil is divided into two sections at the boundary made at the symmetrical axis of the flexible printed substrate 784. As a result, copper foil films 783a, 783b and copper foil films 785a and 785b are formed. The copper foil 783a and the copper foil 783b are not conducted to each other, and the copper foil 785a and the copper foil 785b are not conducted to each other. Furthermore, the flexible printed substrates 783 and 785 are disposed while deviated from each other by an angular degree of 90°.

The copper foil films 783a and 783b are connected to an AC power source 788 in parallel in such a manner that either of them, for example, the copper foil 783b is connected to the AC power source 788 via a voltage inverting device 787. The copper foil films 785a and 785b are similarly connected to an AC power source 789 in parallel in such a manner that either of them, for example, the copper foil 785a is connected to the AC power source 789 via the voltage inverting device 787. Furthermore, the flexible printed substrate 784 is grounded.

The copper foil of each of the flexible printed substrates 783 and 785, for example, the copper foil 783a and the copper foil 785b are applied with sine wave voltages having the phases deviated by an angular degree of 90°. On the other hand, either of the bisectioned copper foil 783b is applied with the voltage which is obtained by inverting the voltage to be applied to the copper foil 783a by the voltage inverting device 787. The copper foil 785a is applied with the voltage which is obtained by inverting the voltage to be applied to the copper foil 785b.

According to the forty-eighth embodiment arranged as described above, an ultrasonic oscillator can be constituted which is capable of synthesizing the rotational motion from the bending oscillations generated in the two piezoelectric elements while eliminating the necessity of dividing the piezoelectric element into two polarized regions.

Although the method of dividing the metal and conductive electrode plates into two sections and arranged as described above has been known, the method encounters a problem in that it is complicated to dispose the metal and conductive electrode plates and an accurate alignment to the desired angular degree of 90° cannot easily be performed. However, the arrangement of this embodiment that the copper foil is held by the polyimide resin enables an effect to be obtained that the electrode plates can easily be disposed and the alignment to the angular degree of 90° can easily be performed.

According to the forty-eighth embodiment, the process for polarizing the piezoelectric element can be simplified and the cost of the ultrasonic motor can be reduced.

Figure 95:
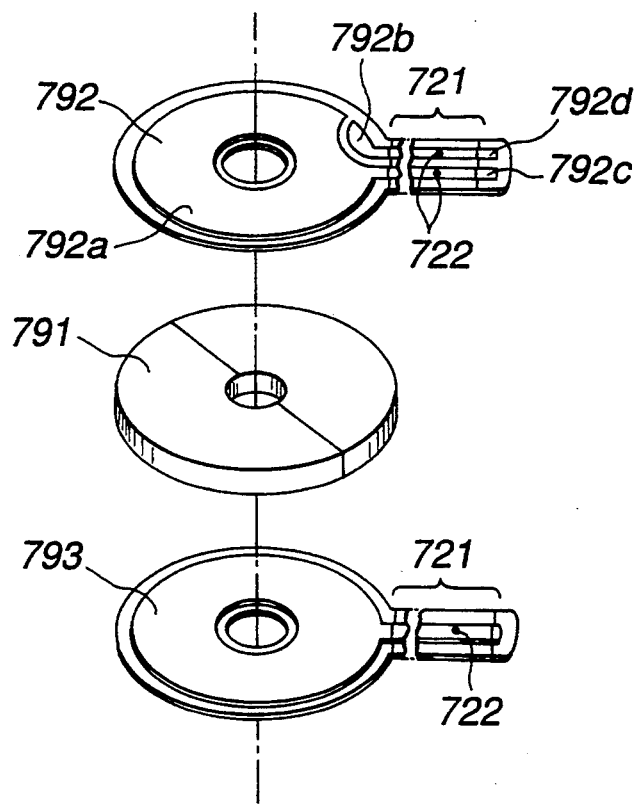
FIG. 95 is a perspective view which illustrates piezoelectric elements and electrode plates of an ultrasonic oscillator according to a forty-ninth embodiment of the present invention.

FIG. 95 illustrates a forty-ninth embodiment of the present invention. Since an ultrasonic oscillator according to this embodiment has a similar arrangement to that of the forty-fifth forty-sixth, forty-seventh and forty-eighth embodiments, only the different portions, that is, a piezoelectric element and a flexible printed substrate will now be described.

The forty-ninth embodiment has an arrangement that divided copper foil for following the frequency is used.

A piezoelectric element 791 is not subjected to silver evaporation and the residual arrangements, for example, the polarized region is divided into two sections, are the same as those of the forty-fifth embodiment.

A flexible printed substrate 792 serving as the electrode plate has copper foil formed thereon, the copper foil being partially divided as illustrated into a voltage applying annular copper foil film 792a which substantially has the area corresponding to the area of the voltage application portion and a copper foil film 792b for outputting a sensor signal, the copper foil 792b being formed into a substantially semicircular shape along the outer surface of the portion adjacent to the connection portion. The copper foil 792a and the copper foil 792b are not conducted to each other, and portions 792c and 792d of the copper foil respectively are extended to the connection portion.

In the connection portion of the substrate 792, a through hole 722 for conducting the upper copper foil to the lower copper foil is formed in each of the portions 792c and 792d of the copper foil. Furthermore, the connection portion is subjected to an insulating treatment at 721 similar to the foregoing embodiments.

A flexible printed substrate 793 is arranged similar to the flexible printed substrate according to the forty-fifth embodiment, and the same is connected to the earth similarly to the forty-fifth embodiment.

According to the forty-ninth embodiment constituted as described above, it can be considered that the output from the motor is reduced because the portion of the piezoelectric element for operating is used as the sensor. However, the area of the piezoelectric element for use as the sensor can be reduced to, for example, about 1 mm$^2$. Therefore, a critical influence upon the motor can be eliminated. Furthermore, the necessity of individually providing the piezoelectric element for following the frequency and the necessity of increasing the number of electrode plates can be eliminated. Therefore, the structure can be simplified significantly.

By subjecting the phase of the output signal from the piezoelectric element portion for the sensor to a comparison with the phase of the operation voltage or by controlling the peak value of the output signals, the operation frequency can be adjusted to the optimum frequency for the ultrasonic motor.

According to the forty-ninth embodiment, the piezoelectric element for following the frequency and the electrode plate can be constituted very easily by dividing the copper foil on the flexible printed substrate. Therefore, the facility of assembling the motor can be improved, the cost can be reduced, and the wiring can be connected easily.

Figure 96:
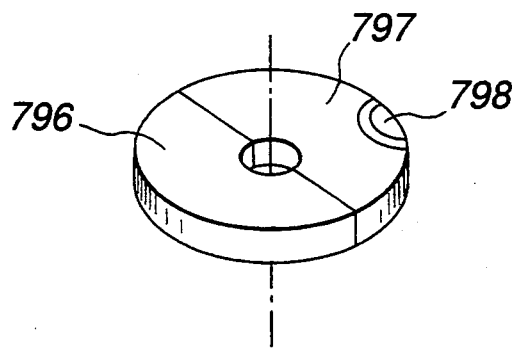
FIG. 96 is a perspective view which illustrates piezoelectric elements of an ultrasonic oscillator according to a fiftieth embodiment of the present invention.

If a piezoelectric element 796 applied with the evaporated silver is used, evaporation patterns 797 and 798 are formed to be adaptable to the divided shapes of the copper foil films 792a and 792b of the flexible printed substrate similar to a fiftieth embodiment shown in FIG. 96. Also in this case, a similar effect obtainable from the forty-ninth embodiment can be obtained.

As described above, according to this embodiment, the wiring connection in the ultrasonic oscillator can be simplified and an ultrasonic motor which can be disposed in a small space can be provided.

Figure 97:
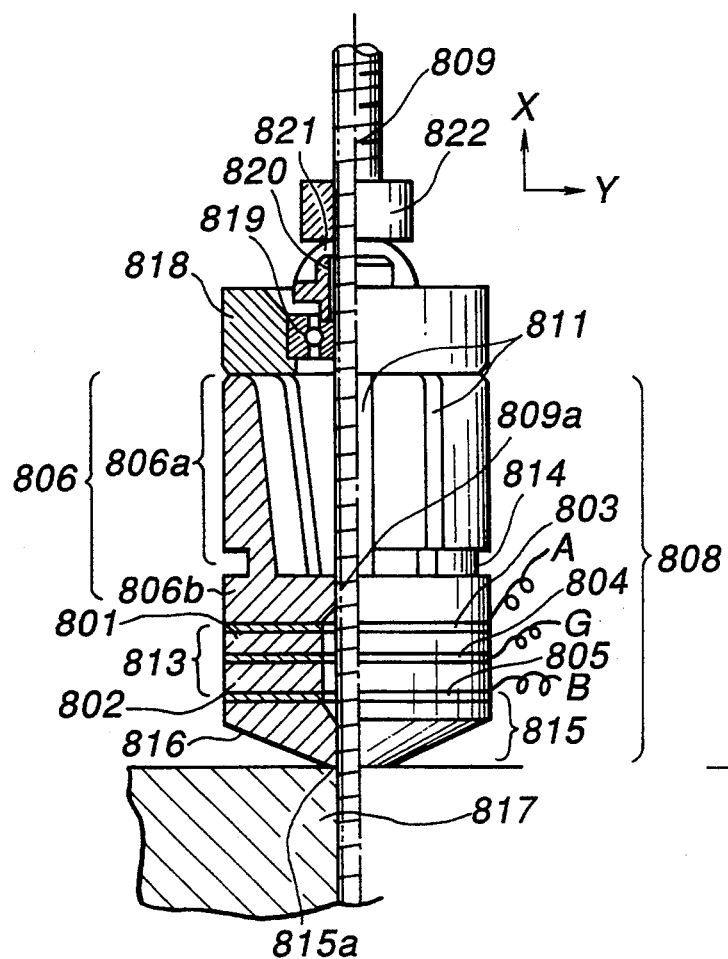
FIG. 97 is a side elevational cross sectional view which illustrates an ultrasonic motor to which an ultrasonic oscillator according to a fifty-first embodiment of the present invention is adapted and a graph which illustrates a state of oscillations.
Figure 98:
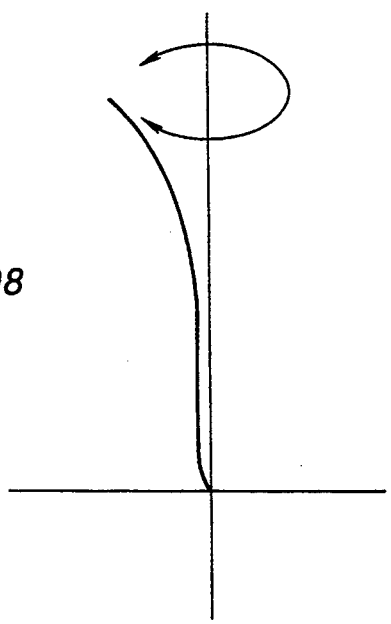
FIG. 98 is a graph which illustrates a state of oscillations of the ultrasonic motor to which the ultrasonic oscillator according to the fifty-first embodiment is adapted.

FIGS. 97 and 98 illustrate an ultrasonic motor to which an ultrasonic oscillator according to a fifty-first embodiment of the present invention is adapted. FIG. 97 is a side elevational cross sectional view, and FIG. 98 is a graph which illustrates a state of oscillations.

As shown in FIG. 97, the ultrasonic motor comprises a main portion composed of an ultrasonic oscillator 808 having first and second piezoelectric elements 801 and 802, first and second resonators 806 and 815 disposed to hold the first and second piezoelectric elements 801 and 802 by the end surfaces thereof, and a fastening member 809 for integrally fastening the foregoing elements in the axial direction. The ultrasonic motor further comprises a rotor 818 which is a member to be driven that is pressed against an end surface (the top surface) of the ultrasonic oscillator 808 and which is rotated in a predetermined direction due to the ultrasonic oscillations of the ultrasonic oscillator 808.

Figure 99:
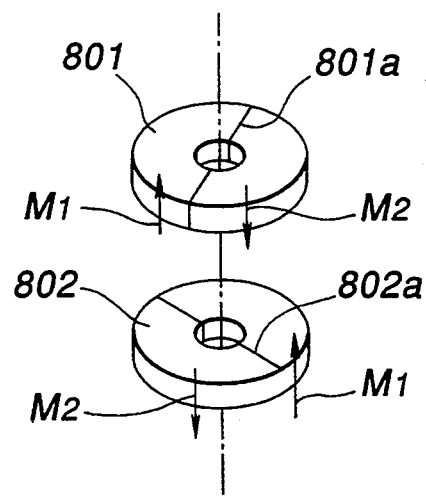
FIG. 99 is an enlarged cross perspective view which illustrates a state of polarization of the piezoelectric elements of the ultrasonic motor to which the ultrasonic oscillator according to the fifty-first embodiment is adapted.

The first and second piezoelectric elements 801 and 802 are formed into a disc-like shape having a hollow circular portion as shown in FIG. 99 which is an enlarged perspective view which illustrates the state of polarization of the piezoelectric element. The first and second piezoelectric elements 801 and 802 respectively are, as designated by arrows M1 and M2 shown in FIG. 99, polarized in opposite directions by polarization boundary lines 801a and 802a passing through the central portions. The first and second piezoelectric elements 801 and 802a are disposed in the direction of stacking in such a manner that their polarization boundary lines 801a and 802 are deviated from each other by an angular degree of 90°.

The electrode plates 803, 804 and 805 are copper electrode plates having substantially the same diameter as that of the first and second piezoelectric elements 801 and 802 and arranged to apply voltages. The electrode plates 803, 804 and 805 have terminals A, G and B for soldering lead wires are formed to project from the outer surfaces thereof to be connected to a power source (omitted from illustration). It should be noted that an oscillation generating portion 813 is constituted by the foregoing first and second piezoelectric elements 801, 802, the electrode plates 803, 804 and 805.

Figure 100:
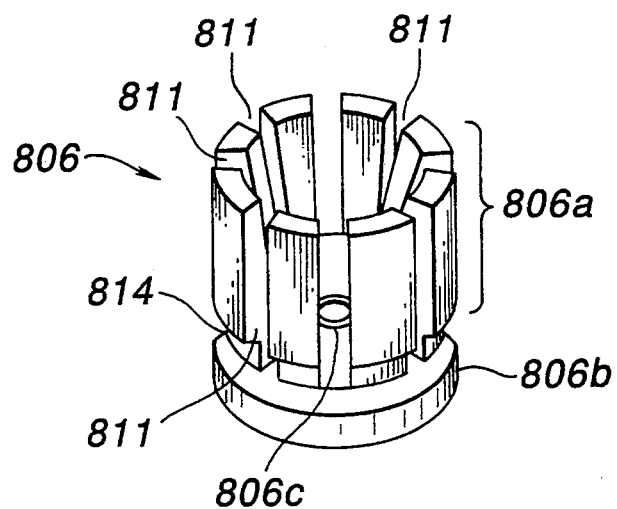
FIG. 100 is a schematic perspective view illustrates an upper resonator according to the fifty-first embodiment.

FIG. 100 is a schematic perspective view which illustrates the first resonator 806.

The first resonator 806 is formed into a hollow cylindrical shape having a bottom portion 806b and is made of a material, for example, an aluminum alloy, stainless steel, phosphor bronze, duralmin or a titanium alloy or the like having excellent oscillation transmissivity. The first resonator 806 according to this embodiment is made of SUS440C subjected to a heat treatment to have hardness of Hv 800 or harder. Furthermore, this embodiment has an arrangement that the first resonator 806 is made of aluminum alloy subjected to an alumite oxalate coating followed by steam sealing. As a result of the steam sealing treatment, the small holes in the alumite are filled with hydrate to the bottom.

A thread portion 806c to be engaged to a thread portion 809a (see FIG. 97) formed in the surface of the fastening member 809 is formed at the central portion of a bottom portion 806b of the first resonator 806. As a result, the first resonator 806 and the fastening member 809 are engaged to each other. Furthermore, the first resonator 806 has a U-shaped hollow portion 810 opened at the top end surface thereof and formed above the bottom portion 806b. As a result, oscillations at the top surface of the first resonator 806 are not restricted by the fastening member 809. Furthermore, a plurality of vertical grooves 811 are formed in the outer side surface of an upper portion 806a of the first resonator 806. As a result, the upper portion 806 of the resonator 806 is equally divided into 8 sections to contribute to enhance the oscillations. In addition, a peripheral groove 814 is formed on the outer side surface between the upper portion 806a of the resonator 806 and the bottom portion 806b of the same, the peripheral groove 814 being formed toward the central portion of the resonator 806.

A second resonator 815 is disposed below the first and second piezoelectric elements 801 and 802, the second resonator 815 having a contact surface which is substantially the same size and the same shape as those of each of the piezoelectric elements 801 and 802. As a result, the first and the second resonators 806 and 815 hold the electrode plates 803, 804 and 805 and the first and second piezoelectric elements 801 and 802. The second resonator 815 is made of a material such as brass or steel having inferior oscillation transmittance compared to that of the first resonator 806. The second resonator 815 according to this embodiment is made of S45C.

Figure 101:
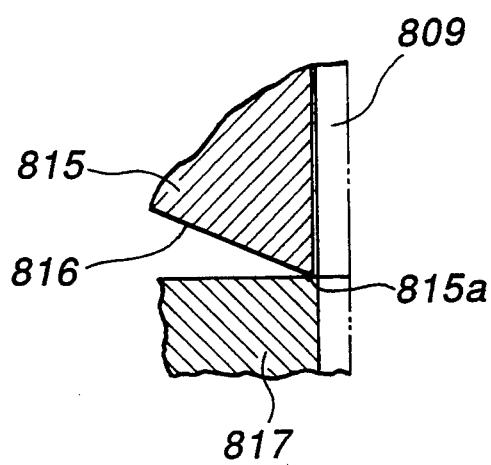
FIG. 101 is an enlarged cross sectional view which illustrates an essential portion of a contact portion of a lower resonator and a fixing portion according to the fifty-first embodiment.

FIG. 101 is an enlarged cross sectional view which illustrates an essential portion of a contact portion between the second resonator 815 and an outer fixing portion 817.

As shown in FIG. 101, the lower portion of the second resonator 815 is formed into a substantially conical shape having a taper 816 facing downwards. A leading portion 815a of the conical portion is in linear-contact with the outer fixing portion 817 as shown in FIG. 101.

A disc-like insulating member having a circular hollow portion therein is disposed between the electrode plate 803 and the first resonator 806 and between the electrode plate 805 and the second resonator 815, the disc-like insulating member being made of, for example, alumina.

The ultrasonic oscillator 808 is constituted by stacking the first and the second piezoelectric elements 801 and 802, the electrode plate 803, 804 and 805, and the first resonator 806 and 815 as shown in FIG. 97. Then, an epoxy type adhesive agent is applied to the portions among the foregoing elements. The fastening member 809 is then inserted to press the elements, and the adhesive agent is hardened, so that the ultrasonic oscillator 808 is manufactured.

The fastening member 809 also has a bolt formed further below the second resonator 815. The fastening member 809 presses the ultrasonic oscillator 808 at a portion above the resonator 815. The lower end surface of the ultrasonic oscillator 808 is, in the portion below the second resonator 815, pressed against the fixing member 817 to be supported. As a result, the ultrasonic motor is fixed.

A rotor 818 to be rotated in a predetermined direction due to the ultrasonic oscillations of the ultrasonic oscillator 808 is disposed on the top surface of the first resonator 806, that is, on the top surface of the ultrasonic oscillator 808, the rotor 818 being borne by the fastening member 809 by means of a plurality of bearings 819. Furthermore, a pressing mechanism borne by the fastening member 809 and comprising a leaf spring 821, a spring mounting 820 and a nut 822 is disposed on the side opposing the contact surface with the ultrasonic oscillator 808. As a result, the force for pressing the rotor 818 can be varied. The rotor 818 is made of, for example, an aluminum alloy and has the surface applied with an alumire oxalate treatment.

When terminals A and B of the electrode plates 803 and 805 of the ultrasonic motor constituted as described above are applied with sine wave voltages in the neighborhood of the resonant frequency while being deviated by 90° in terms of time and the terminal G of the electrode plate 804 is grounded, motion of primary mode bending oscillations which are rotated around the central axis of the oscillator 808 is generated. As a result, the rotor 818 is rotated in a predetermined direction.

The operation of the ultrasonic motor according to the fifty-first embodiment will now be described.

FIG. 98 is a graph which illustrates a state of oscillations of the ultrasonic oscillator according to the fifty-first embodiment is adapted.

When sine wave voltages having the phases deviated from each other by 90°, primary mode oscillations having the node made at the fixed end and the antinode at the other end surface (the top surface) of the ultrasonic oscillator 808 are generated as elliptic oscillations that rotate around the central axis because the leading portion 815a of the ultrasonic oscillator 808 is the fixed end.

The elliptic oscillations cause the rotor 818 pressed against the ultrasonic oscillator 808 to be rotated.

If the phase difference between the two sine wave voltages is deviated by 180°, the rotational direction of the elliptic oscillations is inverted. As a result, the rotor 818 is rotated inversely.

The upper portion 806a of the resonator 806 enables a displacement enlargement effect to be obtained by the peripheral groove 814 formed around the outer side surface thereof and a plurality of the vertical grooves 811 formed substantially in parallel to the central axis thereof, the displacement enlargement effect is an effect to convert the oscillations generated by an oscillation generating portion 813 into large bending oscillations.

Since the amplitude in the illustrated direction Y is substantially zero in the oscillation generating portion of the ultrasonic oscillator according to this embodiment due to the primary mode bending oscillations, the first and second piezoelectric elements 801 and 802 are disposed at the node positions. As a result, the force factor (N/v) is enlarged. Furthermore, the fact that the leading portion 815a is formed adjacent to the central axis, the amplitude in the direction Y can be made substantially zero. Therefore, the loss taken place due to the friction can be reduced. Since the contact area between the leading portion 815a and the outer fixing portion 817 is very small, the bending oscillations are not transmitted to the outer fixing portion 817. Therefore, the oscillation loss can similarly be minimized.

By employing a material having a slower oscillation transmission speed to make the second resonator 815 slower than that of the first resonator 806, the oscillations of the second resonator are restricted to easily form the node of the oscillations. Thus, the oscillations of the oscillator can be oriented to the first resonator 806 and intense oscillations are transmitted to the first resonator 806. Hence, oscillations having a large amplitude and approximating the free oscillations can be obtained while preventing the reduction of the mechanical Qm of the ultrasonic oscillator generated due to the support.

According to the fifty-first embodiment thus arranged, the large-amplitude oscillations generated due to the displacement enhancing effect can be maintained and a high mechanical Qm can be obtained. Therefore, the oscillation loss can be prevented and a high efficiency ultrasonic motor can be obtained. The supported portion is constituted by the fastening member 809 and the leading portion 815a disposed in the lower portion of the ultrasonic oscillator 808. Therefore, a strong supporting portion having no elasticity can be constituted to assuredly support the ultrasonic motor.

A fifty-second embodiment of the present invention will now be described.

Figure 102:
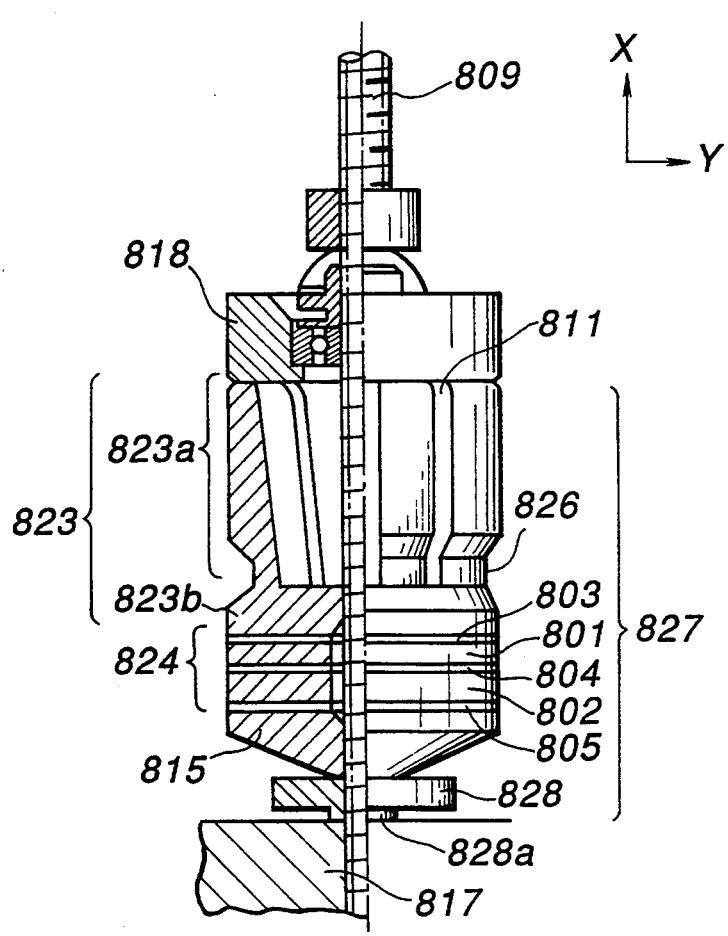
FIG. 102 is a side elevational cross sectional view which illustrates an ultrasonic motor to which an ultrasonic oscillator according to a fifty-second embodiment of the present invention is adapted.
Figure 103:
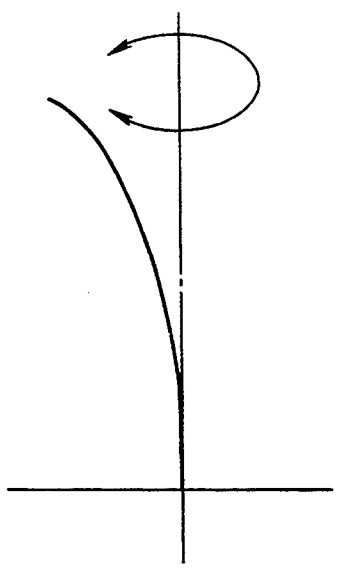
FIG. 103 is a graph which illustrates a state of oscillations of the ultrasonic motor to which the ultrasonic oscillator according to the fifty-second embodiment is adapted.

FIGS. 102 and 103 respectively are a side elevational cross sectional view which illustrates an ultrasonic motor to which an ultrasonic oscillator according to a fifty-second embodiment of the present invention is adapted and a graph which illustrates a state of oscillations.

Since the fifty-second embodiment has the same basic structure as that of the fifty-first embodiment, only the different arrangements will now be described.

A first resonator 823 of an ultrasonic oscillator 827 disposed above the first and second piezoelectric elements 801 and 802 is basically formed into a hollow cylindrical shape having a bottom portion 823b, the shape being basically similar to that of the first resonator 806 according to the fifty-first embodiment. A portion above the bottom portion 823 in the first resonator 823 is formed into a U-shaped hollow portion opened at the top surface of the first resonator 823. As a result, the oscillations at the top surface of the first resonator 823 are not restricted by the fastening member 809. Furthermore, a plurality of vertical grooves 811 are formed in the outer side surface of an upper portion 823a of the first resonator 823 similar to the fifty-first embodiment. As a result, the upper portion 823a of the resonator 823 is vertically divided into 8 sections to contribute enhancing the oscillations. In addition, a peripheral groove 826 having a trapezoidal cross sectional shape is formed in the outer side surface between the upper portion 823a of the resonator 823 and the bottom portion 823b of the same.

Furthermore, a pressing nut 828 is, as illustrated, disposed below a second resonator 815 below the first and second piezoelectric elements 801 and 802. As a result, the first and second piezoelectric elements 801 and 802 and the second resonator 815 are held between the first resonator 823 and the pressing nut 828.

Figure 104:
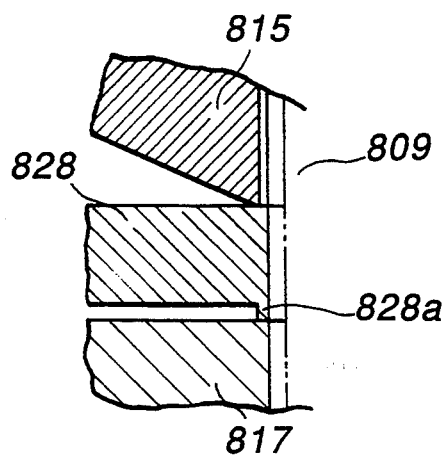
FIG. 104 is an enlarged cross sectional view which illustrates an essential portion of a contact portion between a pressing nut and a fixing portion according to the fifty-second embodiment.

FIG. 104 is an enlarged cross sectional view which illustrates an essential portion of a contact portion between the pressing nut 828 and the outer fixing portion 817.

As shown in FIG. 104, a small-projection portion 828a formed concentrically to the pressing nut 828 is formed at the central portion of the lower surface of the pressing nut 828. As a result, the pressing nut 828 and the outer fixing portion 817 are in contact with each other on a small area thereof.

The residual arrangements are the same as those of the fifty-first embodiment.

FIG. 103 is a graph which illustrates a state where the ultrasonic oscillator according to the fifty-second embodiment oscillates.

When sine wave voltages having their phases deviated from each other by 90° are applied to the ultrasonic oscillator according to the fifty-second embodiment, primary mode oscillations having the node made at the fixed end and the antinode at the other end surface (the top surface) of the ultrasonic oscillator 827 are generated as elliptical oscillations that rotate around the central axis because the projection 828a is the fixed end. The elliptic oscillations causes the rotor 818 pressed against the ultrasonic oscillator 827 to be rotated. If the phase difference between the two sine wave voltages is deviated by 180°, the rotational direction of the elliptic oscillations is inverted, causing the rotor 818 to be rotated inversely.

Also according to the fifty-second embodiment, the upper portion 823a of the resonator 823 enables a displacement enlargement effect to be obtained by the peripheral groove 826 formed around the outer side surface thereof and a plurality of vertical grooves 811 formed substantially in parallel to the central axis thereof, the displacement enlargement effect is an effect to convert the oscillations generated by an oscillation generating portion 824 into large bending oscillations. Furthermore, the arrangement that the shape of the peripheral groove 826 is trapezoidal enables large-amplitude oscillations to be obtained. Since the oscillation generating portion 824 is formed into a horn-like shape, the oscillating force is concentrated into the portion at which the diameter is reduced. Therefore, the oscillations can be transmitted to the first resonator 823 divided into 8 sections.

Furthermore, the use of the intermediate member such as the pressing nut 828 in place of the direct contact between the second resonator 815 and the outer fixing portion 817 enables the oscillations, which are undesirably transmitted to the outer fixing portion 817, to be restricted by two stages. The oscillation mode is realized as shown in FIG. 103 in such a manner that the Y-directional oscillations slightly left in the second resonator 815 can be completely eliminated in the portion of the pressing nut 828.

According to the fifty-second embodiment arranged as described above, a further satisfactory state of supporting than that realized according to the fifty-first embodiment can be attained. Therefore, damping of the mechanical Qm can be prevented and a high efficiency can be obtained. The trapezoidal peripheral groove 826 formed in the surface of the first resonator 823 causes an effect to be obtained in that a large amplitude oscillations are generated at the top surface of the ultrasonic oscillator 827. As a result, high speed rotations and strong torque can be obtained.

A fifty-third embodiment of the present invention will now be described.

Figure 105:
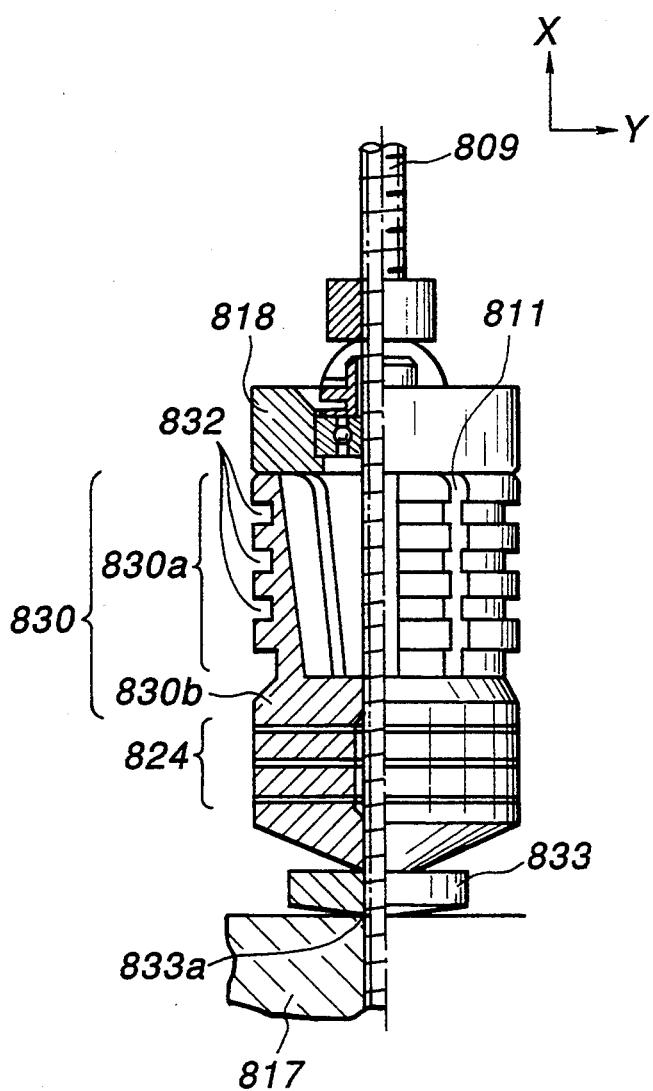
FIG. 105 is a side elevational cross sectional view which illustrates an ultrasonic motor to which an ultrasonic oscillator according to a fifty-third embodiment of the present invention is adapted.
Figure 106:
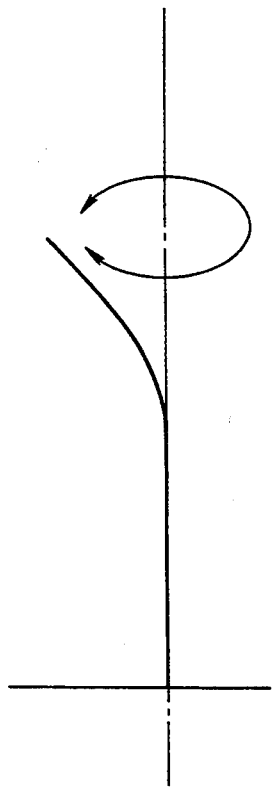
FIG. 106 is a graph which illustrates a state of oscillations of the ultrasonic motor to which the ultrasonic oscillator according to the fifty-third embodiment is adapted.

FIGS. 105 and 106 respectively are a side cross sectional view which illustrates an ultrasonic motor to which an ultrasonic oscillator according to a fifty-third embodiment of the present invention is adapted and a graph which illustrates a state of oscillations of the ultrasonic oscillator.

Since also the fifty-third embodiment has the same basic arrangement as that of the fifty-first and fifty-second embodiments, the descriptions will be made about the different portions.

A first resonator 830 disposed above the first and the second piezoelectric elements 801 and 802 is basically formed into a hollow cylindrical shape having a bottom portion 830b, the first resonator 830 having a shape similar to the first resonator 806 according to the fifty-first embodiment of the present invention. A portion above the bottom portion 830b in the resonator 803 is formed into a U-shaped hollow portion opened at the top end surface of the first resonator 830. Therefore, the oscillations at the top end surface of the first resonator 830 are not restricted by the fastening member 809. Furthermore, a plurality of vertical grooves 811 are formed in the outer side surface of an upper portion 830a of the first resonator 830 similar to the fifty-first embodiment. As a result, the upper portion 830a of the resonator 830 is vertically divided into eight (8) sections which contribute to enlarge the oscillations. In addition, a plurality of peripheral grooves 832 are formed toward the central portion around the outer side surface of the upper portion 830a of the resonator 830.

Furthermore, a pressing nut 833 is, as illustrated, disposed below the second resonator 815 positioned under the first and second piezoelectric element 801 and 802. As a result, the first and second piezoelectric elements 801 and 802 and the second resonator 815 are interposed between the first resonator and the pressing nut 833. As shown in the drawing, the lower surface of the pressing nut 833 is formed into a conical shape to be in contact with the outer fixing portion 817 at a small area.

The residual structures are the same as those according to the fifty-first embodiment.

FIG. 106 is a graph which illustrates a state where an ultrasonic oscillator according to the fifty-third embodiment oscillates.

When sine wave voltages having the phases deviated from each other by 90° are applied to the ultrasonic oscillator according to the fifty-third embodiment, primary-mode bending oscillations having the node at the fixed end and the antinode at the top surface of the ultrasonic oscillator are generated as elliptical oscillations that rotate around the center of the central axis because the leading portion 833a is the fixed end. The elliptical oscillations cause the rotor 818 pressed against the ultrasonic oscillator to be rotated. If the phase difference between the two sine wave voltages is deviated by 180°, the rotational direction of the elliptical oscillations is inverted. As a result, the rotor 818 is rotated inversely.

Since the rigidity of the first resonator 830 is extremely weakened by a plurality of peripheral grooves 832, the difference of the rigidity from the oscillation generating portion is enlarged. As a result, the oscillation mode is generated in which the Y-directional oscillations is made zero in the oscillation generating portion and the amplitude is made largest at the top end surface of the first resonator 830 as shown in FIG. 106.

As a result, the node of the oscillations can be allowed to come closer to the first oscillator 830, causing the portion of the pressing nut 833 to be an ideal fixed end because the oscillations are completely restricted. Since the oscillation at the fixed end is minimized, undesirable outward transmission of the oscillations can be prevented. Furthermore, the oscillation loss due to friction can be eliminated.

The shape of the leading portion 833a of the pressing nut 833 serving as the intermediate member may be substantially a conical shape. Any shape may be employed so far as it is formed adjacent to the central axis and is in contact with the outer fixing portion 817 at a small area.

According to the fifty-third embodiment, the enlarged difference between the rigidity of the resonator and that of the oscillation generating portion causes the node of the oscillations to come closer to the first resonator. Therefore, the portion supported by the pressing nut 833 is made the complete node of the oscillations. As a result, the oscillation loss can be satisfactorily prevented. Therefore, an ultrasonic motor revealing a high efficiency can be provided.

Figure 107:
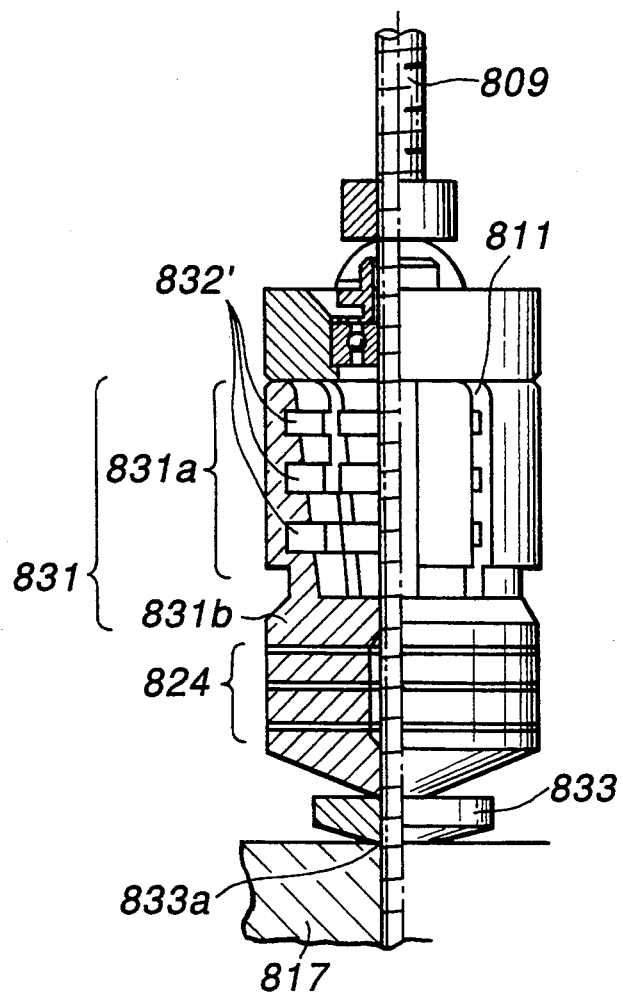
FIG. 107 is a side elevational cross sectional view which illustrates an ultrasonic motor to which an ultrasonic oscillator according to a fifty-fourth embodiment of the present invention is adapted.
Figure 108:
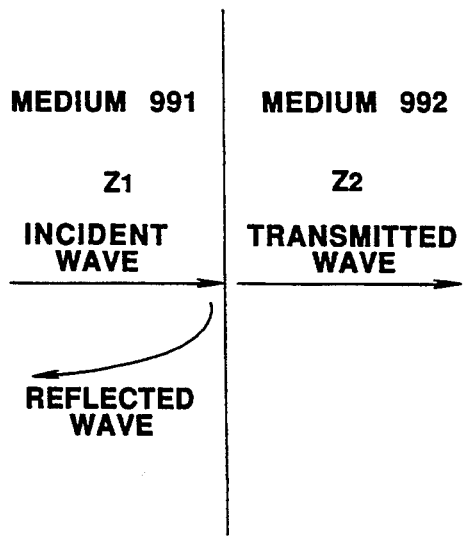
FIG. 108 is a graph which illustrates the principle employed in the fifty-fifth to fifty-ninth embodiments.

FIG. 107 is a side elevational cross sectional view which illustrates a fifty-fourth embodiment which is a modification of the ultrasonic oscillator according to the fifty-third embodiment.

As contrasted with the first resonator 830 according to the fifty-third embodiment which has a plurality of peripheral grooves 832 formed in the outer surface thereof, the fifty-fourth embodiment has an arrangement that a plurality of peripheral grooves 832' are formed in the inner surface of the first resonator 831.

The residual arrangements are the same as those according to the fifty-third embodiment, and the operation and the effect are the same as those according to the fifty-third embodiment.

As described above, according to this embodiment, an effect can be obtained in that an ultrasonic motor can be provided in which the ultrasonic oscillator is firmly supported in such a manner that the oscillation loss can be satisfactorily prevented and which reveals a high efficiency.

If ultrasonic oscillations are vertically made incident from a medium 991 onto a medium 992, and assuming that the acoustic impedances of the corresponding media are Z1 and Z2, the acoustic pressure reflection rate R at the boundary surface between the medium 991 and the medium 992 is generally expressed as follows:

$$R=(Z2-Z1)/(Z1+Z2)$$

It is known that the more the difference of the acoustic impedance of the medium 991 and that of the medium 992, the reflection of the ultrasonic oscillations becomes larger. Therefore, the transmittance quantity is reduced.

An embodiment constituted while being based on the aforesaid principle will now be described.

Figure 109:
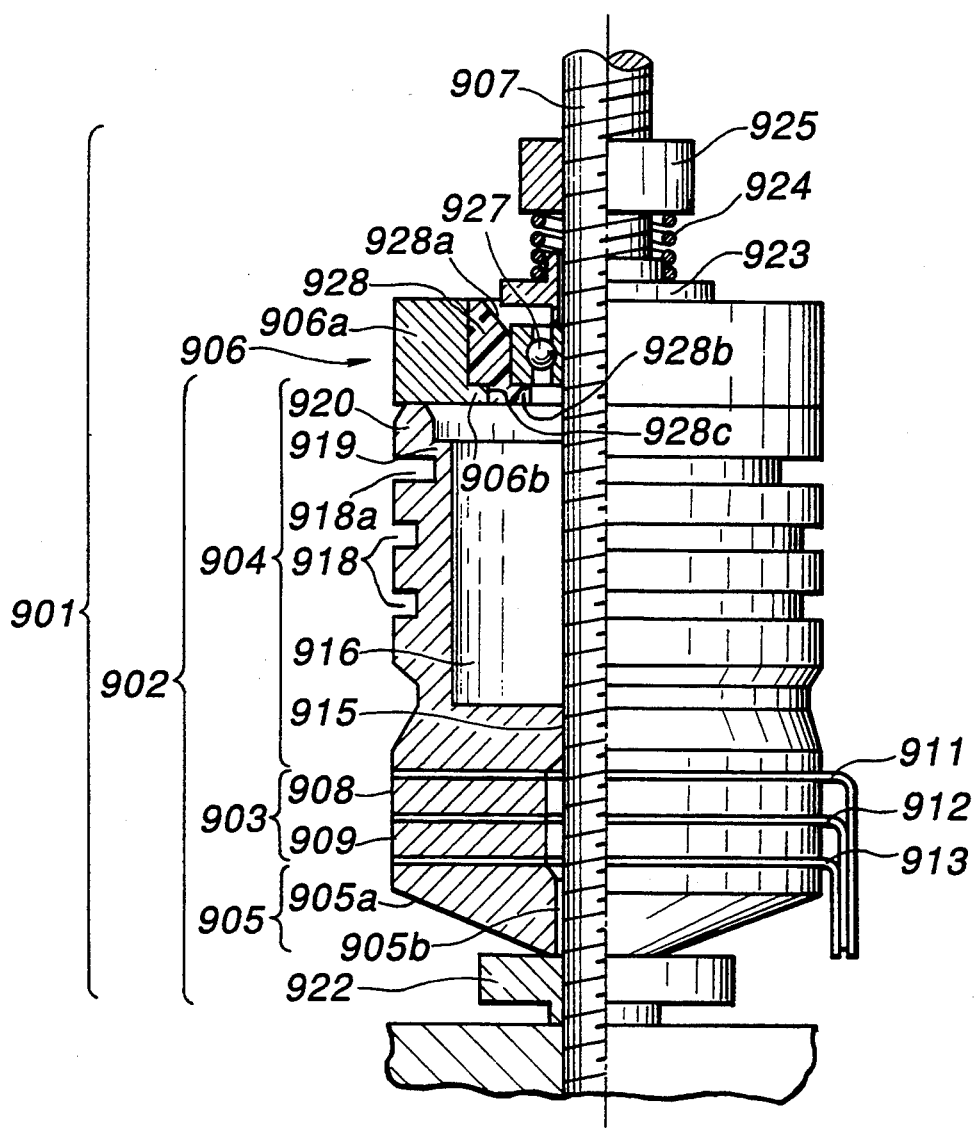
FIG. 109 is a side elevational view which illustrates the cross section of a left half portion of an ultrasonic oscillator according to the fifty-fifth embodiment of the present invention is adapted.

FIG. 109 is a side elevational view which illustrates an ultrasonic motor according to a fifty-fifty embodiment of the present invention, where the left half portion is illustrated in a cross section manner. The fifty-fifty embodiment has an arrangement that piezoelectric elements each having a voltage application surface which is silver-evaporated are employed as the electricity-to-mechanical energy conversion elements.

An ultrasonic motor 901 according to this embodiment mainly comprises an ultrasonic oscillator 902 and a rotor 906 pressed against the upper side surface of the ultrasonic oscillator 902, the rotor 906 being a member to be driven. The ultrasonic oscillator 902 is constituted by penetrating an oscillator 903 for generating original oscillations, an upper resonator 904 disposed on the top surface of the oscillator 903 and a lower oscillator 905 by a fastening member 907 to be joined up.

Figure 110:
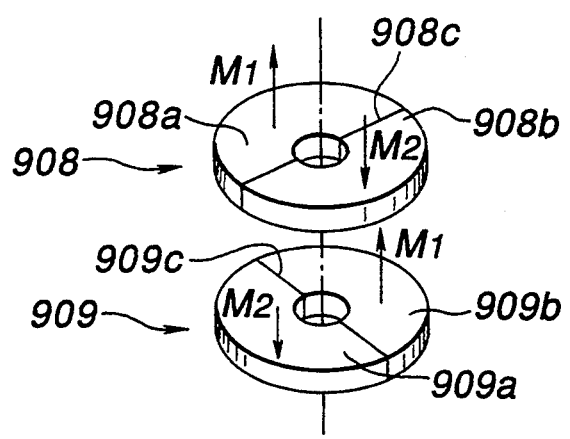
FIG. 110 is a perspective view which illustrates piezoelectric elements of the ultrasonic oscillator according to the fifty-fifth embodiment.

The oscillator 903 has a first piezoelectric element 908 and a second piezoelectric element 909 each of which is formed in an annular shape and stacked in the direction of their thickness. The piezoelectric elements 908 and 909 respectively are divided into semicircular polarized regions 908a and 908b and regions 909a and 909b as shown in FIG. 110. The piezoelectric elements 908 and 909 are disposed in such a manner that a boundary line 908c of the polarized regions of the piezoelectric element 908 and a boundary line 909c of the polarized regions of the piezoelectric element 909 are deviated from each other by an angular degree of 90°. Furthermore, the polarizing direction of the polarizing region 908a and that of 908b are arranged to oppose each other. For example, the region 908a is polarized upwards (as designated by an arrow M1) and the region 908b is polarized downwards (as designated by an arrow M2). Also the piezoelectric element 909 is arranged in such a manner that the region 909a is polarized downwards (as designated by an arrow M2) and the region 909b is polarized upwards (as designated by an arrow M1).

Furthermore, an electrode made of a flexible substrate is interposed between the first piezoelectric element 908 and the upper resonator 905 and between the second piezoelectric element 909 and the lower resonator 904. As a result, sine wave voltages having their phases deviated from each other by 90° and adjacent to the resonant frequency are applied to the electrode plates 911 and 913 from a drive circuit (omitted from illustration). Also an electrode plate 912 made of a flexible substrate is interposed between the first piezoelectric element 908 and the second piezoelectric element 909. An earth terminal is connected to the electrode plate 912 to be grounded.

The upper resonator 904 is formed into a short cylindrical shape having the same diameter as that of the oscillator 903 and having a bottom. The upper resonator 904 has a central axis hole 915 in the base portion thereof adjacent to the oscillator 903 disposed below the upper resonator 904. The central axis hole 915 has a female thread in the inner surface thereof to be fastened to the fastening member 907 which is a supporting shaft. Furthermore, a U-shaped recess 916 is formed in a direction from the top surface of the upper resonator 904 toward the lower oscillator 903 to prevent contact between the inner portion of the upper resonator 904 and the fastening member 907. Furthermore, a plurality of peripheral grooves 918 for weakening the rigidity are formed in the outer surface of the upper resonator 904 at substantially uniform intervals. In particular, a peripheral groove 918a most adjacent to the end surface adjacent to the rotor 906 is formed deeply to form a thin-wall flange portion 919. As a result, a contact end surface portion 920 has spring characteristics.

The lower resonator 905 disposed on the lower end surface of the oscillator 903 has a downward taper 905a on the outer surface thereof. As a result, the lower end portion of the lower resonator 905 is brought into linear contact with a pressing nut 922. It should be noted that a central axis hole 905b of the lower resonator 905 has a diameter slightly larger than the diameter of the fastening member 907. As a result, direct contact between the lower resonator 905 and the fastening member 907 is prevented.

The upper resonator 904 is made of a material (for example, an aluminum alloy, stainless steel, phosphor bronze, duralmin or a titanium alloy or the like) having excellent oscillation transmissivity. The upper resonator 904 according to the fifty-fifth embodiment is made of SUS440C subjected to a heat treatment to have hardness of Hv 800 or harder.

Also the lower resonator 905 is made of a material having excellent transmissivity similar to the upper resonator 904. The lower resonator 905 according to this embodiment is made of S45C.

Furthermore, the upper and the lower resonators 904 and 905 are subjected to an insulating treatment (insulating coating) except for the portion which comes in contact with the rotor 906 and the portion which comes in contact with the pressing nut 922.

The ultrasonic oscillator 902 constituted by the oscillator 903 and the upper and the lower resonators 904 and 905 is assembled in accordance with the following procedure: first an epoxy type adhesive agent is applied to the adhesion surfaces of the elements. Then, the fastening member 907, which is a bolt, is used to penetrate the first and the second piezoelectric elements 908 and 909, the electrode plates 911, 912 and 913 and the lower resonator 905. Furthermore, the upper resonator 904 is driven from an upper portion to be penetrated by the fastening member 907, while the pressing nut 922 is driven from a lower portion to be penetrated by the same. As a result, the piezoelectric elements 908 and 909, the electrode plates 911, 912 and 913 and the lower resonator 905 are held and pressed between the upper resonator 904 and the pressing nut 922. Then, the adhesive agent is hardened so that the ultrasonic oscillator 902 is constituted.

As described above, the fastening member 907 presses and secures the ultrasonic oscillator 902 and further supports the rotor 906 having a pressing means. The pressing means according to the fifty-fifty embodiment has an arrangement that a coil spring 924 is placed on a spring mounting 923 and a nut 925 is driven. As a result, the quantity of pressing can be varied by changing the quantity of driving applied to the nut 925.

The rotor 906 is constituted by a rotor body 906a having a relative thick annular shape and comprising an inward projection 906b, an oscillation insulating member 928 disposed inward of the rotor body 906a and a bearing 927 for fastening the rotor 906. The bearing 927 enables the rotor 906 to be rotatively supported by the fastening member 907. Furthermore, the rotor body 906a and the bearing 927 disposed while interposing the oscillation insulating member 928 do not come in direct contact with each other.

The oscillation insulating member 928 is formed into a short cylindrical shape having the same axial directional length as that of the rotor 906. The oscillation insulating member 928 has a recess 928c corresponding to the projection 906b of the rotor 906 in the lower portion of the outer surface thereof. Furthermore, the oscillation insulating member 928 has a stepped-recess 928b for fastening the bearing in the axial directional central portion of the inner surface thereof. In addition, a tapered surface 928a facing an inner lower portion is formed on the inside of the top end portion of the oscillation insulating member 928 to prevent contact with the spring mounting 923.

The rotor body 906a according to this embodiment is made of aluminum alloy, the surface of which has an alumite oxalate film formed thereon to improve wear resistance.

The oscillation insulating member 928 is made of a polymer having a lower acoustic impedance than that of the aluminum alloy which forms the rotor body 906a. The polymer is exemplified by a nylon resin, a polycarbonate resin, a urethane resin, a polyimide resin, an aramide resin, a PPS resin, an acrylic resin, a vinyl chloride resin, a polyacetal resin and an epoxy resin.

The operation of the fifty-fifth embodiment constituted as described above will now be described.

Figure 111:
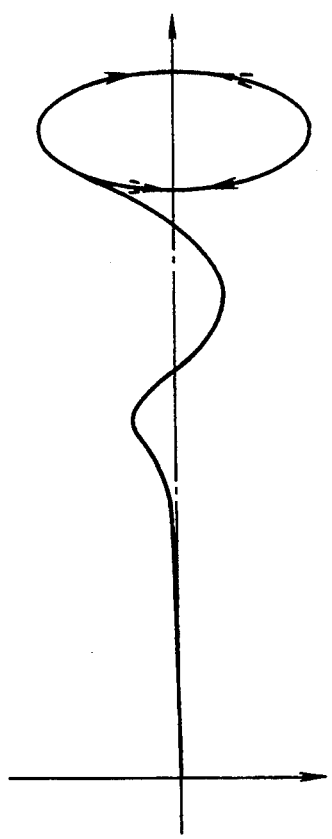
FIG. 111 is a graph which illustrates an oscillation mode of the ultrasonic motor to which the fifty-fifth embodiment is adapted.

When sine wave voltages having their phases deviated from each other by 90° are applied to the electrodes 911 and 913, tertiary mode bending oscillations are generated which has the node at the lower end portion of the ultrasonic oscillator 902 and the antinode at the top surface of the ultrasonic oscillator 902 as shown in FIG. 111 because the lower end portion of the ultrasonic oscillator 902 is the fixed end. The bending motion is made to be elliptical oscillations including a circle rotating around the central axis of the oscillator because the first and the second piezoelectric elements 908 and 909 are disposed while having their electrode boundary lines deviated from each other by 90°. The elliptic oscillations amplified by the upper resonator 904 cause the rotor 906 pressed against the ultrasonic oscillator 902 to be rotated.

If the phase difference between the sine wave voltage to be applied to the electrode 911 and that to be applied to the electrode 913 is further deviated by 180° to make the phase difference between the sine wave voltages to be 270°, the rotational direction of the elliptic oscillations generated by the ultrasonic oscillator 902 is inverted. As a result, the rotor 906 can be inversely rotated.

The oscillation insulating member 928 disposed in the rotor 906 and made of a polymer is disposed between the bearing 927 and the rotor body 906a as described above. As a result, it enables the oscillations generated by the ultrasonic oscillator to be transmitted to only the rotor body 906a while preventing transmission of the same to the bearing and that to the fastening member 907 which is the supporting shaft.

When the oscillation wave reaches the boundary surface at which the acoustic impedance is discontinuous, reflection necessarily takes place at the boundary surface. As a result, a portion of the energy of the transmissive wave surface is again divided as if the discontinuous boundary surface is a new starting point. In order to minimize the transmitting oscillation waves and to enlarge the reflected oscillation waves, the oscillation insulating member 928 having a large difference in acoustic impedance from that of the rotor body 906a is used.

The aluminum alloy according to this embodiment has an acoustic impedance of about 20 $Nsm^{-3}$ while the acoustic impedance of the polymer according to the same has a considerably low acoustic impedance of about 1.5 to 4 $Nsm^{-3}$. Therefore, about 60% to 90% of the ultrasonic oscillations are reflected.

According to the fifty-fifth embodiment arranged as described above, the use of the oscillation insulating member having a different acoustic impedance in the rotor prevents the outward transmission of the ultrasonic oscillations generated by the ultrasonic oscillator. Therefore, the oscillations are substantially fully used to rotate the rotor, causing an effect to be obtained in that the motor output can be stablized and enlarged. Furthermore, the fact that the oscillations are not transmitted outwardly will prevent loosening of the other elements and generation of chattering noise (noise generated when undesirable oscillations are generated due to resonance or the like).

Figure 112:
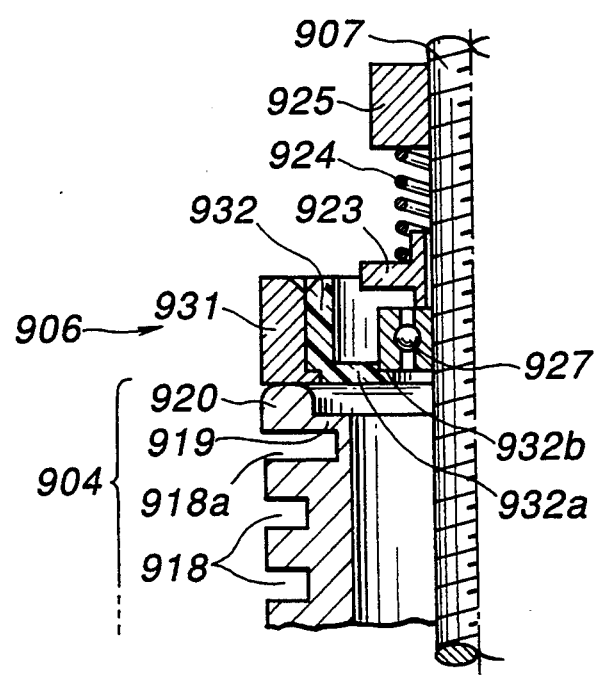
FIG. 112 is an enlarged cross sectional view which illustrates an essential portion of an ultrasonic oscillator according to the fifty-sixth embodiment of the present invention.

An essential portion of an ultrasonic oscillator according to a fifty-sixth embodiment, which is a modification of the fifty-fifth embodiment is shown in FIG. 112.

A rotor body 931 according to the fifty-sixth embodiment is constituted similar to the rotor body 906a according to the fifty-fifty embodiment. However, the rotor body 931 has a relatively thin wall. Furthermore, an oscillation insulating member 932 mad of a polymer and formed into a relatively thin-wall cylinder-like shape is disposed on the radial-directional inside of the rotor body. The oscillation insulating member 932 has an inward flange portion 932a having a thin wall and projecting at the lower end portion of the inner surface thereof. A stepped recess 932b formed in the inner upper portion of the flange portion 932a is used to fasten the oscillation insulating member 932 to the bearing 927. Since the oscillation insulating member 932 has an inner diameter larger than the diameter of the flange portion of the spring mounting 923, the tapered surface according to the fifty-fifth embodiment is omitted from the structure.

The operation of the fifty-sixth embodiment arranged as described above is performed similar to the fifty-fifty embodiment.

The fifty-sixth embodiment enables a similar effect to that obtainable from the fifty-fifty embodiment to be obtained. Furthermore, the spring characteristics attained by the flange portion 932a enable an effect of damping the oscillations to be obtained. As a result of the obtained oscillation damping effect and the oscillation insulating effect, the outward transmission of the oscillations can be restricted more satisfactorily.

Figure 113:
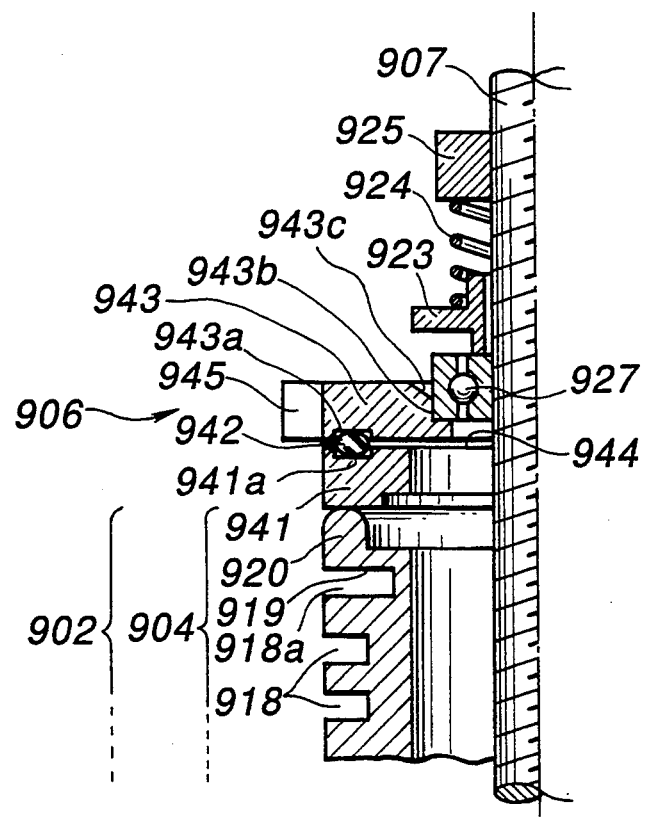
FIG. 113 is an enlarged cross sectional view which illustrates an essential portion of an ultrasonic oscillator according to the fifty-seventh embodiment of the present invention.

FIG. 113 illustrates a fifty-seventh embodiment. Since the fifty-seventh embodiment has substantially the same structure as that of the fifty-fifty embodiment, the same elements are given the same reference numerals, and their descriptions are therefore omitted here. The descriptions will be made about only the different portion, that is, the portion including the oscillation insulating member.

A recess 941a is formed on an end surface (the upper end surface) opposing the end surface which is in contact with the oscillator 902 of a rotor body 941, the recess 941a being disposed in a relatively outer portion of the end surface. The recess 941a has a rubber oscillation insulating member 942 formed into a thin-wall annular shape. Furthermore, a bearing holding member 943 formed into a short cylindrical shape and having a thick wall is disposed on the oscillation insulating member 942. In addition, a recess 943a is formed in the lower end surface of the bearing holding member 943 at a relatively outward position of the same. As a result, the oscillation insulating member 942 is held between the recess 943a and the recess 941a of the rotor body 941. The oscillation insulating member 942 serves to form a gap 944 to prevent direct contact between the rotor body 941 and the bearing holding member 943.

A bearing 927 pressed downwards by the pressing means is received by a bearing receiving recess 943b disposed in a inner portion of the bearing holding member 943. As a result, the rotor body 941 is pressed against the ultrasonic oscillator 902 by a predetermined pressure. It should be noted that the upper surface of the bearing holding member 943 has a tapered surface 943c facing a inner downward position and formed at a position adjacent to the bearing 927.

The bearing holding member 943 has a gear 945 formed on the outer surface thereof to transmit outputted rotation to an external position.

The fifty-seventh embodiment constituted as described is operated in a substantially similar manner to that performed by the fifty-fifth embodiment. Furthermore, the arrangement that the means for transmitting the rotational force to an external position is provided for another element (the bearing holding member or the like) disposed while interposing the oscillation insulating member in place of providing it in the rotor body will prevent the transmission of oscillations to an output transmission mechanism portion (omitted from illustration).

Since the rubber employed to make the oscillation insulating member according to the fifty-seventh embodiment has a considerably different acoustic impedance from that of the aluminum alloy which forms the rotor body, a similar effect to that obtainable from the fifty-fifty embodiment having the arrangement that the polymer such as the resin can be obtained.

The rubber for forming the oscillation insulating member according to the fifty-seventh embodiment is exemplified by Neoprene rubber, silicon rubber, urethane rubber and sponge rubber each having an acoustic impedance of about 1.5 to 3 Nsm$^{-3}$.

According to the fifty-seventh embodiment arranged as described above, the undesirable transmission of the oscillations can be prevented and the output from the motor can be enlarged by disposing the oscillation insulating member 942 between the rotor body 941 and the bearing holding member 943. Furthermore, the arrangement that the output transmission mechanism portion (omitted from illustration) takes out from the bearing holding member 943 via the oscillation insulating member 942 in place of taking out the same from the rotor body 941 will prevent the undesirable transmission of the ultrasonic oscillations from the output transmission mechanism portion.

The position at which the oscillation insulating member is disposed is not limited to the position in the axial direction of the rotor body. A similar effect to that obtainable from the fifty-fifty embodiment can be obtained if the oscillation insulating member is disposed between the rotor body and the other element.

Figure 114:
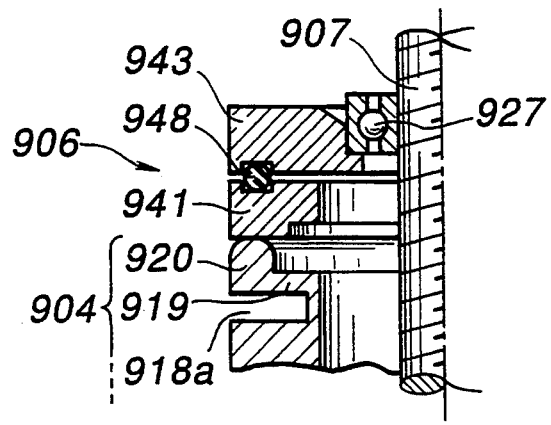
FIG. 114 is an enlarged cross sectional view which illustrates an essential portion of an ultrasonic oscillator according to the fifty-eighth embodiment of the present invention.

A fifty-eighth embodiment which is a modification of the fifty-seventh embodiment is shown in FIG. 114.

The fifty-eighth embodiment is arranged substantially similar to the fifty-seventh embodiment but it comprises an annular oscillation insulating member 948 having a circular cross sectional shape.

The fifty-eighth embodiment is operated substantially similar to the fifty-seventh embodiment.

The fifty-eighth embodiment has a substantially similar effect to that obtainable from the fifty-seventh embodiment. Furthermore, the contact area between the rotor body 941 and the oscillation insulating member 948 and that between the bearing holding member 943 and the oscillation insulating member 948 are reduced. Therefore, the total quantity of the ultrasonic oscillations to be transmitted from the rotor body 941 can be reduced. As a result, the effect of insulating the oscillations can be enhanced.

The reduction of the contact area is, of course, effective if a polymer is used to form the oscillation insulating member.

Figure 115:
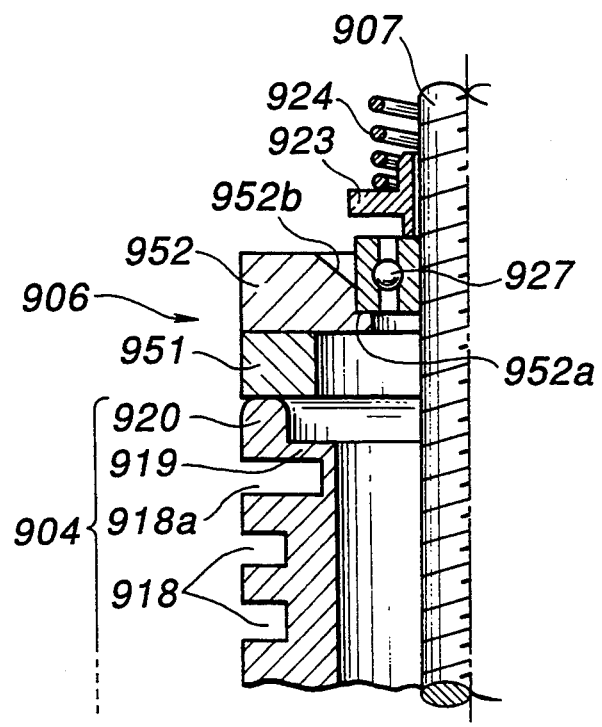
FIG. 115 is an enlarged cross sectional view which illustrates an essential portion of an ultrasonic oscillator according to the fifty-ninth embodiment of the present invention.
Figure 116:
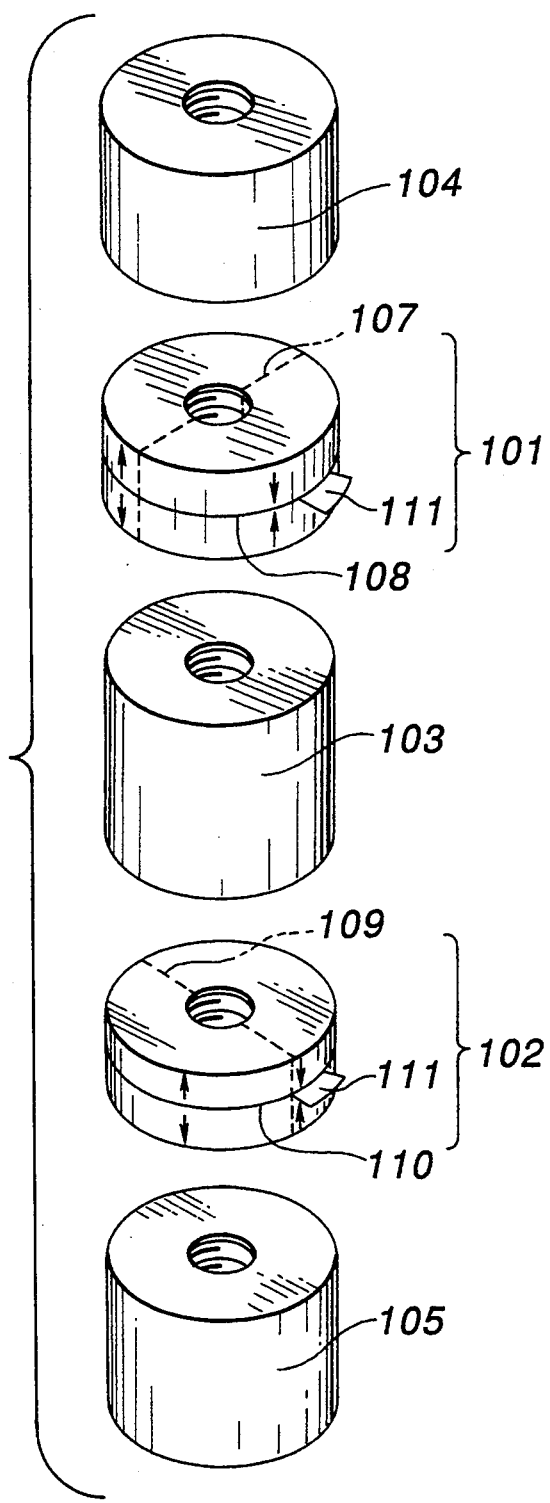
FIG. 116 is an exploded perspective view which illustrates an example of a conventional ultrasonic oscillator.
Figure 117:
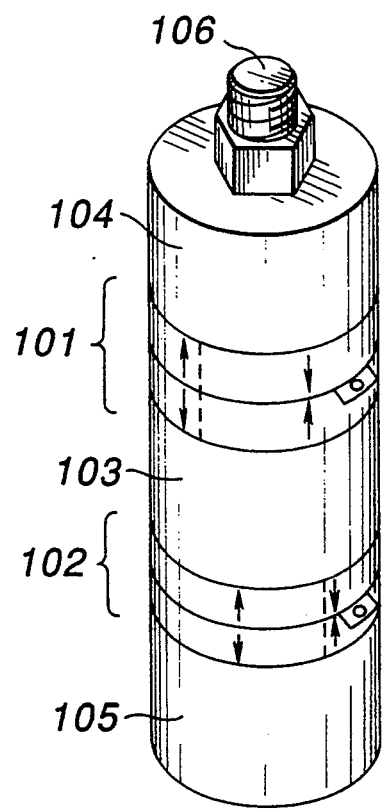
FIG. 117 is a perspective view which illustrates the ultrasonic oscillator shown in FIG. 116.
Figure 118:
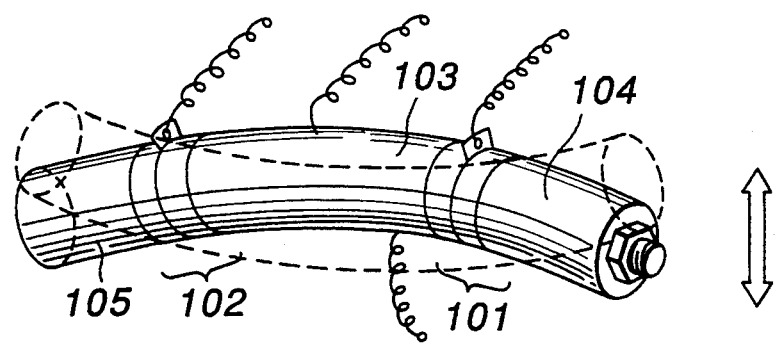
FIG. 118 is a perspective view which illustrates a state of the operation of the conventional ultrasonic oscillator.
Figure 119:
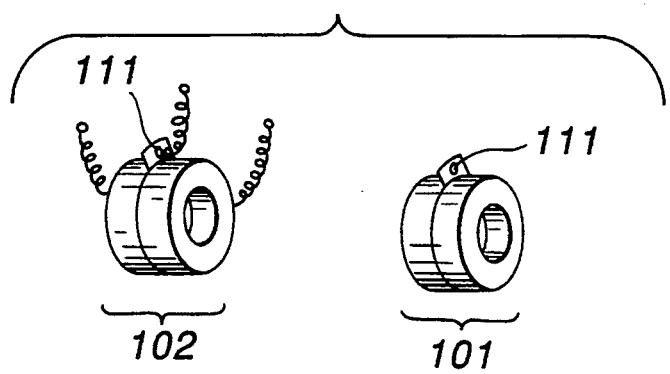
FIG. 119 is a perspective view which illustrates a state of the operation of the conventional ultrasonic oscillator.
Figure 120:
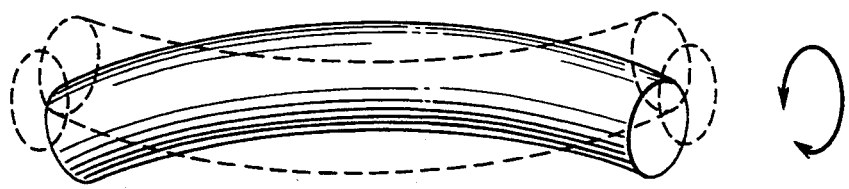
Figure 121:
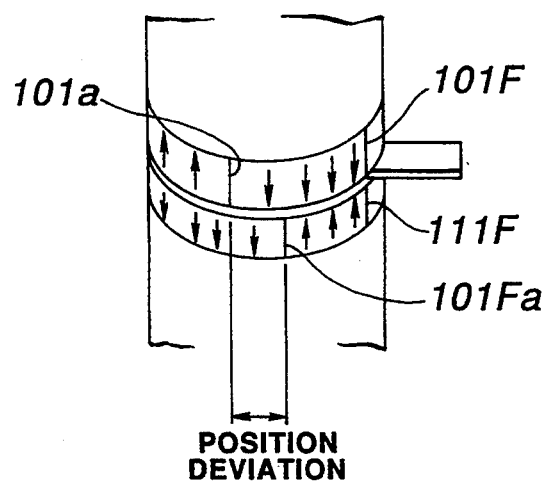
Figure 122:
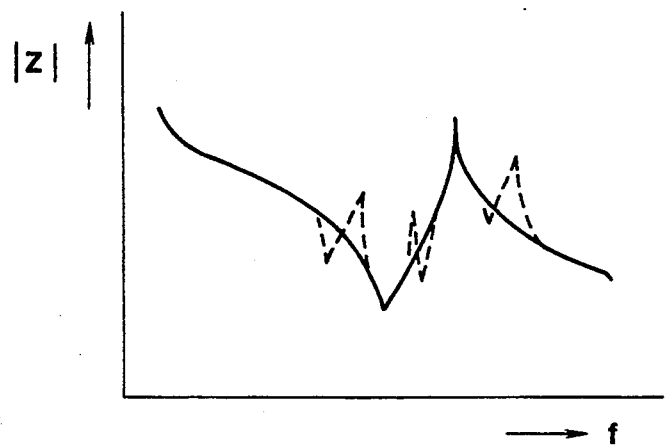
Figure 123:
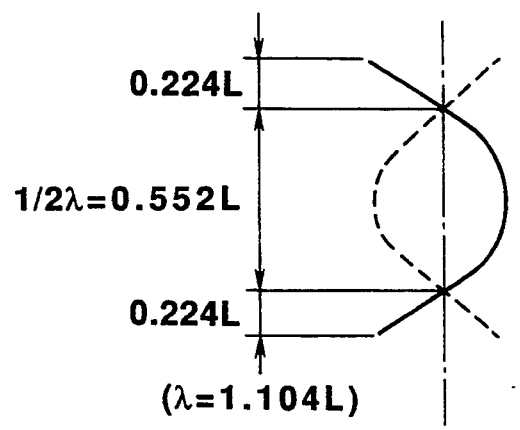
Figure 124:
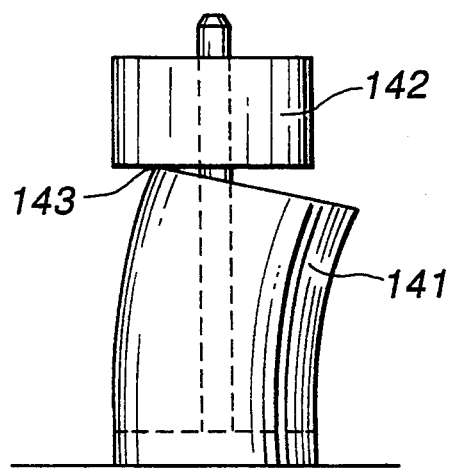

FIG. 115 illustrates a fifty-ninth embodiment of the present invention.

A bearing holding member 952 having the same diameter as that of the rotor body 951 and formed into a cylinder-like shape having a thick wall is, by an epoxy-type adhesive agent, bonded and secured on the top surface of a rotor body 951 made of aluminum alloy and formed into a short cylindrical shape having a thin wall. The bearing 927 is received by a stepped recess 952a for fastening the bearing 927, the stepped recess 952a being formed in the inner surface of the bearing holding member 952. The top surface of the bearing holding member 952 has a tapered surface 952b facing an inner lower position formed adjacent to the bearing 927. The bearing holding member 952 also serves as an oscillation insulating member.

The operation of the fifty-ninth embodiment constituted as described above will now be described.

The titanium alloy has an acoustic impedance of about 30 Nsm$^{-3}$ which is higher than about 20 Nsm$^{-3}$ which is the acoustic impedance of the aluminum alloy. By using the titanium alloy, a rigid rotor body can be formed because it is metal.

Also the reflection of the ultrasonic oscillation takes place at the boundary surface even if the acoustic impedance is higher than that of the aluminum alloy. As a result, a similar effect to that obtainable from the fifty-seventh embodiment can be obtained. Brass, nickel alloy and the like will enable a similar effect to be obtained because they have a higher acoustic impedance than that of the aluminum alloy.

According to the fifty-ninth embodiment in which metal having superior rigidity to that of polymers or rubber is used, the bearing holding member and the oscillation insulating member can be made an integrated element. Therefore, the number of elements can be reduced. Furthermore, excellent machining accuracy can be easily obtained by machining, causing an effect to be obtained in that an axial deflection generated due to unequal machining or the like can be prevented. Therefore, stable rotations can be realized.

As described above, according to the present invention, the oscillations from the ultrasonic oscillator is used only by the member to be driven, while preventing undesirable transmission to the other elements. Therefore, an ultrasonic motor which is capable of rotating stably and from which output can be stably obtained can be provided.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. An ultrasonic oscillator comprising:
a plurality of resonators; and
an electricity-to-mechanical energy conversion element disposed among a plurality of said resonators and pressed by a fastening member, wherein
said ultrasonic oscillator bends and/or oscillates when alternating voltage is applied to said electricity-to-mechanical energy conversion element, said resonators do not come in contact with said fastening member in a portion adjacent to the end surface of said ultrasonic oscillator, and a groove is formed in a side surface of said resonator;
said resonators respectively being formed into cylindrical shapes, a wall thickness of each of which is gradually reduced from a portion at which said resonator is fastened to said resonator fastening member to the end surface of said resonator.

2. An ultrasonic oscillator according to claim 1, wherein said cylindrical portion is formed to have a constant outer diameter and an inner wall which is gradually changed.

3. An ultrasonic oscillator comprising:
a plurality of resonators; and
an electricity-to-mechanical energy conversion element disposed among a plurality of said resonators and pressed by a fastening member, wherein
said ultrasonic oscillator bends and/or oscillates when alternating voltage is applied to said electricity-to-mechanical energy conversion element, said resonators do not come in contact with said fastening member in a portion adjacent to the end surface of said ultrasonic oscillator, and a groove is formed in a side surface of said resonator;
said groove of said resonator being formed at a position of an outer surface of said resonator which is a node of bending oscillations, said groove being aligned perpendicular to a central axis.

4. An ultrasonic oscillator comprising:
a plurality of resonators; and
an electricity-to-mechanical energy conversion element disposed among a plurality of said resonators and pressed by a fastening member, wherein
said ultrasonic oscillator bends and/or oscillates when alternating voltage is applied to said electricity-to-mechanical energy conversion elements said resonators do not come in contact with said fastening member in a portion adjacent to the end surface of said ultrasonic oscillator, and a groove is formed in a side surface of said resonator;
a plurality of grooves are being formed in a side surface of said resonator;
said grooves of said resonator each comprising a groove formed in an outer surface of said resonator perpendicular to a central axis and said grooves extend in parallel to the central axis at uniform intervals around the central axis.

5. An ultrasonic oscillator comprising:
a plurality of resonators; and
an electricity-to-mechanical energy conversion element disposed among a plurality of said resonators and pressed by a fastening member, wherein
said ultrasonic oscillator bends and/or oscillates when alternating voltage is applied to said electricity-to-mechanical energy conversion element, said resonators do not come in contact with said fastening member in a portion adjacent to the end surface of said ultrasonic oscillator, and a groove is formed in a side surface of said resonator;
a plurality of cut portions being disposed to form a zigzag configuration in an outer surface of said resonator.

6. An ultrasonic oscillator comprising:
a plurality of resonator; and
an electricity-to-mechanical energy conversion element disposed among a plurality of said resonators and pressed by a fastening member, wherein
said ultrasonic oscillator bends and/or oscillates when alternating voltage is applied to said electricity-to-mechanical energy conversion element, said resonators do not come in contact with said fastening member in a portion adjacent to the end surface of said ultrasonic oscillator, and a groove is formed in a side surface of said resonator;
a spiral groove being formed in an outer side surface of said resonator.

7. An ultrasonic oscillator comprising:
electricity-to-mechanical energy conversion means positioned between first and second resonators;
fastening means arranged substantially along a central axis and extending through said converter means and said resonators for compressing said converter means between said resonators;
at least one of said resonators having a mounting surface engaging said conversion means and outwardly directed flange means integral with said mounting surface and encircling and displaced from said fastening means;
said flange transmitting mechanical energy to an end surface thereof;
rotor means mounted to freely rotate about said fastening member and having a surface portion engaging said resonator end surface whereby mechanical energy transmitted to said end surface through said flange causes rotation of said rotor means;
said flange being provided with a plurality of spaced annular grooves provided in the outer periphery of said flange.

8. An ultrasonic oscillator comprising:
electricity-to-mechanical energy conversion means positioned between first and second resonators;
fastening means arranged substantially along a central axis and extending through said converter means and said resonators for compressing said converter means between said resonators;
at least one of said resonators having a mounting surface engaging said conversion means and outwardly directed flange means integral With said mounting surface and encircling and displaced from said fastening means;
said flange transmitting mechanical energy to an end surface thereof;
rotor means mounted to freely rotate about said fastening member and having a surface portion engaging said resonator end surface whereby mechanical energy transmitted to said end surface through said flange causes rotation of said rotor means;

said flange being provided with a plurality of spaced annular grooves provided along an inner periphery of said flange.

9. The ultrasonic oscillator of claim 7 wherein said grooves extend only partially about the periphery of said flange.

10. The ultrasonic oscillator of claim 7 wherein said grooves form a helical pattern about a periphery of said flange.

11. An ultrasonic oscillator comprising:
electricity-to-mechanical energy conversion means positioned between first and second resonators:
fastening means arranged substantially along a central axis and extending through said converter means and said resonators for compressing said converter means between said resonators;
at least one of said resonators having a mounting surface engaging said conversion means and outwardly directed flange means integral with said mounting surface and encircling and displaced from said fastening means;
said flange transmitting mechanical energy to an end surface thereof;
rotor means mounted to freely rotate about said fastening member and having a surface portion engaging said resonator end surface whereby mechanical energy transmitted to said end surface through said flange causes rotation of said rotor means;
an additional mass member being secured near the end surface of a resonator and surrounds an outer periphery of said flange.

12. The ultrasonic oscillator of claim 11 wherein said added mass engages said resonator over a small surface area.

13. An ultrasonic oscillator comprising:
electricity-to-mechanical energy conversion means positioned between first and second resonators;
fastening means arranged substantially along a central axis and extending through said converter means and said resonators for compressing said converter means between said resonators;
at least one of said resonators having a mounting surface engaging said conversion means and outwardly directed flange means integral with said mounting surface and encircling and displaced from said fastening means;
said flange transmitting mechanical energy to an end surface thereof;
rotor means mounted to freely rotate about said fastening member and having a surface portion engaging said resonator end surface whereby mechanical energy transmitted to said end surface through said flange causes rotation of said rotor means;
an additional mass member being secured near an end surface of the resonator and is arranged within an interior of said flange so as to be surrounded by said flange;
said added mass engaging said resonator over a small surface area.

14. The ultrasonic oscillator of claim 11 wherein said flange is provided with annular grooves in a region of contact with said mass member and said mass member is provided with corresponding annular projections for engaging said grooves.

15. The ultrasonic oscillator of claim 11 wherein said flange is provided with annular grooves in a region of contact with said mass member and said mass member is provided with a corresponding grooved portion.

16. The ultrasonic oscillator of claim 11 wherein said flange is threaded in a region of contact with said mass member and said mass member is provided with a corresponding threaded portion.

* * * * *